US012466862B2

United States Patent
Chen et al.

(10) Patent No.: US 12,466,862 B2
(45) Date of Patent: Nov. 11, 2025

(54) PLANT-PRODUCED MABS AGAINST CHIKUNGUNYA VIRUS WITH ENHANCED EFFECTOR FUNCTION AND EFFICACY

(71) Applicants: Qiang Chen, Chandler, AZ (US); Jonathan Hurtado, Chandler, AZ (US); Haiyan Sun, Chandler, AZ (US); Huafang Lai, Chandler, AZ (US)

(72) Inventors: Qiang Chen, Chandler, AZ (US); Jonathan Hurtado, Chandler, AZ (US); Haiyan Sun, Chandler, AZ (US); Huafang Lai, Chandler, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 884 days.

(21) Appl. No.: 17/615,803

(22) PCT Filed: Jun. 4, 2020

(86) PCT No.: PCT/US2020/036136
§ 371 (c)(1),
(2) Date: Dec. 1, 2021

(87) PCT Pub. No.: WO2020/247642
PCT Pub. Date: Dec. 10, 2020

(65) Prior Publication Data
US 2022/0298211 A1 Sep. 22, 2022

Related U.S. Application Data

(60) Provisional application No. 62/857,081, filed on Jun. 4, 2019.

(51) Int. Cl.
*C07K 14/415* (2006.01)
*C07K 16/10* (2006.01)
*C12N 15/82* (2006.01)

(52) U.S. Cl.
CPC ........ *C07K 14/415* (2013.01); *C07K 16/1081* (2013.01); *C12N 15/8258* (2013.01); *C07K 2317/13* (2013.01); *C07K 2317/41* (2013.01); *C07K 2317/732* (2013.01); *C07K 2317/76* (2013.01)

(58) Field of Classification Search
None
See application file for complete search history.

(56) References Cited

U.S. PATENT DOCUMENTS 10,087,240 B2 * 10/2018 Weiner ............... C07K 16/1063

FOREIGN PATENT DOCUMENTS

WO  WO-2015113055 A2 *  7/2015  ......... C07K 16/1081

OTHER PUBLICATIONS

Dent et al. Plant-produced anti-dengue virus monoclonal antibodies exhibit reduced antibody-dependent enhancement of infection activity. Journal of General Virology (2016). 97, 3280-3290. (Year: 2016).*
Acharya, D., Paul, A.M., Anderson, J.F., Huang, F. and Bai, F. (2015) Loss of Glycosaminoglycan Receptor Binding after Mosquito Cell Passage Reduces Chikungunya Virus Infectivity. PLoS Negl Trop Dis 9, e0004139.
Bournazos, S., DiLillo, D.J. and Ravetch, J.V. (2015) The role of Fc-FcγR interactions in IgG-mediated microbial neutralization. The Journal of Experimental Medicine 212, 1361-1369.
Bournazos, S., Klein, F., Pietzsch, J., Seaman, M.S., Nussenzweig, M.C. and Ravetch, J.V. (2014) Broadly neutralizing anti-HIV-1 antibodies require Fc effector functions for in vivo activity. Cell 158, 1243-1253.
Broeckel, R., Fox, J.M., Haese, N., Kreklywich, C.N., Sukulpovi-Petty, S., Legasse, A., Smith, P.P., Denton, M., Corvey, C., Krishnan, S., Colgin, L.M.A., Ducore, R.M., Lewis, A.D., Axthelm, M.K., Mandron, M., Cortez, P., Rothblatt, J., Rao, E., Focken, I., Carter, K., Sapparapau, G., Crowe, J.E., Jr., Diamond, M.S. and Streblow, D.N. (2017) Therapeutic administration of a recombinant human monoclonal antibody reduces the severity of chikungunya virus disease in rhesus macaques. PLOS Neglected Tropical Diseases 11, e0005637.
Chen, Q. and Davis, K. (2016a) The potential of plants as a system for the development and production of human biologics.
Chen, Q. and Davis, K. (2016b) The potential of plants as a system for the development and production of human biologics F1000Research 5, doi: 10.12688/f11000research.18010.12681.
Chen, Q. and Lai, H. (2014) Gene delivery into plant cells for recombinant protein production. Biomed Res Int 2014, 10.
Chen, Q., Lai, H., Hurtado, J., Stahnke, J., Leuzinger, K. and Dent, M. (2013) Agroinfiltration as an Effective and Scalable Strategy of Gene Delivery for Production of Pharmaceutical Proteins. Advanced Technlgy in Biology and Medicine 1, 103-112.
Fox, J.M., Roy, V., Gunn, B.M., Huang, L., Edeling, M.A., Mack, M., Fremont, D.H., Doranz, B.J., Johnson, S., Alter, G. and Diamond, M.S. (2019) Optimal therapeutic activity of monoclonal antibodies against chikungunya virus requires Fc-FcγR interaction on monocytes. Science Immunology 4, eaav5062.
Garber, K. (2018) No added sugar: antibody makers find an upside to 'No. fucose'. Nat Biotech 36, 1025.
Gardner, J., Anraku, I., Le, T.T., Larcher, T., Major, L., Roques, P., Schroder, W.A., Higgs, S. and Suhrbier, A. (2010) Chikungunya Virus Arthritis in Adult Wild-Type Mice. J. Virol 84, 8021-8032.
Giritch, A., Marillonnet, S., Engler, C., van Eldik, G., Botterman, J., Klimyuk, V. and Gleba, Y. (2006) Rapid high-yield expression of full-size IgG antibodies in plants coinfected with noncompeting viral vectors. Proc. Natl. Acad. Sci. U S A 103, 14701-14706.

(Continued)

Primary Examiner — Joanne Hama
Assistant Examiner — Amy M. Chattin
(74) Attorney, Agent, or Firm — Polsinelli PC

(57) ABSTRACT

Disclosed are monoclonal antibodies against Chikungunya virus having enhanced effector function and efficacy, methods of producing them, and methods of treatment of Chikungunya viral infection using the antibodies.

11 Claims, 20 Drawing Sheets

Specification includes a Sequence Listing.

(56) References Cited

OTHER PUBLICATIONS

Huang, Z., Phoolcharoen, W., Lai, H., Piensook, K., Cardineau, G., Zeitlin, L., Whaley, K., Arntzen, C.J., Mason, H. and Chen, Q. (2010) High-level rapid production of full-size monoclonal antibodies in plants by a single-vector DNA replicon system. Biotechnol Bioeng 106, 9-17.
Jefferis, R. (2005) Glycosylation of Recombinant Antibody Therapeutics. Biotechnology progress 21, 11-16.
Jefferis, R. (2012) Isotype and glycoform selection for antibody therapeutics. Archives of Biochemistry and Biophysics 526, 159-166.
Kam, Y.W., Simarmata, D., Chow, A., Her, Z., Teng, T.S., Ong, E.K., Renia, L., Leo, Y.S. and Ng, L.F. (2012) Early appearance of neutralizing immunoglobulin G3 antibodies is associated with chikungunya virus clearance and long-term clinical protection. J Infect Dis 205, 1147-1154.
Kimura, H., Sakai, K., Arao, T., Shimoyama, T., Tamura, T. and Nishio, K. (2007) Antibody-dependent cellular cytotoxicity of cetuximab against tumor cells with wild-type or mutant epidermal growth factor receptor. Cancer science 98, 1275-1280.
Lai, H., Engle, M., Fuchs, A., Keller, T., Johnson, S., Gorlatov, S., Diamond, M.S. and Chen, Q. (2010) Monoclonal antibody produced in plants efficiently treats West Nile virus infection in mice. Proc. Natl. Acad. Sci. U S A 107, 2419-2424.
Lai, H., He, J., Engle, M., Diamond, M.S. and Chen, Q. (2012) Robust production of virus-like particles and monoclonal antibodies with geminiviral replicon vectors in lettuce. Plant Biotechnology Journal 10, 95-104.
Lee, S.H. and Biron, C.A. (2010) Here today—not gone tomorrow: roles for activating receptors in sustaining NK cells during viral infections. Eur J Immunol 40, 923-932.
Leuzinger, K., Dent, M., Hurtado, J., Stahnke, J., Lai, H., Zhou, X. and Chen, Q. (2013) Efficient Agroinfiltration of Plants for High-level Transient Expression of Recombinant Proteins. Journal of Visualized Experiments, doi:10.3791/50521.
Li, D., He, W., Liu, X., Zheng, S., Qi, Y., Li, H., Mao, F., Liu, J., Sun, Y., Pan, L., Du, K., Ye, K., Li, W. and Sui, J. (2017) A potent human neutralizing antibody Fc-dependently reduces established HBV infections. eLife 6, e26738.
Liu, Q., Fan, C., Li, Q., Zhou, S., Huang, W., Wang, L., Sun, C., Wang, M., Wu, X., Ma, J., Li, B., Xie, L. and Wang, Y. (2017) Antibody-dependent-cellular-cytotoxicity-inducing antibodies significantly affect the post-exposure treatment of Ebola virus infection. Scientific reports 7, 45552.
Moldt, B. and Hessell, A.J. (2014) Chapter 8 - FcγRs Across Species. In: Antibody Fc (Ackerman, M.E. and Nimmerjahn, F. eds), pp. 145-157. Boston: Academic Press.
Moldt, B., Shibata-Koyama, M., Rakasz, E.G., Schultz, N., Kanda, Y., Dunlop, D.C., Finstad, S.L., Jin, C., Landucci, G., Alpert, M.D., Dugast, A.-S., Parren, P.W.H.I., Nimmerjahn, F., Evans, D.T., Alter, G., Forthal, D.N., Schmitz, J.E., Iida, S., Poignard, P., Watkins, D.I., Hessell, A.J. and Burton, D.R. (2012) A Nonfucosylated Variant of the anti-HIV-1 Monoclonal Antibody b12 Has Enhanced FcγRIIIa-Mediated Antiviral Activity <em>In Vitro</em> but Does Not Improve Protection against Mucosal SHIV Challenge in Macaques. J. Virol 86, 6189-6196.
Montero-Morales, L. and Steinkellner, H. (2018) Advanced Plant-Based Glycan Engineering. Frontiers in Bioengineering and Biotechnology 6.
Morrison, T.E., Oko, L., Montgomery, S.A., Whitmore, A.C., Lotstein, A.R., Gunn, B.M., Elmore, S.A. and Heise, M.T. (2011) A mouse model of chikungunya virus-induced musculoskeletal inflammatory disease: evidence of arthritis, tenosynovitis, myositis, and persistence. Am J Pathol 178, 32-40.
Musolino, A., Naldi, N., Bortesi, B., Pezzuolo, D., Capelletti, M., Missale, G., Laccabue, D., Zerbini, A., Camisa, R., Bisagni, G., Neri, T.M. and Ardizzoni, A. (2008) Immunoglobulin G fragment C receptor polymorphisms and clinical efficacy of trastuzumab-based therapy in patients with HER-2/neu-positive metastatic breast cancer. J Clin Oncol 26, 1789-1796.
Nimmerjahn, F. and Ravetch, J.V. (2005) Divergent Immunoglobulin G Subclass Activity Through Selective Fc Receptor Binding. Science 310, 1510-1512.
Nimmerjahn, F. and Ravetch, J.V. (2008) Fcgamma receptors as regulators of immune responses. Nat Rev Immunol 8, 34-47.
Pal, P., Dowd, K.A., Brien, J.D., Edeling, M.A., Gorlatov, S., Johnson, S., Lee, I., Akahata, W., Nabel, G.J., Richter, M.K.S., Smit, J.M., Fremont, D.H., Pierson, T.C., Heise, M.T. and Diamond, M.S. (2013) Development of a Highly Protective Combination Monoclonal Antibody Therapy against Chikungunya Virus. PLOS Pathogens 9, e1003312.
Petitdemange, C., Becquart, P., Wauquier, N., Béziat, V., Debré, P., Leroy, E.M. and Vieillard, V. (2011) Unconventional Repertoire Profile Is Imprinted during Acute Chikungunya Infection for Natural Killer Cells Polarization toward Cytotoxicity. PLOS Pathogens 7, e1002268.
Reichert, J.M. (2012) Marketing approval of mogamulizumab AU—Beck, Alain. mAbs 4, 419-425.
Schilte, C., Staikowsky, F., Couderc, T., Madec, Y., Carpentier, F., Kassab, S., Albert, M.L., Lecuit, M. and Michault, A. (2013) Chikungunya virus-associated long-term arthralgia: a 36-month prospective longitudinal study. PLoS neglected tropical diseases 7, e2137-e2137.
Smith, Scott A., Silva, Laurie A., Fox, Julie M., Flyak, A.I., Kose, N., Sapparapu, G., Khomandiak, S., Ashbrook, Alison W., Kahle, Kristen M., Fong, Rachel H., Swayne, S., Doranz, Benjamin J., McGee, Charles E., Heise, Mark T., Pal, P., Brien, James D., Austin, S.K., Diamond, Michael S., Dermody, Terence S. and Crowe, James E. (2015) Isolation and Characterization of Broad and Ultrapotent Human Monoclonal Antibodies with Therapeutic Activity against Chikungunya Virus. Cell host & microbe 18, 86-95.
Strasser, R., Altmann, F. and Steinkellner, H. (2014) Controlled glycosylation of plant-produced recombinant proteins. Current Opinion in Biotechnology 30, 95-100.
Sun, H., Chen, Q. and Lai, H. (2018) Development of Antibody Therapeutics against Flaviviruses. International Journal of Molecular Sciences 19, 54.
Voss, J.E., Vaney, M.-C., Duquerroy, S., Vonrhein, C., Girard-Blanc, C., Crublet, E., Thompson, A., Bricogne, G. and Rey, F.A. (2010) Glycoprotein organization of Chikungunya virus particles revealed by X-ray crystallography. Nature 468, 709.
Weaver, S.C. and Forrester, N.L. (2015) Chikungunya: Evolutionary history and recent epidemic spread. Antiviral Research 120, 32-39.
Weiner, G.J. (2010) Rituximab: Mechanism of Action. Seminars in Hematology 47, 115-123.
Yang, M., Dent, M., Lai, H., Sun, H. and Chen, Q. (2017) Immunization of Zika virus envelope protein domain III induces specific and neutralizing immune responses against Zika virus. Vacccine 35, 4287-4294.
Yang, M., Sun, H., Lai, H., Hurtado, J. and Chen, Q. (2018) Plant-produced Zika virus envelope protein elicits neutralizing immune responses that correlate with protective immunity against Zika virus in mice. Plant Biotechnology Journal 16, 572-580.
Yoon, I.K., Alera, M.T., Lago, C.B., Tac-An, I.A., Villa, D., Fernandez, S., Thaisomboonsuk, B., Klungthong, C., Levy, J.W., Velasco, J.M., Roque, V.G., Jr., Salje, H., Macareo, L.R., Hermann, L.L., Nisalak, A. and Srikiatkhachorn, A. (2015) High rate of subclinical chikungunya virus infection and association of neutralizing antibody with protection in a prospective cohort in the Philippines. PLoS Negl Trop Dis 9, e0003764.
Zhou, X.H., Hu, W.G. and Qin, X.B. (2008) The Role of Complement in the Mechanism of Action of Rituximab for B-Cell Lymphoma: Implications for Therapy. Oncologist 13, 954-966.

\* cited by examiner

Post-exposure treatment

- Mock
- PBS
- WTCHKV 152
- GnGnCHKV 152

Y-axis: Relative increase in footpad swelling
X-axis: DPI

SEQUENCE LISTING

<160> NUMBER OF SEQ ID NOS: 17

<210> SEQ ID NO 1
<211> LENGTH: 15128
<212> TYPE: DNA
<213> ORGANISM: Artificial Sequence
<220> FEATURE:
<223> OTHER INFORMATION: SYNTHESIZED

<400> SEQUENCE: 1

```
cgatcggtcg attcatagaa gattagattt ttcatagtat ttttttaaag taaaccttta      60
actacggtta ggacactttt aagttaaatt taatttgaac ccttaaatta attttttaaaa    120 tagataaata tcaatcatcc tgatatgctt ttgaaaaaat gaatgagaaa gatgattcaa    180
ttaaggccac attttaatca tgactaaaat aatatacagt ataatttcat atatatttgc    240
tttaaaaaaa aattgacaat ccattcgttt ctagcaataa atttcttcaa ccacaaatat    300
attaaagata actacggcat agaaacaaaa atctatgaag aattttttgta tacttcatat    360 gaaattaaaa aaaacttcat tgaacatcaa ataataata ataatcataa actcctcaat    420
atttatattc ctagcttctt gaattaaatt gtttacatat tcaacgatgt aaaaaattat    480
ttctctatct atttttcctta tatcatgcat ggtttcacat atatcaaagg ataaaagcaa    540
tctatgtaaa ttatctcact ttattaagtt ttctatctga attattgaga acgtagattt    600 cttttttgcac tatcccccaa taattagcaa aacacaccta gactagattt gttttgctaa    660
cccaattgat attaattata tatgattaat atttatatgt atatggaatt ggttaataaa    720
atgcatctgg ttcatcaaag aattataaag acacgtgaca ttcatttagg ataagaaata    780
tggatgatct ctttctctta ttcagataat tagtaattac acataacaca caactttgat    840
gcccacatta tagtgattag catgtcacta tgtgtgcatc ctttttatttc atacattaat    900 taacttggcc aatccagaag atggacaagt ctagggtcac attgcagggt actctagctt    960
actcgccttc ttttttcgaag gtttgagtac cttcaggca tcctcttgat acattacttt   1020
ccacttcgat tggggcaagc tgtagcagtt cttgcttaga ccgaattgcc atctcacaga   1080
gatgctgaag agttcgcgac cctccagaaa cggtgatact aactcctcga aaccgaatac   1140
tataggtaca tccgatctgg tcgaaaccga aaaatcgaga tgctgcatag ttaaccgaat   1200
ctcccgtcca agatccaagg actctgtgca gtgaagcttc cgtcctgtcg tatctgagat   1260
atctcttaaa tacaactttc ccgaaacccc agctttcctt gaaaccaagg ggattatctt   1320
gattcgaatt cgtctcatcg ttatgtagcc gccactcagt ccaactcgga ctttcgtcag   1380
```

```
gaagtttgaa gggagaagtt gtacctcctg atcctccatc ccaacgttca ctgttagctt    1440
gttccctagc gtcgtttcct tgtatagctc gttccatgga ttgtaaatag taattgtaat    1500
gttgtttgtt gtttgttgtt gttggtaatt gttgtaaaaa tacgctctcc aaatgaaatg    1560
aacttcctta tatagaggaa gggtcttgcg aaggatagtg ggattgtgcg tcatccctta    1620
cgtcagtgga gatatcacat caatccactt gctttgaaga cgtggttgga acgtcttctt    1680
tttccacgat gctcctcgtg ggtgggggtc catctttggg accactgtcg gcagaggcat    1740
cttcaacgat ggcctttcct ttatcgcaat gatggcattt gtaggagcca ccttcctttt    1800
ccactatctt cacaataaag tgacagatag ctgggcaatg gaatccgagg aggtttccgg    1860
atattaccct tgttgaaaa gtctcaattg ccctttggtc ttctgagact gtatctttga    1920
tatttttgga gtagacaagt gtgtcgtgct ccaccatgtt ctggcaattc cggttcgctt    1980
gctgtccata aaaccgccca gtctagctat cgccatgtaa gcccactgca agctacctgc    2040
tttctctttg cgcttgcgtt ttcccttgtc cagatagccc agtagctgac attcatccgg    2100
ggtcagcacc gtttctgcgg actggctttc tacgtgttcc gcttcccttta gcagcccttg    2160
cgccctgagt gcttgcggca gcgtgaagct ggcgcgccgc tctagcagaa ggcatgttgt    2220
tgtgactccg aggggttgcc tcaaactcta tcttataacc ggcgtggagg catggaggca    2280
agggcatttt ggtaatttaa gtagttagtg gaaaatgacg tcatttactt aaagacgaag    2340
tcttgcgaca aggggggccc acgccgaatt ttaatattac cggcgtggcc ccaccttatc    2400
gcgagtgctt tagcacgagc ggtccagatt taaagtagaa aagttcccgc ccactagggt    2460
taaaggtgtt cacactataa aagcatatac gatgtgatgg tatttgatgg agcgtatatt    2520
gtatcaggta tttccgtcgg atacgaatta ttcgtacgac cctcctgcag gtcaacatgg    2580
tggagcacga cacacttgtc tactccaaaa atatcaaaga tacagtctca gaagaccaaa    2640
gggcaattga ctttttcaa caaagggtaa tatccggaaa cctcctcgga ttccattgcc    2700
cagctatctg tcactttatt gtgaagatag tggaaaagga aggtggctcc tacaaatgcc    2760
atcattgcga taaaggaaag gccatcgttg aagatgcctc tgccgacagt ggtcccaaag    2820
atggaccccc acccacgagg agcatcgtgg aaaaagaaga cgttccaacc acgtcttcaa    2880
agcaagtgga ttgatgtgat aacatggtgg agcacgacac acttgtctac tccaaaaata    2940
tcaaagatac agtctcagaa gaccaaaggg caattgagac ttttcaacaa agggtaatat    3000
ccggaaacct cctcggattc cattgcccag ctatctgtca ctttattgtg aagatagtgg    3060
aaaaggaagg tggctcctac aaatgccatc attgcgataa aggaaaggcc atcgttgaag    3120
atgcctctgc cgacagtggt cccaaagatg gacccccacc cacgaggagc atcgtggaaa    3180
aagaagacgt tccaaccacg tcttcaaagc aagtggattg atgtgatatc tccactgacg    3240
taagggatga cgcacaatcc cactatcctt cgcaagaccc ttcctctata taggaagtt    3300
catttcattt ggagaggacc tcgagaaaca aacaaaatca acaaatatag aaaataacgc    3360
atttccaatt ctttgaaatt tctgcaacat ctagcgagac caacaacggt ctctagctcg    3420
aagtgacatc acaaagttga aggtaataaa gccaaattaa ttaagacatt ttcataatga    3480
tgtcaagaat gcaaagcaaa ttgcataact gcctttatgc aaaacattaa tataatataa    3540
attataaaga actgcgctct ctgcttctta ttttcttagc ttcatttatt agtcactagc    3600
tgttcagaat tttcagtatc ttttgatatt actaagaacc taatcacaca atgtatattc    3660
ttatgcagga aaagcagaat gctgagctaa aagaaaggct ttttccattt tcgagagaca    3720
atgagaaaag aagaagaaga agaagaagaa gaagaagaag aaaagagtaa ataataaagc    3780
```

```
cccacaggag gcgaagttct tgtagctcca tgttatctaa gttattgata ttgtttgccc    3840
tatattttat ttctgtcatt gtgtatgttt tgttcagttt cgatctcctt gcaaaatgca    3900
gagattatga gatgaataaa ctaagttata ttattatacg tgttaatatt ctcctcctct    3960
ctctagctag cctttttgttt tctcttttttc ttatttgatt ttctttaaat caatccattt    4020
taggagaggg ccagggagtg atccagcaaa acatgaagat tagaagaaac ttccctcttt    4080
tttttcctga aaacaattta acgtcgagat ttatctcttt ttgtaatgga atcatttcta    4140
cagttatgac gaattgtaca tcaacgaaaa attagtcaaa cgactaaaat aaataaatat    4200
catgtgttat taagaaaatt ctcctataag aatattttaa tagatcatat gtttgtaaaa    4260
aaaattaatt tttactaaca catatattta cttatcaaaa atttgacaaa gtaagattaa    4320
aataatattc atctaacaaa aaaaaaacca gaaaatgctg aaaacccggc aaaaccgaac    4380
caatccaaac cgatatagtt ggtttggttt gattttgata taaaccgaac caactcggtc    4440
catttgcacc cctaatcata atagctttaa tatttcaaga tattattaag ttaacgttgt    4500
caatatcctg gaaattttgc aaaatgaatc aagcctatat ggctgtaata tgaatttaaa    4560
agcagctcga tgtggtggta atatgtaatt tacttgattc taaaaaaata tcccaagtat    4620
taataatttc tgctaggaag aaggttagct acgatttaca gcaaagccag aatacaaaga    4680
accataaagt gattgaagct cgaaatatac gaaggaacaa atattttttaa aaaaatacgc    4740 aatgacttgg aacaaaagaa agtgatatat ttttttgttct taaacaagca tcccctctaa    4800
agaatggcag ttttccttttg catgtaacta ttatgctccc ttcgttacaa aaattttgga    4860
ctactattgg gaacttcttc tgaaaatagt ggtaccgagt gtacttcaag tcagttggaa    4920
atcaataaaa tgattatttt atgaatatat ttcattgtgc aagtagatag aaattacata    4980
tgttacataa cacacgaaat aaacaaaaaa acacaatcca aaacaaacac cccaaacaaa    5040
ataacactat atatatcctc gtatgaggag aggcacgttc agtgactcga cgattcccga    5100
gcaaaaaaag tctccccgtc acacatatag tgggtgacgc aattatcttc aaagtaatcc    5160
ttctgttgac ttgtcattga taacatccag tcttcgtcag gattccaaag aattatagaa    5220
gggatcggtc aacatggtgg agcacgacac acttgtctac tccaaaaata tcaaagatac    5280
agtctcagaa gaccaaaggg caattgagac ttttcaacaa agggtaatat ccggaaacct    5340
cctcggattc cattgcccag ctatctgtca ctttattgtg aagatagtgg aaaaggaagg    5400
tggctcctac aaatgccatc attgcgataa aggaaaggcc atcgttgaag atgcctctgc    5460
cgacagtggt cccaaagatg gaccccccacc cacgaggagc atcgtggaaa agaagacgt    5520 tccaaccacg tcttcaaagc aagtggattg atgtgataac atggtggagc acgacacact    5580
tgtctactcc aaaaatatca agatacagt ctcagaagac caagggcaa ttgagacttt    5640 tcaacaaagg gtaatatccg gaaacctcct cggattccat tgcccagcta tctgtcactt    5700
tattgtgaag atagtggaaa aggaaggtgg ctcctacaaa tgccatcatt gcgataaagg    5760
aaaggccatc gttgaagatg cctctgccga cagtggtccc aaagatggac ccccaccca    5820 gaggagcatc gtgaaaaag aagacgttcc aaccacgtct tcaaagcaag tggattgatg    5880
tgatatctcc actgacgtaa gggatgacgc acaatcccac tatccttcgc aagacccttc    5940
ctctatataa ggaagttcat ttcatttgga gaggacctcg agaaacaaac aaaatcaaca    6000
aatatagaaa ataacgcatt tccaattctt gaaatttct gcaacatcta gaggatcccc    6060
gggtaccgag ctcgaagtga catcacaaag ttgaaggtaa taaagccaaa ttaattaaga    6120
```

```
cattttcata atgatgtcaa gaatgcaaag caaattgcat aactgccttt atgcaaaaca    6180
ttaatataat ataaattata aagaactgcg ctctctgctt cttattttct tagcttcatt    6240
tattagtcac tagctgttca gaattttcag tatcttttga tattactaag aacctaatca    6300
cacaatgtat attcttatgc aggaaaagca gaatgctgag ctaaaagaaa ggctttttcc    6360
attttcgaga gacaatgaga aagaagaag aagaagaaga agaagaagaa gaagaaaaga    6420
gtaaataata aagccccaca ggaggcgaag ttcttgtagc tccatgttat ctaagttatt    6480
gatattgttt gccctatatt ttatttctgt cattgtgtat gttttgttca gtttcgatct    6540
ccttgcaaaa tgcagagatt atgagatgaa taaactaagt tatattatta tacgtgttaa    6600
tattctcctc ctctctctag ctagccttt gttttctctt tttcttattt gattttcttt     6660
aaatcaatcc attttaggag agggccaggg agtgatccag caaaacatga agattagaag    6720
aaacttccct cttttttttc ctgaaaacaa tttaacgtcg agatttatct cttttgtaa     6780
tggaatcatt tctacagtta tgacgaattg tacatcaacg aaaaattagt caaacgacta    6840
aaataaataa atatcatgtg ttattaagaa aattctccta taagaatatt ttaatagatc    6900
atatgtttgt aaaaaaaatt aattttact aacacatata tttacttatc aaaaatttga     6960
caaagtaaga ttaaaataat attcatctaa caaaaaaaaa accagaaaat gctgaaaacc    7020
cggcaaaacc gaaccaatcc aaaccgatat agttggtttg gtttgatttt gataaaacc     7080
gaaccaactc ggtccatttg caccctaat cataatagct ttaatatttc aagatattat     7140
taagttaacg ttgtcaatat cctggaaatt ttgcaaaatg aatcaagcct atatggctgt    7200
aatatgaatt taaaagcagc tcgatgtggt ggtaatatgt aatttacttg attctaaaaa    7260
aatatcccaa gtattaataa tttctgctag gaagaaggtt agctacgatt tacagcaaag    7320
ccagaataca aagaaccata aagtgattga agctcgaaat atacgaagga acaaatattt    7380
ttaaaaaaat acgcaatgac ttggaacaaa agaaagtgat atatttttg ttcttaaaca     7440
agcatcccct ctaagaatg gcagttttcc tttgcatgta actattatgc tcccttcgtt     7500
acaaaaattt tggactacta ttgggaactt cttctgaaaa tagtggtacc gagtgtactt    7560
caagtcagtt ggaaatcaat aaaatgatta ttttatgaat atatttcatt gtgcaagtag    7620
atagaaatta catatgttac ataacacacg aaataaacaa aaaaacacaa tccaaaacaa    7680
acaccccaaa caaaataaca ctatatatat cctcgtatga ggagaggcac gttcagtgac    7740
tcgacgattc ccgagcaaaa aaagtctccc cgtcacacat atagtgggtg acgcaattat    7800
cttcaaagta atccttctgt tgacttgtca ttgataacat ccagtcttcg tcaggattgc    7860
aaagaattat agaagggatc ccaccttta ttttcttctt ttttccatat ttagggttga     7920
cagtgaaatc agactggcaa cctattaatt gcttccacaa tgggacgaac ttgaagggga    7980
tgtcgtcgat gatattatag gtggcgtgtt catcgtagtt ggtgaagtcg atggtcccgt    8040
tccagtagtt gtgtcgcccg agacttctag cccaggtggt cttccggta cgagttggtc     8100
cgcagatgta gaggctgggg tgtctgaccc cagtccttcc ctcatcctgg ttagatcggc    8160
catccactca aggtcagatt gtgcttgatc gtaggagaca ggatgtatga agtgtaggc     8220
atcgatgctt acatgatata ggtgcgtctc tctccagttg tgcagatctt cgtggcagcg    8280
gagatctgat tctgtgaagg gcgacacgta ctgctcaggt tgtggaggaa ataatttgtt    8340
ggctgaatat tccagccatt gaagctttgt tgcccattca tgagggaact cttctttgat    8400
catgtcaaga tactcctcct tagacgttgc agtctggata atagttcgcc atcgtgcgtc    8460
agatttgcga ggagacacct tatgatctcg gaaatctcct ctggttttaa tatctccgtc    8520
```

```
ctttgatatg taatcaagga cttgtttaga gtttctagct ggctggatat tagggtgatt    8580
tccttcaaaa tcgaaaaaag aaggatccct aatacaaggt tttttatcaa gctggataag    8640
agcatgatag tgggtagtgc catcttgatg aagctcagaa gcaacaccaa ggaagaaaat    8700
aagaaaaggt gtgagtttct cccagagaaa ctggaataaa tcatctcttt gagatgagca    8760
cttggggtag gtaaggaaaa catatttaga ttggagtctg aagttcttgc tagcagaagg    8820
catgttgttg tgactccgag gggttgcctc aaactctatc ttataaccgg cgtggaggca    8880
tggaggcaag ggcattttgg taatttaagt agttagtgga aaatgacgtc atttacttaa    8940
agacgaagtc ttgcgacaag gggggcccac gccgaatttt aatattaccg gcgtggcccc    9000
accttatcgc gagtgcttta gcacgagcgg tccagattta aagtagaaaa gttcccgccc    9060
actagggtta aaggtgttca cactataaaa gcatatacga tgtgatggta tttgatggag    9120
cgtatattgt atcaggtatt tccgtcggat acgaattatt cgtacggccg gaccggtccc    9180
ctaggccggc caattcgaga tcggccgcgg ctgagtggct ccttcaatcg ttgcggttct    9240
gtcagttcca aacgtaaaac ggcttgtccc gcgtcatcgg cgggggtcat aacgtgactc    9300
ccttaattct ccgctcatga tcagattgtc gtttcccgcc ttcagtttaa actatcagtg    9360
tttgacagga tatattggcg ggtaaaccta agagaaaaga gcgtttatta gaataatcgg    9420
atatttaaaa gggcgtgaaa aggtttatcc gttcgtccat ttgtatgtgc atgccaacca    9480
cagggttccc cagatctggc gccggccagc gagacgagca agattggccg ccgcccgaaa    9540
cgatccgaca gcgcgcccag cacaggtgcg caggcaaatt gcaccaacgc atacagcgcc    9600
agcagaatgc catagtgggc ggtgacgtcg ttcgagtgaa ccagatcgcg caggaggccc    9660
ggcagcaccg gcataatcag gccgatgccg acagcgtcga gcgcgacagt gctcagaatt    9720
acgatcaggg gtatgttggg tttcacgtct ggcctccgga gactgtcata cgcgtaaaaa    9780
ggccgcgttg ctggcgtttt tccataggct ccgcccccct gacgagcatc acaaaaatcg    9840
acgctcaagt cagaggtggc gaaacccgac aggactataa agataccagg cgtttccccc    9900
tggaagctcc ctcgtgcgct ctcctgttcc gaccctgccg cttaccggat acctgtccgc    9960
ctttctccct tcgggaagcg tggcgctttc tcatagctca cgctgtaggt atctcagttc   10020
ggtgtaggtc gttcgctcca agctgggctg tgtgcacgaa ccccccgttc agcccgaccg   10080
ctgcgcctta tccggtaact atcgtcttga gtccaacccg gtaagacacg acttatcgcc   10140
actggcagca gccactggta acaggattag cagagcgagg tatgtaggcg gtgctacaga   10200
gttcttgaag tggtggccta actacggcta cactagaagg acagtatttg gtatctgcgc   10260
tctgctgaag ccagttacct tcggaaaaag agttggtagc tcttgatccg gcaaacaaac   10320
caccgctggt agcggtggtt tttttgtttg caagcagcag attacgcgca gaaaaaaagg   10380
atctcaagaa gatcctttga tcttttctac ggggtctgac gctcagtgga acgaaaactc   10440
acgttaaggg attttggtca tgagattatc aaaaaggatc ttcacctaga tccttttaaa   10500
ttaaaaatga agttttaaat caatctaaag tatatatgag taaacttggt ctgcagttgc   10560
catgttttac ggcagtgaga gcagagatag cgctgatgtc cggcggtgct tttgccgtta   10620
cgcaccaccc cgtcagtagc tgaacaggag ggacagctga tagacacaga agccactgga   10680
gcacctcaaa aacaccatca tacactaaat cagtaagttg gcagcatcac ccataattgt   10740
ggtttcaaaa tcggctccgt cgatactatg ttatacgcca actttgaaaa caactttgaa   10800
aaagctgttt tctggtattt aaggttttag aatgcaagga acagtgaatt ggagttcgtc   10860
```

-continued

```
ttgttataat tagcttcttg gggtatcttt aaatactgta gaaagagga aggaaataat    10920 aaatggctaa aatgagaata tcaccggaat tgaaaaaact gatcgaaaaa taccgctgcg    10980
taaaagatac ggaaggaatg tctcctgcta aggtatataa gctggtggga gaaaatgaaa    11040
acctatattt aaaaatgacg gacagccggt ataaagggac cacctatgat gtggaacggg    11100
aaaaggacat gatgctatgg ctggaaggaa agctgcctgt tccaaaggtc ctgcactttg    11160
aacggcatga tggctggagc aatctgctca tgagtgaggc cgatggcgtc ctttgctcgg    11220
aagagtatga agatgaacaa agccctgaaa agattatcga gctgtatgcg gagtgcatca    11280
ggctctttca ctccatcgac atatcggatt gtccctatac gaatagctta gacagccgct    11340
tagccgaatt ggattactta ctgaataacg atctggccga tgtggattgc gaaaactggg    11400
aagaagacac tccatttaaa gatccgcgcg agctgtatga ttttttaaag acggaaaagc    11460
ccgaagagga acttgtcttt tcccacggcg acctgggaga cagcaacatc tttgtgaaag    11520
atggcaaagt aagtggcttt attgatcttg ggagaagcgg cagggcggac aagtggtatg    11580
acattgcctt ctgcgtccgg tcgatcaggg aggatatcgg ggaagaacag tatgtcgagc    11640
tattttttga cttactgggg atcaagcctg attgggagaa aataaaatat tatattttac    11700
tggatgaatt gttttagtac ctagatgtgg cgcaacgatg ccggcgacaa gcaggagcgc    11760
accgacttct tccgcatcaa gtgttttggc tctcaggccg aggcccacgg caagtatttg    11820
ggcaaggggt cgctggtatt cgtgcagggc aagattcgga ataccaagta cgagaaggac    11880
ggccagacgg tctacgggac cgacttcatt gccgataagg tggattatct ggacaccaag    11940
gcaccaggcg ggtcaaatca ggaataaggg cacattgccc cggcgtgagt cggggcaatc    12000
ccgcaaggag ggtgaatgaa tcggacgttt gaccggaagg catacaggca agaactgatc    12060
gacgcggggt tttccgccga ggatgccgaa accatcgcaa gccgcaccgt catgcgtgcg    12120
ccccgcgaaa ccttccagtc cgtcggctcg atggtccagc aagctacggc caagatcgag    12180
cgcgacagcg tgcaactggc tccccctgcc ctgcccgcgc catcggccgc cgtggagcgt    12240
tcgcgtcgtc tcgaacagga ggcggcaggt ttggcgaagt cgatgaccat cgacacgcga    12300
ggaactatga cgaccaagaa gcgaaaaacc gccggcgagg acctggcaaa acaggtcagc    12360
gaggccaagc aggccgcgtt gctgaaacac acgaagcagc agatcaagga aatgcagctt    12420
tccttgttcg atattgcgcc gtggccggac acgatgcgag cgatgccaaa cgacacggcc    12480
cgctctgccc tgttcaccac gcgcaacaag aaaatcccgc gcgaggcgct gcaaaacaag    12540
gtcattttcc acgtcaacaa ggacgtgaag atcacctaca ccggcgtcga gctgcgggcc    12600
gacgatgacg aactggtgtg gcagcaggtg ttggagtacg cgaagcgcac ccctatcggc    12660
gagccgatca ccttcacgtt ctacgagctt tgccaggacc tgggctggtc gatcaatggc    12720
cggtattaca cgaaggccga ggaatgcctg tcgcgcctac aggcgacggc gatgggcttc    12780
acgtccgacc gcgttgggca cctggaatcg gtgtcgctgc tgcaccgctt ccgcgtcctg    12840
gaccgtggca agaaaacgtc ccgttgccag gtcctgatcg acgaggaaat cgtcgtgctg    12900
tttgctggcg accactacac gaaattcata tgggagaagt accgcaagct gtcgccgacg    12960
gcccgacgga tgttcgacta tttcagctcg caccggagcc gtacccgct caagctggaa    13020 accttccgcc tcatgtgcgg atcggattcc acccgcgtga agaagtggcg cgagcaggtc    13080
ggcgaagcct gcgaagagtt gcgaggcagc ggcctggtgg aacacgcctg ggtcaatgat    13140
gacctggtgc attgcaaacg ctagggcctt gtggggtcag ttccggctgg gggttcagca    13200
gccagcgctt tactggcatt tcaggaacaa gcgggcactg ctcgacgcac ttgcttcgct    13260
```

```
cagtatcgct cgggacgcac ggcgcgctct acgaactgcc gataaacaga ggattaaaat    13320
tgacaattca atggcaagga ctgccagcgc tgccattttt ggggtgaggc cgttcgcggc    13380
cgaggggcgc agcccctggg gggatgggag cccgcgtta gcggccggg agggttcgag      13440 aaggggggc accccccttc ggcgtgcgcg gtcacgcgca cagggcgcag ccctggttaa    13500
aaacaaggtt tataaatatt ggtttaaaag caggttaaaa gacaggttag cggtggccga    13560
aaaacgggcg gaaaccttg caaatgctgg attttctgcc tgtggacagc ccctcaaatg     13620
tcaataggtg cgcccctcat ctgtcagcac tctgccctc aagtgtcaag gatcgcgccc    13680
ctcatctgtc agtagtcgcg cccctcaagt gtcaataccg cagggcactt atccccaggc    13740
ttgtccacat catctgtggg aaactcgcgt aaaatcaggc gttttcgccg atttgcgagg    13800
ctggccagct ccacgtcgcc ggcgaaatc gagcctgccc ctcatctgtc aacgccgcgc     13860
cgggtgagtc ggcccctcaa gtgtcaacgt ccgcccctca tctgtcagtg agggccaagt    13920
tttccgcgag gtatccacaa cgccggcggc gcggtgtct cgcacacggc ttcgacggcg     13980
tttctggcgc gtttgcaggg ccatagacgg ccgccagccc agcggcgagg gcaaccagcc    14040
cggtgagcgt cgcaaaggcg ctcggtcttg ccttgctcgt cgagatctgg ggtcgatcag    14100
ccggggatgc atcaggccga cagtcggaac ttcgggtccc cgacctgtac cattcggtga    14160
gcaatggata ggggagttga tatcgtcaac gttcacttct aaagaaatag cgccactcag    14220
cttcctcagc ggctttatcc agcgatttcc tattatgtcg gcatagttct caagatcgac    14280
agcctgtcac ggttaagcga gaaatgaata agaaggctga taattcggat ctctgcgagg    14340
gagatgatat ttgatcacag gcagcaacgc tctgtcatcg ttacaatcaa catgctaccc    14400
tccgcgagat catccgtgtt tcaaacccgg cagcttagtt gccgttcttc cgaatagcat    14460
cggtaacatg agcaaagtct gccgccttac aacggctctc ccgctgacgc cgtcccggac    14520
tgatgggctg cctgtatcga gtggtgattt tgtgccgagc tgccggtcgg ggagctgttg    14580
gctggctggt ggcaggatat attgtggtgt aaacaaattg acgcttagac aacttaataa    14640
cacattgcgg acgttttaa tgtactgggg tggttttct tttcaccagt gagacgggca      14700
acagctgatt gcccttcacc gcctggccct gagagagttg cagcaagcgg tccacgctgg    14760
tttgccccag caggcgaaaa tcctgtttga tggtggttcc gaaatcggca aaatccctta    14820
taaatcaaaa gaatagcccg agatagggtt gagtgttgtt ccagtttgga acaagagtcc    14880
actattaaag aacgtggact ccaacgtcaa agggcgaaaa accgtctatc agggcgatgg    14940
cccactacgt gaaccatcac ccaaatcaag ttttttgggg tcgaggtgcc gtaaagcact    15000
aaatcggaac cctaaaggga gcccccgatt tagagcttga cgggaaagc cggcgaacgt     15060 ggcgagaaag gaagggaaga aagcgaaagg agcgggcgcc attcaggctg cgcaactgtt    15120
gggaaggg                                                            15128
```

<210> SEQ ID NO 2
<211> LENGTH: 1409
<212> TYPE: DNA
<213> ORGANISM: Artificial Sequence
<220> FEATURE:
<223> OTHER INFORMATION: SYNTHESIZED

<400> SEQUENCE: 2

```
tgggatggtc ttgtatcatc cttttcttgg ttgcaacagc tactggtgtt cattctcaag      60
ttcaattgca gcagcctggt gcagctctcg tgaagccagg tgcttcagca atgatgtctt     120
```

```
gtaaggcttc tggttacaca ttcacaagct attggattac atgggtgaaa caaagacctg    180
gtcagggtct tgagtggata ggagatattt atcccggaac tggaagaact atctacaaag    240
agaagtttaa aaccaaggct actctgactg tagataccag ttcttctact gcttttatgc    300
aacttaattc tttgacatca gaagatagtg ctgtgtacta ttgtgctagg gggtatggct    360
caccatatta cgctttagac tattggggac aaggtacttc cgttactgtg tcttctgcta    420
gcaccaaggg accttctgtt tttccacttg ctccttcttc taagtctact ctggtggaa    480 ctgctgcttt gggttgtttg gtgaaagatt actttcctga ccagtgacc gtttcttgga    540 actcaggtgc tcttacatct ggtgttcata ctttcccagc tgttcttcaa tcttcaggac    600
tttactcact ttcttctgtt gttaccgttc cttcttcaag cttgggcact cagacctaca    660
tctgcaatgt gaatcacaaa cccagcaaca ccaaggttga caagaaagtt gagcccaagt    720
cttgtgacaa gactcatacg tgtccaccgt gcccagcacc tgaacttctt ggaggaccgt    780
cagtcttctt gtttcctcca aagcctaagg ataccttgat gatctccagg actcctgaag    840
tcacatgtgt agttgtggat gtgagccatg aagatcctga ggtgaagttc aactggtatg    900
tggatggtgt ggaagtgcac aatgccaaga caaagccgag agaggaacag tacaacagca    960
cgtacagggt tgtctcagtt ctcactgttc tccatcaaga ttggttgaat ggcaaagagt   1020
acaagtgcaa ggtgtccaac aaagccctcc cagcccccat tgagaagacc atttccaaag   1080
cgaaagggca accccgtgaa ccacaagtgt acacacttcc tccatctcgc gatgaactga   1140
ccaagaacca ggtcagcttg acttgcctgg tgaaaggctt ctatccctct gacatagctg   1200
tagagtggga gagcaatggg caaccggaga caactacaa gactcacct cccgttctcg   1260 attctgacgg ctccttcttc ctctacagca agctcacagt ggacaagagc aggtggcaac   1320
aagggaatgt cttctcatgc tccgtgatgc atgaggctct tcacaatcac tacacacaga   1380
agagtctctc cttgtctccg ggtaaatga                                     1409
```

<210> SEQ ID NO 3
<211> LENGTH: 469
<212> TYPE: PRT
<213> ORGANISM: Artificial Sequence
<220> FEATURE:
<223> OTHER INFORMATION: SYNTHESIZED

<400> SEQUENCE: 3

```
Met Gly Trp Ser Cys Ile Ile Leu Phe Leu Val Ala Thr Ala Thr Gly
1               5                   10                  15

Val His Ser Gln Val Gln Leu Gln Gln Pro Gly Ala Ala Leu Val Lys
            20                  25                  30

Pro Gly Ala Ser Ala Met Met Ser Cys Lys Ala Ser Gly Tyr Thr Phe
        35                  40                  45

Thr Ser Tyr Trp Ile Thr Trp Val Lys Gln Arg Pro Gly Gln Gly Leu
    50                  55                  60

Glu Trp Ile Gly Asp Ile Tyr Pro Gly Thr Gly Arg Thr Ile Tyr Lys
65                  70                  75                  80

Glu Lys Phe Lys Thr Lys Ala Thr Leu Thr Val Asp Thr Ser Ser Ser
                85                  90                  95

Thr Ala Phe Met Gln Leu Asn Ser Leu Thr Ser Glu Asp Ser Ala Val
            100                 105                 110

Tyr Tyr Cys Ala Arg Gly Tyr Gly Ser Pro Tyr Tyr Ala Leu Asp Tyr
        115                 120                 125

Trp Gly Gln Gly Thr Ser Val Thr Val Ser Ser Ala Ser Thr Lys Gly
```

```
                130                 135                 140
Pro Ser Val Phe Pro Leu Ala Pro Ser Ser Lys Ser Thr Ser Gly Gly
145                 150                 155                 160

Thr Ala Ala Leu Gly Cys Leu Val Lys Asp Tyr Phe Pro Glu Pro Val
                165                 170                 175

Thr Val Ser Trp Asn Ser Gly Ala Leu Thr Ser Gly Val His Thr Phe
            180                 185                 190

Pro Ala Val Leu Gln Ser Ser Gly Leu Tyr Ser Leu Ser Ser Val Val
                195                 200                 205

Thr Val Pro Ser Ser Ser Leu Gly Thr Gln Thr Tyr Ile Cys Asn Val
            210                 215                 220

Asn His Lys Pro Ser Asn Thr Lys Val Asp Lys Val Glu Pro Lys
225                 230                 235                 240

Ser Cys Asp Lys Thr His Thr Cys Pro Pro Cys Pro Ala Pro Glu Leu
                245                 250                 255

Leu Gly Gly Pro Ser Val Phe Leu Phe Pro Pro Lys Pro Lys Asp Thr
                260                 265                 270

Leu Met Ile Ser Arg Thr Pro Glu Val Thr Cys Val Val Val Asp Val
            275                 280                 285

Ser His Glu Asp Pro Glu Val Lys Phe Asn Trp Tyr Val Asp Gly Val
        290                 295                 300

Glu Val His Asn Ala Lys Thr Lys Pro Arg Glu Glu Gln Tyr Asn Ser
305                 310                 315                 320

Thr Tyr Arg Val Val Ser Val Leu Thr Val Leu His Gln Asp Trp Leu
                325                 330                 335

Asn Gly Lys Glu Tyr Lys Cys Lys Val Ser Asn Lys Ala Leu Pro Ala
                340                 345                 350

Pro Ile Glu Lys Thr Ile Ser Lys Ala Lys Gly Gln Pro Arg Glu Pro
            355                 360                 365

Gln Val Tyr Thr Leu Pro Pro Ser Arg Asp Glu Leu Thr Lys Asn Gln
        370                 375                 380

Val Ser Leu Thr Cys Leu Val Lys Gly Phe Tyr Pro Ser Asp Ile Ala
385                 390                 395                 400

Val Glu Trp Glu Ser Asn Gly Gln Pro Glu Asn Asn Tyr Lys Thr Thr
                405                 410                 415

Pro Pro Val Leu Asp Ser Asp Gly Ser Phe Phe Leu Tyr Ser Lys Leu
                420                 425                 430

Thr Val Asp Lys Ser Arg Trp Gln Gln Gly Asn Val Phe Ser Cys Ser
            435                 440                 445

Val Met His Glu Ala Leu His Asn His Tyr Thr Gln Lys Ser Leu Ser
        450                 455                 460

Leu Ser Pro Gly Lys
465

<210> SEQ ID NO 4
<211> LENGTH: 720
<212> TYPE: DNA
<213> ORGANISM: Artificial Sequence
<220> FEATURE:
<223> OTHER INFORMATION: SYNTHESIZED

<400> SEQUENCE: 4
atgggatggt cttgtatcat ccttttcttg gttgcaacag ctactggtgt tcattctgat      60
atcgttttaa cacaatctcc agcatctttg gctgtttctc aaggacaaag ggctactatc     120
```

```
agttgcaagg cttctcaatc agtggactat gacggtgatt cttatgttaa ctggtaccaa    180
cagaaacctg gacagtcccc aaaacttctt atctacgacg catctaatct cgaatctgga    240
ataccagcca gattttctgg atctggatct ggaacagatt tcactcttaa catccatcct    300
gtcgaggaag aggatgttgc aacttattac tgtcaggaat caaatgaaga tccacgtact    360
ttcggtggag aactaagttt ggagatcaaa gctagcagaa ctgttgctgc accatctgtt    420
ttcatcttcc ctccatctga tgagcagttg aaatctggaa ctgcttctgt tgtgtgcctt    480
cttaataact tctatcctag agaggctaaa gttcagtgga aggtggataa cgcacttcaa    540
tctggtaact ctcaagagtc tgttacagag caagattcta aggactcaac ttactctctt    600
tcatctacac ttactttgtc aaaagcagat tacgagaaac acaaagttta cgcatgcgaa    660
gttactcatc aaggactttc ttccaccagtt acaaagtctt caatagagg agagtgttaa    720
```

<210> SEQ ID NO 5
<211> LENGTH: 239
<212> TYPE: PRT
<213> ORGANISM: Artificial Sequence
<220> FEATURE:
<223> OTHER INFORMATION: SYNTHESIZED

<400> SEQUENCE: 5

```
Met Gly Trp Ser Cys Ile Ile Leu Phe Leu Val Ala Thr Ala Thr Gly
1               5                   10                  15

Val His Ser Asp Ile Val Leu Thr Gln Ser Pro Ala Ser Leu Ala Val
                20                  25                  30

Ser Gln Gly Gln Arg Ala Thr Ile Ser Cys Lys Ala Ser Gln Ser Val
            35                  40                  45

Asp Tyr Asp Gly Asp Ser Tyr Val Asn Trp Tyr Gln Gln Lys Pro Gly
        50                  55                  60

Gln Ser Pro Lys Leu Leu Ile Tyr Asp Ala Ser Asn Leu Glu Ser Gly
65                  70                  75                  80

Ile Pro Ala Arg Phe Ser Gly Ser Gly Ser Gly Thr Asp Phe Thr Leu
                85                  90                  95

Asn Ile His Pro Val Glu Glu Glu Asp Val Ala Thr Tyr Tyr Cys Gln
            100                 105                 110

Glu Ser Asn Glu Asp Pro Arg Thr Phe Gly Gly Gly Thr Lys Leu Glu
        115                 120                 125

Ile Lys Ala Ser Arg Thr Val Ala Ala Pro Ser Val Phe Ile Phe Pro
130                 135                 140

Pro Ser Asp Glu Gln Leu Lys Ser Gly Thr Ala Ser Val Val Cys Leu
145                 150                 155                 160

Leu Asn Asn Phe Tyr Pro Arg Glu Ala Lys Val Gln Trp Lys Val Asp
                165                 170                 175

Asn Ala Leu Gln Ser Gly Asn Ser Gln Glu Ser Val Thr Glu Gln Asp
            180                 185                 190

Ser Lys Asp Ser Thr Tyr Ser Leu Ser Ser Thr Leu Thr Leu Ser Lys
        195                 200                 205

Ala Asp Tyr Glu Lys His Lys Val Tyr Ala Cys Glu Val Thr His Gln
    210                 215                 220

Gly Leu Ser Ser Pro Val Thr Lys Ser Phe Asn Arg Gly Glu Cys
225                 230                 235
```

<210> SEQ ID NO 6
<211> LENGTH: 1407
<212> TYPE: DNA

<213> ORGANISM: Artificial Sequence
<220> FEATURE:
<223> OTHER INFORMATION: SYNTHESIZED

<400> SEQUENCE: 6

```
atgggatggt cttgtatcat ccttttcttg gttgcaacag ctactggtgt tcattctgaa      60
gttaggttgg tggaatcagg aggcggtctt gagcagccag ggggttcact gaagctatct     120
tgtgcagctt ctggttttac attcagtgat tactttatgt attgggtgag acaaacccct     180
gagaaacgtc ttgagtgggt cgcctacatt agtaatgggg aatttccac tttctatagc      240
gatgcagtaa aaggaagatt cactatatcc agagacaacg ctagaaatac tctttatctc     300
caaatgtcta gattgaagtc agaagatact gctatctact attgtgttag gcaggtatat     360
ggccagggat actttgacta ttggggacaa ggtactactt tagcagtttc ttctgctagc     420
accaagggac cttctgtttt tccacttgct ccttcttcta gtctacttc tggtggaact      480
gctgctttgg gttgtttggt gaaagattac tttcctgagc cagtgaccgt ttcttggaac     540
tcaggtgctc ttacatctgg tgttcatact ttcccagctg ttcttcaatc ttcaggactt     600
tactcacttt cttctgttgt taccgttcct tcttcaagct gggcactca gacctacatc      660
tgcaatgtga atcacaaacc cagcaacacc aaggttgaca agaaagttga gcccaagtct     720
tgtgacaaga ctcatacgtg tccaccgtgc ccagcacctg aacttcttgg aggaccgtca     780
gtcttcttgt ttcctccaaa gcctaaggat accttgatga ctctccaggac tcctgaagtc     840
acatgtgtag ttgtggatgt gagccatgaa gatcctgagg tgaagttcaa ctggtatgtg     900
gatggtgtgg aagtgcacaa tgccaagaca agccgagag aggaacagta caacagcacg       960
tacagggttg tctcagttct cactgttctc catcaagatt ggttgaatgg caaagagtac    1020
aagtgcaagg tgtccaacaa agccctccca gcccccattg agaagaccat ttccaaagcg    1080
aaagggcaac cccgtgaacc acaagtgtac acacttcctc catctcgcga tgaactgacc    1140
aagaaccagg tcagcttgac ttgcctggtg aaaggcttct atccctctga catagctgta    1200
gagtgggaga gcaatgggca accggagaac aactacaaga ctacacctcc cgttctcgat    1260
tctgacggct ccttcttcct ctacagcaag ctcacagtgg acaagagcag gtggcaacaa    1320
gggaatgtct tctcatgctc cgtgatgcat gaggctcttc acaatcacta cacacagaag    1380
agtctctcct gtctccgggg taaatga                                        1407
```

<210> SEQ ID NO 7
<211> LENGTH: 468
<212> TYPE: PRT
<213> ORGANISM: Artificial Sequence
<220> FEATURE:
<223> OTHER INFORMATION: SYNTHESIZED

<400> SEQUENCE: 7

```
Met Gly Trp Ser Cys Ile Ile Leu Phe Leu Val Ala Thr Ala Thr Gly
1               5                   10                  15

Val His Ser Glu Val Arg Leu Val Glu Ser Gly Gly Gly Leu Glu Gln
            20                  25                  30

Pro Gly Gly Ser Leu Lys Leu Ser Cys Ala Ala Ser Gly Phe Thr Phe
        35                  40                  45

Ser Asp Tyr Phe Met Tyr Trp Val Arg Gln Thr Pro Glu Lys Arg Leu
    50                  55                  60

Glu Trp Val Ala Tyr Ile Ser Asn Gly Gly Ile Ser Thr Phe Tyr Ser
65                  70                  75                  80
```

```
Asp Ala Val Lys Gly Arg Phe Thr Ile Ser Arg Asp Asn Ala Arg Asn
                85                  90                  95

Thr Leu Tyr Leu Gln Met Ser Arg Leu Lys Ser Glu Asp Thr Ala Ile
            100                 105                 110

Tyr Tyr Cys Val Arg Gln Val Tyr Gly Gln Gly Tyr Phe Asp Tyr Trp
        115                 120                 125

Gly Gln Gly Thr Thr Leu Ala Val Ser Ser Ala Ser Thr Lys Gly Pro
    130                 135                 140

Ser Val Phe Pro Leu Ala Pro Ser Ser Lys Ser Thr Ser Gly Gly Thr
145                 150                 155                 160

Ala Ala Leu Gly Cys Leu Val Lys Asp Tyr Phe Pro Glu Pro Val Thr
                165                 170                 175

Val Ser Trp Asn Ser Gly Ala Leu Thr Ser Gly Val His Thr Phe Pro
            180                 185                 190

Ala Val Leu Gln Ser Ser Gly Leu Tyr Ser Leu Ser Ser Val Val Thr
        195                 200                 205

Val Pro Ser Ser Ser Leu Gly Thr Gln Thr Tyr Ile Cys Asn Val Asn
    210                 215                 220

His Lys Pro Ser Asn Thr Lys Val Asp Lys Lys Val Glu Pro Lys Ser
225                 230                 235                 240

Cys Asp Lys Thr His Thr Cys Pro Pro Cys Pro Ala Pro Glu Leu Leu
                245                 250                 255

Gly Gly Pro Ser Val Phe Leu Phe Pro Pro Lys Pro Lys Asp Thr Leu
            260                 265                 270

Met Ile Ser Arg Thr Pro Glu Val Thr Cys Val Val Val Asp Val Ser
        275                 280                 285

His Glu Asp Pro Glu Val Lys Phe Asn Trp Tyr Val Asp Gly Val Glu
    290                 295                 300

Val His Asn Ala Lys Thr Lys Pro Arg Glu Glu Gln Tyr Asn Ser Thr
305                 310                 315                 320

Tyr Arg Val Val Ser Val Leu Thr Val Leu His Gln Asp Trp Leu Asn
                325                 330                 335

Gly Lys Glu Tyr Lys Cys Lys Val Ser Asn Lys Ala Leu Pro Ala Pro
            340                 345                 350

Ile Glu Lys Thr Ile Ser Lys Ala Lys Gly Gln Pro Arg Glu Pro Gln
        355                 360                 365

Val Tyr Thr Leu Pro Pro Ser Arg Asp Glu Leu Thr Lys Asn Gln Val
    370                 375                 380

Ser Leu Thr Cys Leu Val Lys Gly Phe Tyr Pro Ser Asp Ile Ala Val
385                 390                 395                 400

Glu Trp Glu Ser Asn Gly Gln Pro Glu Asn Asn Tyr Lys Thr Thr Pro
                405                 410                 415

Pro Val Leu Asp Ser Asp Gly Ser Phe Phe Leu Tyr Ser Lys Leu Thr
            420                 425                 430

Val Asp Lys Ser Arg Trp Gln Gln Gly Asn Val Phe Ser Cys Ser Val
        435                 440                 445

Met His Glu Ala Leu His Asn His Tyr Thr Gln Lys Ser Leu Ser Leu
    450                 455                 460

Ser Pro Gly Lys
465

<210> SEQ ID NO 8
<211> LENGTH: 714
<212> TYPE: DNA
```

<210> SEQ ID NO 8
<211> LENGTH: 714
<212> TYPE: DNA
<213> ORGANISM: Artificial Sequence
<220> FEATURE:
<223> OTHER INFORMATION: SYNTHESIZED

<400> SEQUENCE: 8

```
atgggatggt cttgtatcat ccttttcttg gttgcaacag ctactggtgt tcattctcaa      60
atcgttctga ttcaatctcc agcaattatg tctgcttctc ttggagagag ggtgactatg     120
acttgcaccg ctagtagctc tgtttcaagt tcttatttgc actggtacca acagaaacct     180
ggatcatcac caaaactttg gatctactcc tcattttctt tagcatctgg agttccagcc     240
agattttctg gatctggatc tggaacatcc tatagcctta ctatctcaac aatggaagct     300
gaggatgctg caacatatta ctgtcatcag tatctccgtt ccccatggac tttcggtgga     360
ggaagtaagt tggagatcaa agctagcaga actgttgctg caccatctgt tttcatcttc     420
cctccatctg atgagcagtt gaaatctgga actgcttctg ttgtgtgcct tcttaataac     480
ttctatccta gagaggctaa agttcagtgg aaggtggata acgcacttca atctggtaac     540
tctcaagagt ctgttacaga gcaagattct aaggactcaa cttactctct tcatctaca      600
cttactttgt caaaagcaga ttacgagaaa cacaaagttt acgcatgcga agttactcat     660
caaggacttt cttcaccagt tacaaagtct ttcaatagag agagtgttta atga           714
```

<210> SEQ ID NO 9
<211> LENGTH: 236
<212> TYPE: PRT
<213> ORGANISM: Artificial Sequence
<220> FEATURE:
<223> OTHER INFORMATION: SYNTHESIZED

<400> SEQUENCE: 9

Met Gly Trp Ser Cys Ile Ile Leu Phe Leu Val Ala Thr Ala Thr Gly
1               5                   10                  15

Val His Ser Gln Ile Val Leu Ile Gln Ser Pro Ala Ile Met Ser Ala
            20                  25                  30

Ser Leu Gly Glu Arg Val Thr Met Thr Cys Thr Ala Ser Ser Ser Val
        35                  40                  45

Ser Ser Ser Tyr Leu His Trp Tyr Gln Gln Lys Pro Gly Ser Ser Pro
    50                  55                  60

Lys Leu Trp Ile Tyr Ser Ser Phe Ser Leu Ala Ser Gly Val Pro Ala
65                  70                  75                  80

Arg Phe Ser Gly Ser Gly Ser Gly Thr Ser Tyr Ser Leu Thr Ile Ser
                85                  90                  95

Thr Met Glu Ala Glu Asp Ala Ala Thr Tyr Tyr Cys His Gln Tyr Leu
            100                 105                 110

Arg Ser Pro Trp Thr Phe Gly Gly Gly Ser Lys Leu Glu Ile Lys Ala
        115                 120                 125

Ser Arg Thr Val Ala Ala Pro Ser Val Phe Ile Phe Pro Pro Ser Asp
    130                 135                 140

Glu Gln Leu Lys Ser Gly Thr Ala Ser Val Val Cys Leu Leu Asn Asn
145                 150                 155                 160

Phe Tyr Pro Arg Glu Ala Lys Val Gln Trp Lys Val Asp Asn Ala Leu
                165                 170                 175

Gln Ser Gly Asn Ser Gln Glu Ser Val Thr Glu Gln Asp Ser Lys Asp
            180                 185                 190

Ser Thr Tyr Ser Leu Ser Ser Thr Leu Thr Leu Ser Lys Ala Asp Tyr
        195                 200                 205

```
Glu Lys His Lys Val Tyr Ala Cys Glu Val Thr His Gln Gly Leu Ser
    210                 215                 220
Ser Pro Val Thr Lys Ser Phe Asn Arg Gly Glu Cys
225                 230                 235
```

<210> SEQ ID NO 10
<211> LENGTH: 432
<212> TYPE: DNA
<213> ORGANISM: Artificial Sequence
<220> FEATURE:
<223> OTHER INFORMATION: SYNTHESIZED

<400> SEQUENCE: 10

```
gaattcacaa tgggatggtc ttgtatcatc cttttcttgg ttgcaacagc tactggtgtt      60
cattctcaag ttcaattgca gcagcctggt gcagctctcg tgaagccagg tgcttcagca     120
atgatgtctt gtaaggcttc tggttacaca ttcacaagct attggattac atgggtgaaa     180
caaagacctg gtcagggtct tgagtggata ggagatattt atcccggaac tggaagaact     240
atctacaaag agaagtttaa aaccaaggct actctgactg tagataccag ttcttctact     300
gcttttatgc aacttaattc tttgacatca gaagatagtg ctgtgtacta ttgtgctagg     360
gggtatggct caccatatta cgctttagac tattggggac aaggtacttc cgttactgtg     420
tcttctgcta gc                                                         432
```

<210> SEQ ID NO 11
<211> LENGTH: 141
<212> TYPE: PRT
<213> ORGANISM: Artificial Sequence
<220> FEATURE:
<223> OTHER INFORMATION: SYNTHESIZED

<400> SEQUENCE: 11

```
Met Gly Trp Ser Cys Ile Ile Leu Phe Leu Val Ala Thr Ala Thr Gly
1               5                   10                  15

Val His Ser Gln Val Gln Leu Gln Gln Pro Gly Ala Ala Leu Val Lys
            20                  25                  30

Pro Gly Ala Ser Ala Met Met Ser Cys Lys Ala Ser Gly Tyr Thr Phe
        35                  40                  45

Thr Ser Tyr Trp Ile Thr Trp Val Lys Gln Arg Pro Gly Gln Gly Leu
    50                  55                  60

Glu Trp Ile Gly Asp Ile Tyr Pro Gly Thr Gly Arg Thr Ile Tyr Lys
65                  70                  75                  80

Glu Lys Phe Lys Thr Lys Ala Thr Leu Thr Val Asp Thr Ser Ser Ser
                85                  90                  95

Thr Ala Phe Met Gln Leu Asn Ser Leu Thr Ser Glu Asp Ser Ala Val
            100                 105                 110

Tyr Tyr Cys Ala Arg Gly Tyr Gly Ser Pro Tyr Tyr Ala Leu Asp Tyr
        115                 120                 125

Trp Gly Gln Gly Thr Ser Val Thr Val Ser Ser Ala Ser
    130                 135                 140
```

<210> SEQ ID NO 12
<211> LENGTH: 399
<212> TYPE: DNA
<213> ORGANISM: Artificial Sequence
<220> FEATURE:
<223> OTHER INFORMATION: SYNTHESIZED

<400> SEQUENCE: 12

```
gaattcacaa tgggatggtc ttgtatcatc ctttcttgg ttgcaacagc tactggtgtt    60
cattctgata tcgttttaac acaatctcca gcatctttgg ctgtttctca aggacaaagg   120
gctactatca gttgcaaggc ttctcaatca gtggactatg acggtgattc ttatgttaac   180
tggtaccaac agaaacctgg acagtcccca aaacttctta tctacgacgc atctaatctc   240
gaatctggaa taccagccag attttctgga tctggatctg aacagatttt cactcttaac   300
atccatcctg tcgaggaaga ggatgttgca acttattact gtcaggaatc aaatgaagat   360
ccacgtactt tcggtggagg aactaagttg gagatcaaa                         399
```

<210> SEQ ID NO 13
<211> LENGTH: 130
<212> TYPE: PRT
<213> ORGANISM: Artificial Sequence
<220> FEATURE:
<223> OTHER INFORMATION: SYNTHESIZED

<400> SEQUENCE: 13

```
Met Gly Trp Ser Cys Ile Ile Leu Phe Leu Val Ala Thr Ala Thr Gly
1               5                   10                  15

Val His Ser Asp Ile Val Leu Thr Gln Ser Pro Ala Ser Leu Ala Val
            20                  25                  30

Ser Gln Gly Gln Arg Ala Thr Ile Ser Cys Lys Ala Ser Gln Ser Val
        35                  40                  45

Asp Tyr Asp Gly Asp Ser Tyr Val Asn Trp Tyr Gln Gln Lys Pro Gly
    50                  55                  60

Gln Ser Pro Lys Leu Leu Ile Tyr Asp Ala Ser Asn Leu Glu Ser Gly
65                  70                  75                  80

Ile Pro Ala Arg Phe Ser Gly Ser Gly Ser Gly Thr Asp Phe Thr Leu
                85                  90                  95

Asn Ile His Pro Val Glu Glu Glu Asp Val Ala Thr Tyr Tyr Cys Gln
            100                 105                 110

Glu Ser Asn Glu Asp Pro Arg Thr Phe Gly Gly Gly Thr Lys Leu Glu
        115                 120                 125

Ile Lys
    130
```

<210> SEQ ID NO 14
<211> LENGTH: 429
<212> TYPE: DNA
<213> ORGANISM: Artificial Sequence
<220> FEATURE:
<223> OTHER INFORMATION: SYNTHESIZED

<400> SEQUENCE: 14

```
gaattcacaa tgggatggtc ttgtatcatc ctttcttgg ttgcaacagc tactggtgtt    60
cattctgaag ttaggttggt ggaatcagga ggcggtcttg agcagccagg gggttcactg   120
aagctatctt gtcagcttc tggttttaca ttcagtgatt actttatgta ttgggtgaga   180 caaaccctg agaacgtct tgagtgggtc gcctacatta gtaatggggg aatttccact   240
ttctatagcg atgcagtaaa aggaagattc actatatcca gagacaacgc tagaaatact   300 cttatctcc aaatgtctag attgaagtca gaagatactg ctatctacta ttgtgttagg   360
caggtatatg gccagggata cttgactat tggggacaag gtactacttt agcagtttct   420
tctgctagc                                                          429
```

<210> SEQ ID NO 15

<211> LENGTH: 140
<212> TYPE: PRT
<213> ORGANISM: Artificial Sequence
<220> FEATURE:
<223> OTHER INFORMATION: SYNTHESIZED

<400> SEQUENCE: 15

Met Gly Trp Ser Cys Ile Ile Leu Phe Leu Val Ala Thr Ala Thr Gly
1               5                   10                  15

Val His Ser Glu Val Arg Leu Val Glu Ser Gly Gly Gly Leu Glu Gln
            20                  25                  30

Pro Gly Gly Ser Leu Lys Leu Ser Cys Ala Ala Ser Gly Phe Thr Phe
        35                  40                  45

Ser Asp Tyr Phe Met Tyr Trp Val Arg Gln Thr Pro Glu Lys Arg Leu
    50                  55                  60

Glu Trp Val Ala Tyr Ile Ser Asn Gly Gly Ile Ser Thr Phe Tyr Ser
65                  70                  75                  80

Asp Ala Val Lys Gly Arg Phe Thr Ile Ser Arg Asp Asn Ala Arg Asn
                85                  90                  95

Thr Leu Tyr Leu Gln Met Ser Arg Leu Lys Ser Glu Asp Thr Ala Ile
            100                 105                 110

Tyr Tyr Cys Val Arg Gln Val Tyr Gly Gln Gly Tyr Phe Asp Tyr Trp
        115                 120                 125

Gly Gln Gly Thr Thr Leu Ala Val Ser Ser Ala Ser
        130                 135                 140

<210> SEQ ID NO 16
<211> LENGTH: 390
<212> TYPE: DNA
<213> ORGANISM: Artificial Sequence
<220> FEATURE:
<223> OTHER INFORMATION: SYNTHESIZED

<400> SEQUENCE: 16
gaattcacaa tgggatggtc ttgtatcatc cttttcttgg ttgcaacagc tactggtgtt      60
cattctcaaa tcgttctgat tcaatctcca gcaattatgt ctgcttctct tggagagagg     120
gtgactatga cttgcaccgc tagtagctct gtttcaagtt cttatttgca ctggtaccaa     180
cagaaacctg gatcatcacc aaaactttgg atctactcct cattttcttt agcatctgga     240
gttccagcca gattttctgg atctggatct ggaacatcct atagccttac tatctcaaca     300
atggaagctg aggatgctgc aacatattac tgtcatcagt atctccgttc cccatggact     360
ttcggtggag gaagtaagtt ggagatcaaa                                      390

<210> SEQ ID NO 17
<211> LENGTH: 127
<212> TYPE: PRT
<213> ORGANISM: Artificial Sequence
<220> FEATURE:
<223> OTHER INFORMATION: SYNTHESIZED

<400> SEQUENCE: 17

Met Gly Trp Ser Cys Ile Ile Leu Phe Leu Val Ala Thr Ala Thr Gly
1               5                   10                  15

Val His Ser Gln Ile Val Leu Ile Gln Ser Pro Ala Ile Met Ser Ala
            20                  25                  30

Ser Leu Gly Glu Arg Val Thr Met Thr Cys Thr Ala Ser Ser Ser Val
        35                  40                  45

Ser Ser Ser Tyr Leu His Trp Tyr Gln Gln Lys Pro Gly Ser Ser Pro

```
                50                  55                  60
Lys Leu Trp Ile Tyr Ser Ser Phe Ser Leu Ala Ser Gly Val Pro Ala
 65                  70                  75                  80

Arg Phe Ser Gly Ser Gly Ser Gly Thr Ser Tyr Ser Leu Thr Ile Ser
                 85                  90                  95

Thr Met Glu Ala Glu Asp Ala Ala Thr Tyr Tyr Cys His Gln Tyr Leu
                100                 105                 110

Arg Ser Pro Trp Thr Phe Gly Gly Gly Ser Lys Leu Glu Ile Lys
                115                 120                 125
```

PLANT-PRODUCED MABS AGAINST CHIKUNGUNYA VIRUS WITH ENHANCED EFFECTOR FUNCTION AND EFFICACY

CROSS-REFERENCE TO RELATED APPLICATIONS

This application is a U.S. National Stage Application of International Application No. PCT/US2020/036136, filed Jun. 4, 2020, which claims priority from U.S. Patent Application No. 62/857,081, filed Jun. 4, 2019, the contents of which are hereby incorporated by reference in their entirety.

SEQUENCE LISTING

This application contains a Sequence Listing that has been submitted in ASCII format via EFS-Web and is hereby incorporated by reference in its entirety. The ASCII copy is named 655415_Sequencelisting_ST25.txt, and is 45 kilobytes in size.

FIELD OF THE INVENTION

The present disclosure generally relates to monoclonal antibodies against Chikungunya virus having enhanced effector function and efficacy.

BACKGROUND OF THE INVENTION

Infection of CHIKV in humans can cause debilitating polyarthralgia that may persist months to years and affects multiple joints including ankles, knees, wrists, and fingers. Some of the symptoms are caused by the self-damaging host immune responses to CHIKV infection. Since 2004, CHIKV reemergence has resulted in millions of cases of severe and often chronic arthralgia on five continents. Currently, no licensed therapeutics or vaccines are available for human use against CHIKV. Continued outbreaks of CHIKV and the risk of it spreading into new areas call for the urgent development of effective preventatives and therapeutics.

Increasingly, greater attention is being focused on the production and use of larger and more complex protein molecules as therapeutic agents. Examples of such therapeutic proteins include antigens used in vaccinations to induce immune responses and antibodies. The potential utility of antibodies as efficacious anti-CHIKV therapeutics was suggested by early vaccine studies showing that vaccine potency correlates with its ability of inducing neutralizing antibodies in mice. Neutralizing antibodies from past infections in humans also shows evidence of protectivity, as these subjects are immune to CHIKV reinfection. Monoclonal antibodies (mAbs) against CHIKV E1 and E2 have been shown to be protective against CHIKV infection in various mouse models.

A need remains however for mAbs against CHIKV with enhanced efficacy in humans, and for improved methods of making such mAbs.

SUMMARY OF THE INVENTION

One aspect of the present disclosure encompasses a monoclonal antibody having specificity to Chikungunya virus (CHIKV) E1 or E2 protein. The antibody is a glycosylated IgG antibody comprising a targeted, defined N-linked glycan profile of the Fc domain of at least one of the heavy chains with a high degree of glycan uniformity (homogeneity). The glycan profile can be an N-linked GlcNAc2Man3GlcNAc2 (GnGn) core glycan, (Man=Mannose, GlcNAc=N-acetylglucosamine), and the glycosylation profile can be more than about 95% uniform.

The antibody can be produced in a plant, plant fragment or plant cell. The plant can be ΔXFT *N. benthamiana*.

The antibody can be a human antibody. The antibody can comprise a heavy chain comprising an amino acid sequence at least 90% identical to SEQ. ID NO: 3; and a light chain comprising an amino acid sequence at least 90% identical to SEQ. ID NO: 5. The antibody can also comprise a heavy chain variable domain encoded by an amino acid sequence with at least about 90% identity to SEQ ID NO: 11; and a light chain variable domain encoded by an amino acid sequence with at least about 90% identity to SEQ ID NO: 13.

The antibody can comprise a heavy chain comprising an amino acid sequence at least 90% identical to SEQ. ID NO: 7; and a light chain comprising an amino acid sequence at least 90% identical to SEQ. ID NO: 9. The antibody can also comprise a heavy chain variable domain encoded by an amino acid sequence with at least about 90% identity to SEQ ID NO: 15; and a light chain variable domain encoded by an amino acid sequence with at least about 90% identity to SEQ ID NO: 17.

In some aspects, the antibody does not contribute to antibody-dependent enhancement (ADE) of virus infection. In an alternative of the aspects, the antibody does not contribute to antibody-dependent enhancement (ADE) of dengue virus infection.

Another aspect of the present disclosure encompasses a plant, plant fragment, or plant cell comprising a monoclonal antibody having specificity to CHIKV E1 or E2 protein, wherein the antibody is a glycosylated IgG antibody comprising a targeted, defined N-linked glycan profile of the Fc domain of at least one of the heavy chains with a high degree of glycan uniformity (homogeneity). The glycosylation profile can be an N-linked GlcNAc2Man3GlcNAc2 (GnGn) core glycan. (Man=Mannose, GlcNAc=N-acetylglucosamine). The plant can be ΔXFT *N. benthamiana*. In some aspects, the antibody does not contribute to antibody-dependent enhancement (ADE) of virus infection. In an alternative of the aspects, the antibody does not contribute to antibody-dependent enhancement (ADE) of dengue virus infection.

Yet another aspect of the present disclosure encompasses a composition for the prevention or treatment of CHIKV. The composition comprises a prophylactically or therapeutically effective amount of a monoclonal antibody having specificity to CHIKV E1 or E2 protein. The antibody is a glycosylated IgG antibody comprising a targeted, defined N-linked glycan profile of the Fc domain of at least one of the heavy chains with a high degree of glycan uniformity (homogeneity).

One aspect of the present disclosure encompasses a monoclonal antibody having specificity to CHIKV E1 protein. The antibody comprises a heavy chain variable domain encoded by an amino acid sequence with at least about 90% identity to SEQ ID NO: 11; and a light chain variable domain comprising an amino acid sequence at least 90% identical to SEQ. ID NO: 13, wherein the antibody is a glycosylated IgG antibody comprising a targeted, defined N-linked glycan profile of the Fc domain of at least one of the heavy chains with a high degree of glycan uniformity (homogeneity). The antibody can comprise a heavy chain encoded by an amino acid sequence with at least about 90% identity to SEQ ID NO: 3 and a light chain encoded by an amino acid sequence with at least about 90% identity to SEQ ID NO: 5. The glycosylation profile can be an N-linked GlcNAc2Man3GlcNAc2 (GnGn) core glycan.

(Man=Mannose, GlcNAc=N-acetylglucosamine). In some aspects, the antibody does not contribute to antibody-dependent enhancement (ADE) of virus infection. In an alternative of the aspects, the antibody does not contribute to antibody-dependent enhancement (ADE) of dengue virus infection.

Another aspect of the present disclosure encompasses a monoclonal antibody having specificity to CHIKV E1 protein. The antibody comprises a heavy chain encoded by an amino acid sequence with at least about 90% identity to SEQ ID NO: 7; and a light chain encoded by an amino acid sequence with at least about 90% identity to SEQ ID NO: 9, wherein the antibody is a glycosylated IgG antibody comprising a targeted, defined N-linked glycan profile of the Fc domain of at least one of the heavy chains with a high degree of glycan uniformity (homogeneity). The antibody can comprise a heavy chain encoded by an amino acid sequence with at least about 90% identity to SEQ ID NO: 15; and a light chain comprising an amino acid sequence at least 90% identical to SEQ. ID NO: 17. The glycosylation profile can be an N-linked GlcNAc2Man3GlcNAc2 (GnGn) core glycan. (Man=Mannose, GlcNAc=N-acetylglucosamine). In some aspects, the antibody does not contribute to antibody-dependent enhancement (ADE) of virus infection. In an alternative of the aspects, the antibody does not contribute to antibody-dependent enhancement (ADE) of dengue virus infection.

An additional aspect of the present disclosure encompasses a method of producing monoclonal antibody having specificity to CHIKV E1 or E2 protein. The method comprises introducing into a plant expression system, one or more vectors for the expression of an anti-CHKV E1 or E2 antibody wherein the plant expression system is genetically engineered to produce a defined N-glycan profile. The plant expression system can be ΔXFT N. benthamiana. The glycan profile can be an N-linked GlcNAc2Man3GlcNAc2 (GnGn) core glycan. (Man=Mannose, GlcNAc=N-acetylglucosamine). The vector can be a geminiviral vector. The vector can comprise a nucleic acid sequence at least 90% identical to SEQ ID NO: 2 and a nucleic acid sequence at least 90% identical to SEQ ID NO: 4. Alternatively, the vector comprises a nucleic acid sequence at least 90% identical to SEQ ID NO: 6 and a nucleic acid sequence at least 90% identical to SEQ ID NO: 8. The vector can also comprise a nucleic acid sequence at least 90% identical to SEQ ID NO: 10 and a nucleic acid sequence at least 90% identical to SEQ ID NO: 12 or a nucleic acid sequence at least 90% identical to SEQ ID NO: 14 and a nucleic acid sequence at least 90% identical to SEQ ID NO: 16. In some aspects, the antibody does not contribute to antibody-dependent enhancement (ADE) of virus infection. In an alternative of the aspects, the antibody does not contribute to antibody-dependent enhancement (ADE) of dengue virus infection.

Yet an additional aspect of the present disclosure encompasses a method of treating and preventing infections by CHIKV in a subject in need thereof, the method comprising administering antibodies having specificity to CHIKV E1 or E2 protein to the subject. In some aspects, the antibody does not contribute to antibody-dependent enhancement (ADE) of virus infection. In an alternative of the aspects, the antibody does not contribute to antibody-dependent enhancement (ADE) of dengue virus infection.

Another additional aspect of the present disclosure encompasses a monoclonal antibody having specificity to Chikungunya virus (CHIKV) E1 or E2 protein. The antibody is a glycosylated IgG antibody comprising a targeted, defined N-linked glycan profile of the Fc domain of at least one of the heavy chains of the antibody with a high degree of glycan uniformity (homogeneity). Further, the antibody does not contribute to antibody-dependent enhancement of virus infection.

One aspect of the present disclosure encompasses a kit comprising one or more of the anti-CHICKV monoclonal antibodies, one or more of the compositions, one or more of the plants, plant fragments, or plant cells, described herein, or combinations thereof. The antibody can comprise a heavy chain comprising an amino acid sequence at least 90% identical to SEQ. ID NO: 3; and a light chain comprising an amino acid sequence at least 90% identical to SEQ. ID NO: 5. The antibody can also comprise a heavy chain variable domain encoded by an amino acid sequence with at least about 90% identity to SEQ ID NO: 11; and a light chain variable domain encoded by an amino acid sequence with at least about 90% identity to SEQ ID NO: 13. In some aspects, a heavy chain comprising an amino acid sequence at least 90% identical to SEQ. ID NO: 7; and a light chain comprising an amino acid sequence at least 90% identical to SEQ. ID NO: 9. In other aspects, the antibody comprises a heavy chain variable domain encoded by an amino acid sequence with at least about 90% identity to SEQ ID NO: 15; and a light chain variable domain encoded by an amino acid sequence with at least about 90% identity to SEQ ID NO: 17. In some aspects, the antibody does not contribute to antibody-dependent enhancement (ADE) of dengue virus infection.

BRIEF DESCRIPTION OF THE FIGURES

FIG. 4A. Graph of the neutralizing activity of CHKV 152 and CHKV 166. Dilutions of WTCHKV 152 and GnGnCHKV 152 were co-incubated with 100 PFU of CHIKV and Vero cells for 3 days. Plaques were counted and percent neutralization and EC$_{50}$ were calculated. Experiments were performed twice with technical triplicates for each sample. Bars represent the standard deviation (SD) of the mean.

FIG. 4B. Bar graph of the neutralizing activity of CHKV 152 and CHKV 166. Dilutions dilutions of WTCHKV 166, GnGnCHKV 166 or a plant-produced anti-WNV E16 mAb (WNV E16, negative control) were co-incubated with 100 PFU of CHIKV and Vero cells for 3 days. Plaques were counted and percent neutralization and EC$_{50}$ were calculated. Experiments were performed twice with technical triplicates for each sample. Bars represent the standard deviation (SD) of the mean.

FIG. 5A. Bar graph showing prophylactic treatment with plant-produced CHKV 152 reduces CHKV viremia in mice. Wild-type C57BL/6J mice (N=6 per group) were subcutaneously infected with 1×10$^5$ PFUs of CHKV or PBS (mock) and treated intraperitoneally with 50-100 μg of indicated CHKV 152 glycovariants or PBS (negative control) 24 hr before infection. Viral load in blood at day 2 dpi is presented as a ratio of CHIKV E1 copy number per 1000 copy of cellular β-actin.

FIG. 5B. Graph of prophylactic treatment with plant-produced CHKV 152 eliminates footpad swelling in mice. Wild-type C57BL/6J mice (N=6 per group) were subcutaneously infected with 1×10$^5$ PFUs of CHIKV or PBS (mock) and treated intraperitoneally with 50 μg of indicated CHKV 152 glycovariants or PBS (negative control) 24 hr before infection. Footpad swelling was measured daily from 0 to 10 dpi and expressed as the relative increase in footpad compared to pre-infection.

FIG. 6A. Bar graph of post-exposure treatment with plant-derived CHKV 152 reduces CHIKV viremia. Wild-type C57BL/6J mice (N=6 per group) were subcutaneously infected with 1×10$^5$ PFUs of CHIKV or PBS (mock) and treated intraperitoneally with 50-100 μg of indicated CHKV 152 glycovariants or PBS (negative control) 12 hr after infection. Viral load in blood at day 2 dpi is presented as a ratio of CHIKV E1 copy number per 1000 copy of cellular β-actin.

FIG. 7A. Graph showing that GnGnCHKV 152 is more potent in reducing footpad swelling in CHIKV-infected mice than WTCHKV 152. Wild-type C57BL/6J mice (N=6 per group) were subcutaneously infected with 1×10$^5$ PFUs of CHIKV or PBS (mock) and treated intraperitoneally with 50 μg of indicated CHKV 152 glycovariants or PBS (negative control) 12 hr after infection. Footpad swelling was measured daily from 0 to 10 dpi and expressed as the relative increase in footpad compared to pre-infection. ** and  indicate p values <0.0001 and p<0.0015, respectively.

FIG. 7B. Bar plot showing that GnGnCHKV 152 is more potent in reducing footpad swelling in CHIKV-infected mice than WTCHKV 152. Wild-type C57BL/6J mice (N=6 per group) were subcutaneously infected with 1×10$^5$ PFUs of CHIKV or PBS (mock) and treated intraperitoneally with 50 μg of indicated CHKV 152 glycovariants or PBS (negative control) 12 hr after infection. Footpad swelling was measured daily from 0 to 10 dpi and expressed as the relative increase in footpad compared to pre-infection. ** and  indicate p values <0.0001and p<0.0015, respectively.

FIG. 8A. Bar plot showing that GnGnCHKV 152 has more potent natural killer cell-mediated ADCC activity against CHIKV infected cells than WTCHKV 152. Uninfected Vero cells were loaded with Calcein AM and then incubated with the indicated concentrations of CHKV 152 glycovariants or an isotype control IgG (hIgG, negative control). NK cells were then added to Vero cells at an E/T ratio of 1.25:1. Vero cell lysis by NK cells is expressed by the % of non-spontaneous VERO cell lysis in the presence of NK cells/maximal lysis by detergent treatment.

FIG. 8B. Bar plot showing that GnGnCHKV 152 has more potent natural killer cell-mediated ADCC activity against CHIKV infected cells than WTCHKV 152. CHIKV-infected Vero cells were loaded with Calcein AM and then incubated with the indicated concentrations of CHKV 152 glycovariants or an isotype control IgG (hIgG, negative control). NK cells were then added to Vero cells at an E/T ratio of 1.25:1. Vero cell lysis by NK cells is expressed by the % of non-spontaneous VERO cell lysis in the presence of NK cells/maximal lysis by detergent treatment. **** indicates p value <0.0001.

DETAILED DESCRIPTION

Figure 1A:
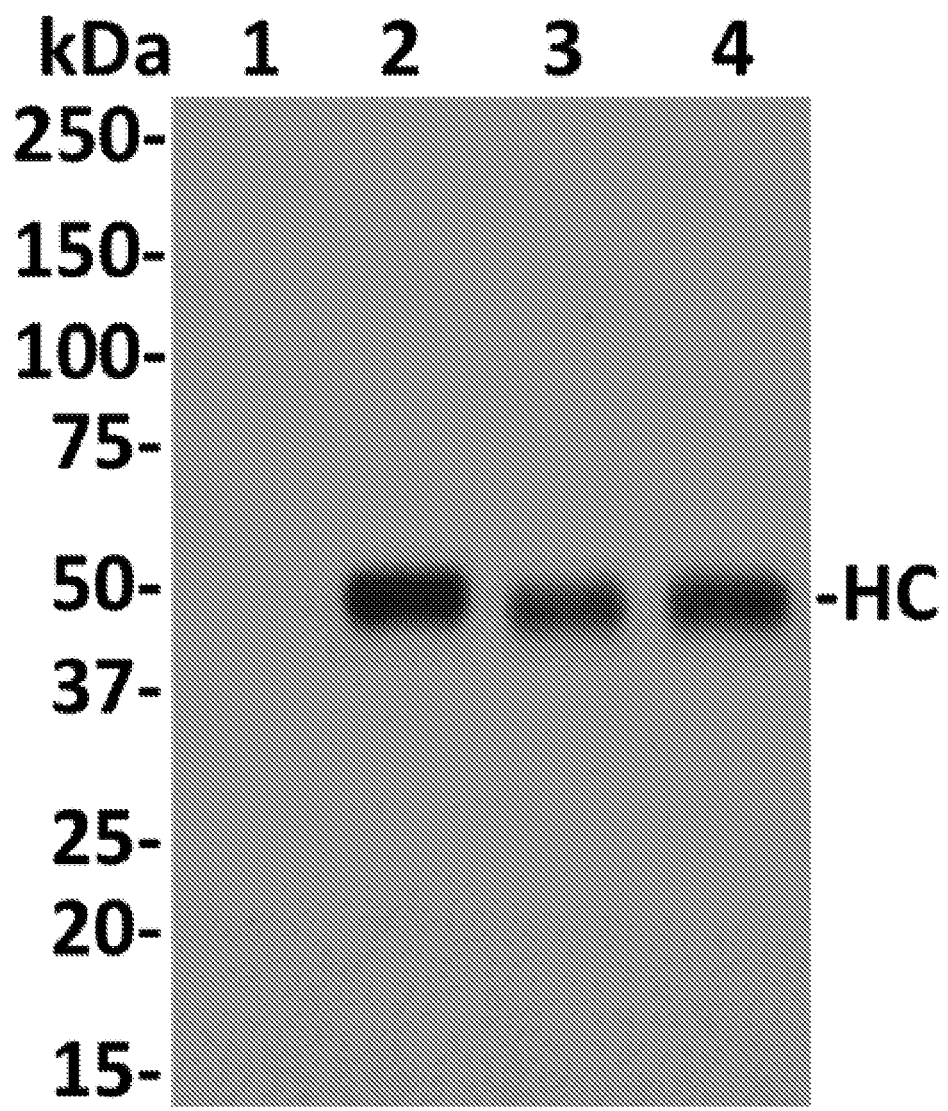
FIG. 1A. Western blot analysis of plant-produced CHKV 166. CHKV 166 was extracted from WT or ΔXFT N. benthamiana leaves, separated on SDS-PAGE gels under reducing and blotted onto PVDF membranes. A goat anti-human gamma chain antibody was incubated with the membranes to detect heavy chain or light chain. Lane 1, protein sample extracted from non-infiltrated leaves; Lane 2, mammalian cell-produced anti-WNV E16 mAb as a reference standard; Lane 3, sample from leaves of WT plants infiltrated with CHKV 166 constructs; Lane 4, sample from leaves of ΔXFT plants infiltrated with CHKV 166 constructs. HC: heavy chain, LC: light chain, (HL)$_2$: assembled mAb with 2 light and heavy chains.

The present disclosure encompasses glycosylated antibodies comprising targeted, defined, and uniform glycosylation profiles, and methods of producing the antibodies. The methods were used to produce anti-CHIKV glycosylated antibodies having enhanced effector functions. Importantly, the antibodies exhibit improved effector functions, all while retaining the binding activity and affinity of the antibody to a specific target.

I. Composition

One aspect of the present disclosure encompasses a monoclonal antibody. In an aspect, antibodies useful herein include those antibodies which have been isolated, characterized, purified, are functional and have been recovered (obtained) for use in a functional therapeutic composition which is administered to a living patient.

The term "antibody" refers to an immunoglobulin molecule capable of specific binding to a target, such as a carbohydrate, polynucleotide, lipid, or polypeptide through at least one antigen recognition site. As used herein, an antibody encompasses not only intact polyclonal or monoclonal antibodies, but also fragments thereof (such as Fab, Fab', F(ab')2. Fv), Fc, single chain (ScFv), mutants thereof, fusion proteins comprising an antibody portion, humanized antibodies, chimeric antibodies, diabodies, linear antibodies, single chain antibodies, multispecific antibodies (e.g., bispecific antibodies) and any other modified configuration of the immunoglobulin molecule that comprises an antigen recognition site of the required specificity.

Depending on the antibody amino acid sequence of the constant domain of its heavy chains, immunoglobulins can be assigned to different classes. In mammals, heavy-chains are classified as alpha, delta, epsilon, gamma, or mu, and define the antibody's isotype as IgA, IgD, IgE, IgG, and IgM, respectively. Several of these isotypes may be further divided into subclasses (isotypes), e.g., IgG1, IgG2, IgG3, IgG4, IgA1 and IgA2. Light chains are classified as kappa and lambda.

Antibodies of the instant disclosure can be of any class, such as IgG, IgA, or IgM (or sub-class thereof), or the antibody need not be of any particular class. Further, intact monoclonal antibodies and full-length monoclonal antibodies are contemplated. As long as the protein retains the ability specifically to bind its intended target, it is included within the term "antibody." In some aspects, the antibody is an IgG antibody.

The antibodies of the disclosure can be monoclonal antibodies. "Monoclonal antibody" (mAb) refers to an antibody that is derived from a single copy or clone. A monoclonal antibody is not limited to antibodies produced through hybridoma technology. Monoclonal antibodies may be produced using e.g., hybridoma techniques well known in the art, as well as recombinant technologies, phage display technologies, synthetic technologies, plant expression systems, or combinations of such technologies and other technologies readily known in the art.

Antibodies useful herein include those that are isolated, characterized, purified, functional, and have been recovered (obtained) from a process for their preparation and thus available for use herein in a useful form in a therapeutically and medicinally sufficient amount. In some aspects, the antibodies are generated in plants as described in Section II(a) below.

Antibodies with appropriate specificity can be generated by standard techniques of immunization of mammals, forming hybridomas from the antibody-producing cells of said mammals or otherwise immortalizing them, and culturing the hybridomas or immortalized cells to assess them for the appropriate specificity. Antibodies may be generated by immunizing a human, rabbit, rat or mouse, for example, with a peptide representing an epitope encompassing a viral particle, a viral protein, or a fragment thereof.

The antibodies of the present disclosure may also be chimeric antibodies. These chimeric antibodies can involve the merging of a portion of a monoclonal antibody with antibody-producing DNA in living cells to produce a monoclonal antibody that has material from more than one species of animal. This procedure is well known in the art and any known method to produce chimeric antibodies is suitable for purposes of the present disclosure.

As used herein "humanized antibody" includes an antibody that is composed partially or fully of amino acid sequences derived from a human antibody germ line by altering the sequence of an antibody having non-human complementarity determining regions ("CDR"). The simplest such alteration may consist simply of substituting the constant region of a human antibody for the murine constant region, thus resulting in a human/murine chimera which may have sufficiently low immunogenicity to be acceptable for pharmaceutical use. However, the variable region of the antibody and even the CDR can be humanized by techniques that are well known in the art. The framework regions of the variable regions can be substituted by the corresponding human framework regions leaving the non-human CDR substantially intact, or even replacing the CDR with sequences derived from a human genome. CDRs may also be randomly mutated such that binding activity and affinity is maintained or enhanced in the context of fully human germline framework regions or framework regions that are substantially human. Substantially human frameworks can have at least 90%, 95%, or 99% sequence identity with a known human framework sequence. Fully useful human antibodies can be produced in genetically modified mice whose immune systems have been altered to correspond to human immune systems. As mentioned above, it is sufficient for use in the methods of this discovery, to employ an immunologically specific fragment of the antibody, including fragments representing single chain forms.

The antibody polypeptides of the present disclosure can be in isolated form. As used herein, a polypeptide is said to be isolated when physical, mechanical or chemical methods are employed to remove the protein from cellular constituents that are normally associated with the protein. A skilled artisan can readily employ standard purification methods to obtain an isolated protein.

The antibodies of the instant disclosure are specific to CHICKV virions, CHIKV polypeptides, or fragments thereof. Chikungunya virus (CHIKV) is a positive-sense RNA virus belonging to the alphavirus family, which can be transmitted to humans by mosquitos. CHIKV is an enveloped virus enclosing a single-stranded positive sense RNA genome of an approximate 11.8 kbp. The two open reading frames (ORFs) code for 4 non-structural proteins (NS-1, 2, 3, 4) and 3 structural proteins—nucleocapsid (C) and envelope protein 1 and 2 (E1 and E2). The C protein forms the central capsid core which encapsulates viral RNA. The nucleocapsid, in turn, is surrounded by the viral envelope studded with E1 and E2. The E1-E2 heterodimers are arranged into 80 trimeric spikes with a single CHIKV virion containing 240 copies of the envelope proteins on its surface. During a CHIKV infection, E2 functions in attachment and triggers receptor-mediated endocytosis. The low pH within the endosome leads to dissociation of the E1-E2 heterodimer, exposing the fusion loop of E1 and leading to a type II membrane fusion.

The antibodies can be specific to a CHICKV protein, a CHIKV virion, or fragments a CHICKV protein or CHIKV virion. In some aspects, an antibody has specificity to a nonstructural protein such as NS-1, NS2, NS3, and NS4. In other aspects, the antibody has specificity to a structural protein such as E1, E2 and C.

One aspect of the present disclosure encompasses antibodies that specifically bind the E1 protein of CHIKV. In one aspect, such an antibody is a monoclonal IgG antibody comprising a heavy chain amino acid sequence with at least about 60% identity to SEQ ID NO: 3. In some aspects, the heavy chain amino acid sequence comprises at least about 60, 65, 70, 75, 80, 85, 90, or 95% identical to SEQ. ID NO: 3. In some aspects, the heavy chain amino acid sequence comprises at least about 95, 96, 97, 98, or 99% sequence homology with SEQ ID NO: 3. In some aspects, the heavy chain amino acid sequence is encoded by SEQ ID NO: 3. In one aspect, the antibody is encoded by a heavy chain amino acid sequence that comprises at least about 60% identity to SEQ ID NO: 3. In one aspect, the light chain of the antibody is encoded by an amino acid sequence with at least about 60% identity to SEQ ID NO: 5. In some aspects, the light chain amino acid sequence comprises at least about 60, 65, 70, 75, 80, 85, 90, or 95% identical to SEQ. ID NO: 5. In some aspects, the light chain amino acid sequence comprises at least about 95, 96, 97, 98, or 99% sequence homology with SEQ ID NO:5. In some aspects, the light chain amino acid sequence is encoded by the amino acid sequence of SEQ ID NO:5. In one aspect, the antibody is encoded by a light chain amino acid sequence that comprises at least about 60% identity to SEQ ID NO: 5.

One aspect of the present disclosure encompasses antibodies that bind the E1 protein of CHIKV. In one aspect, such an antibody is a monoclonal IgG antibody comprising a heavy chain variable domain encoded by an amino acid sequence with at least about 60% identity to SEQ ID NO: 11. In some aspects, the heavy chain variable domain amino acid sequence comprises at least about 60, 65, 70, 75, 80, 85, 90, or 95% identical to SEQ. ID NO: 11. In some aspects, the heavy chain variable domain amino acid sequence comprises at least about 95, 96, 97, 98, or 99% sequence homology with SEQ ID NO: 11. In some aspects, the heavy chain variable domain amino acid sequence is encoded by SEQ ID NO: 11. In one aspect, the variable region of the heavy chain amino acid sequence comprises at least about 60% identity to SEQ ID NO: 11. In one aspect, the light chain variable region is encoded by an amino acid sequence that comprises at least about 60% identity to SEQ ID NO: 13. In some aspects, the light chain variable region amino acid sequence comprises at least about 60, 65, 70, 75, 80, 85, 90, or 95% identical to SEQ. ID NO: 13. In some aspects, the light chain variable region amino acid sequence comprises at least about 95, 96, 97, 98, or 99% sequence homology with SEQ ID NO: 13. In some aspects, the light chain variable region amino acid sequence is encoded by the amino acid sequence of SEQ ID NO: 13. In one aspect, the variable region of the light chain amino acid sequence comprises at least about 60% identity to SEQ ID NO: 13.

One aspect of the present disclosure encompasses antibodies that bind the E2 protein of CHIKV. In one aspect, such an antibody is a monoclonal IgG antibody comprising a heavy chain amino acid sequence with at least about 60% identity to SEQ ID NO: 7. In some aspects, the heavy chain amino acid sequence comprises at least about 60, 65, 70, 75, 80, 85, 90, or 95% identical to SEQ. ID NO: 7. In some aspects, the heavy chain amino acid sequence comprises at least about 95, 96, 97, 98, or 99% sequence homology with SEQ ID NO: 7. In some aspects, the heavy chain amino acid sequence is encoded by SEQ ID NO: 7. In one aspect, the heavy chain amino acid sequence comprises at least about 60% identity to SEQ ID NO: 7. In one aspect, the antibody is encoded by a light chain amino acid sequence with at least about 60% identity to ID NO: 9. In one aspect, the light chain is encoded by an amino acid sequence that comprises at least about 60% identity to SEQ ID NO: 9. In some aspects, the light chain amino acid sequence comprises at least about 60, 65, 70, 75, 80, 85, 90, or 95% identical to SEQ. ID NO: 9. In some aspects, the light chain amino acid sequence comprises at least about 95, 96, 97, 98, or 99% sequence homology with SEQ ID NO: 9. In some aspects, the light chain amino acid sequence is encoded by the amino acid sequence of SEQ ID NO: 9. In one aspect, the light chain amino acid sequence comprises at least about 60% identity to SEQ ID NO: 9.

One aspect of the present disclosure encompasses antibodies that bind the E2 protein of CHIKV. In one aspect, such an antibody is a monoclonal IgG antibody comprising a heavy chain variable domain encoded by an amino acid sequence with at least about 60% identity to SEQ ID NO: 15. In some aspects, the heavy chain variable domain amino acid sequence comprises at least about 60, 65, 70, 75, 80, 85, 90, or 95% identical to SEQ. ID NO: 15. In some aspects, the heavy chain variable domain amino acid sequence comprises at least about 95, 96, 97, 98, or 99% sequence homology with SEQ ID NO: 15. In some aspects, the heavy chain variable domain amino acid sequence is encoded by SEQ ID NO: 15. In one aspect, the variable region of the heavy chain amino acid sequence comprises at least about 60% identity to SEQ ID NO: 15. In one aspect, the light chain variable region is encoded by an amino acid sequence with at least about 60% identity to SEQ ID NO: 17. In some aspects, the light chain variable region amino acid sequence comprises at least about 60, 65, 70, 75, 80, 85, 90, or 95% identical to SEQ. ID NO: 17. In some aspects, the light chain variable region amino acid sequence comprises at least about 95, 96, 97, 98, or 99% sequence homology with SEQ ID NO: 17. In some aspects, the light chain variable region amino acid sequence is encoded by the amino acid sequence of SEQ ID NO: 17. In one aspect, the variable region of the light chain amino acid sequence comprises at least about 60% identity to SEQ ID NO: 17.

In mammalian cells hundreds of N-linked glycoforms can be detected by mass spectrometric analyses on total protein extractions. Such heterogeneity makes a controlled production of antibodies with uniform and targeted glycosylation profiles difficult and hinders batch to batch consistency, an important requirement of the regulatory authorities. More-over, glycosylation heterogeneity impedes studies to determine the impact of individual glycoforms to a protein's function.

The glycans attached to glycoproteins contain a variety of sugar residues linked in linear or branched structures that can assume many different conformations. These glycans can play a fundamental role in promoting correct protein folding and assembly and, as a consequence, enhance protein stability. They may also contain targeting information, or may be directly involved in protein recognition. The N-linked glycosylation mechanisms in mammalian and plant systems have been conserved during evolution. However, differences are observed in the final steps of oligosaccharide trimming and glycan modification in the Golgi apparatus. In contrast to bacteria, having no N-linked glycans, and yeast, having polymannose glycans, plants produce glycoprotein multimers with complex N-linked glycans having a core substituted by two N-acetylglucosamine (GlcNAc) residues. These glycoprotein multimers are also observed in mammals. Plant and animal glycopolypeptide multimers contain different terminal carbohydrates that are directly linked to the outer branches of the oligosaccharides present. Animal glycopolypeptide multimers, including mammalian glycopolypeptide multimers, have sialic acid present as a terminal carbohydrate residue, while plant glycopolypeptide multimers do not. The terminal core is substituted by β1,2-linked xylose (Xyl) and α1,3-linked core fucose (Fuc) instead of α1,6-linked core fucose as occur in mammals. Furthermore, plant glycoprotein multimers lack the characteristic galactose (Gal)- and sialic acid-containing complex N-glycans (N-acetylneuraminic-α2-6/3Galβ1-4) found in mammals.

Figure 11:
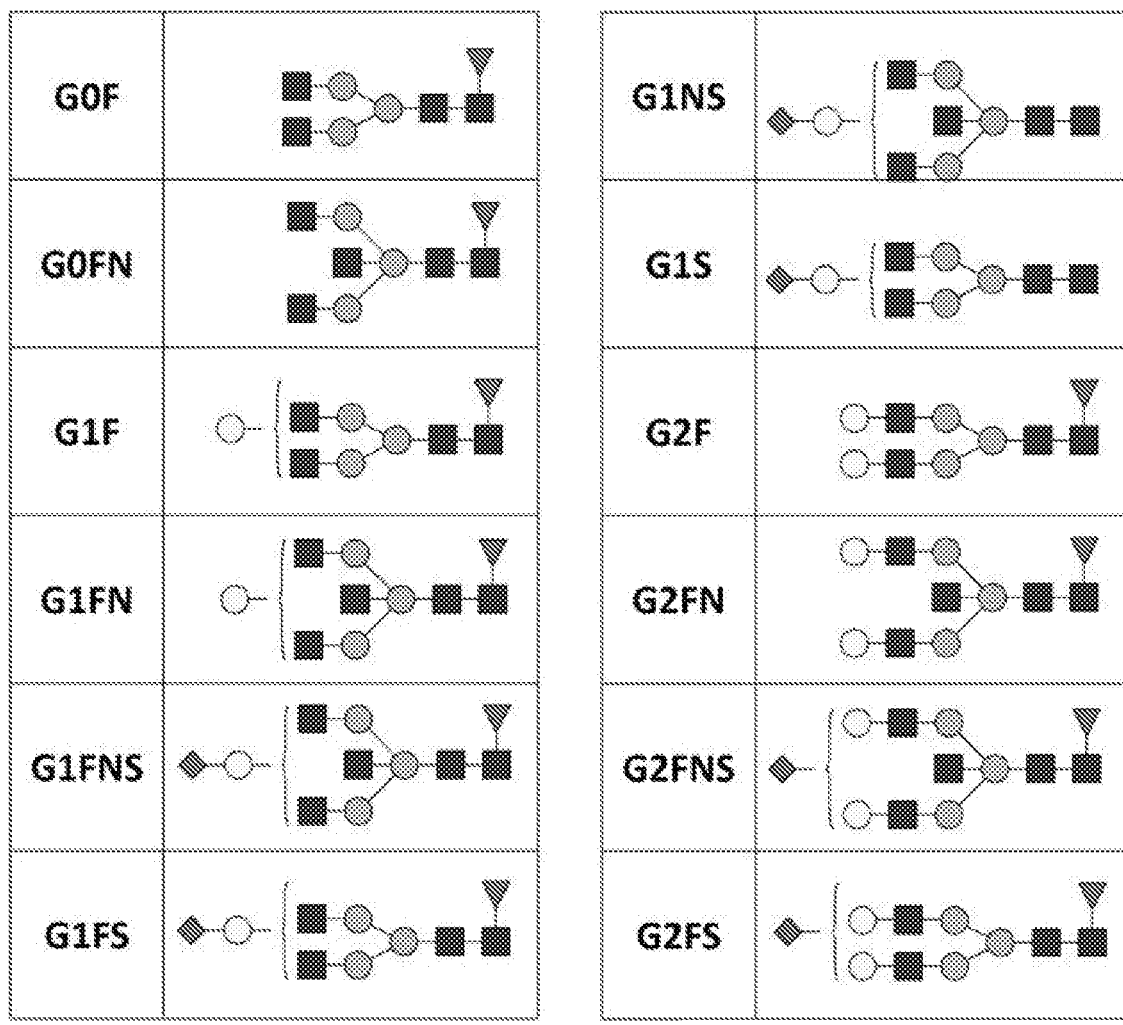
FIG. 11 depicts prominent glycan structures attached to the conserved N-glycosylation site on each of the two IgG heavy chains.

IgG antibodies comprise a single glycosylation site for N-linked glycosylation. As such, antibodies of the instant disclosure comprise a single glycan molecule attached to an Fc region on the heavy chain of the antibody. Each intact antibody comprises two heavy chains, and therefore two glycosylation sites. In one aspect, one glycosylation site is glycosylated. In another aspect, two glycosylation sites are glycosylated. In one alternative of the aspect, both glycosylation sites are glycosylated with the same glycan structure. In other aspects, each glycosylation site is glycosylated with a different glycan molecule. Prominent glycan structures attached to the conserved N-glycosylation site on each of the two IgG heavy chains are shown in FIG. 11.

In the instant disclosure, the antibody comprises a uniform and targeted N-linked glycosylation profile of the Fc domain of at least one of the heavy chains with a high degree of glycan uniformity (homogeneity). An antibody having a targeted glycosylation profile comprises a pre-selected glycosylation profile of the antibody. As used interchangeably herein, "uniformity" and "homogeneity" refer to the degree of sameness of the glycans in a glycoform of an antibody, expressed as a percentage. An N-glycan profile analysis is performed by determining the N-glycosylation of an antibody produced as described herein, which may be determined for example by mass spectrometry methods, such as liquid chromatography-electrospray ionization-mass spectrometry (LC-ESI-MS). Glycan uniformity is determined as a percentage for each different glycan present in the total, wherein for example an antibody having a mixture of N-glycans as shown in Table 1 below (see Example 4), will exhibit a relatively low percentage of each of several different glycans. In contrast, an antibody with a high degree of glycan uniformity exhibits a relatively high (at least about 80%) percentage of one glycan.

Figure 12:
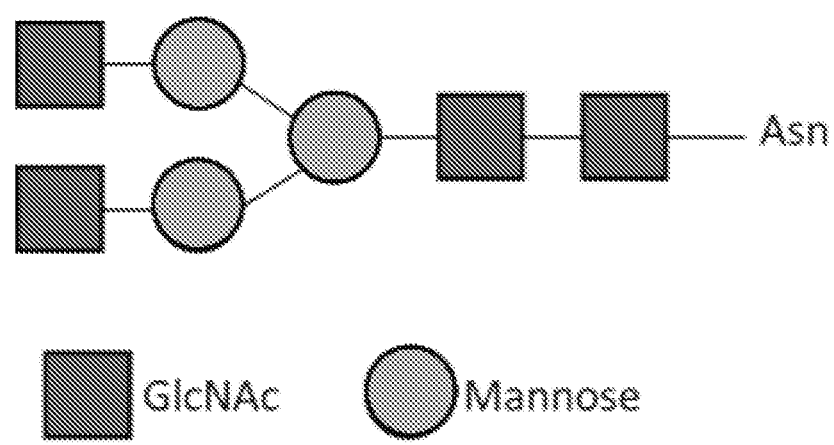
FIG. 12 depicts the N-linked GlcNAc2Man3GlcNAc2 (GnGn; G0) glycosylation profile of the antibody. (GlcNAc=N-acetylglucosamine)

In some aspects, the glycosylation profile of the antibody is an N-linked GlcNAc2Man3GlcNAc2 (GnGn; G0) core glycan. (GlcNAc=N-acetylglucosamine) depicted in FIG. 12.

In contrast to glycosylation profiles of antibodies of the instant disclosure produced in mammalian cells, the targeted glycosylation profile of the antibodies are uniform targeted glycosylation profile is uniform. For instance, the glycosylation profile of the CHKV 152 mAb produced in mammalian cells comprises 40% G0F, 46% G1F, 11% G2F, and 3% G2FS.

For the antibodies described herein, the degree of glycan uniformity determined from the N-linked glycosylation profile determined as described above, is at least 80%, at least 85%, at least 90%, at least 95%, at least 96%, at least 97%, at least 98%, at least 99% or is 100%. Glycan Uniformity may range from about 80% to about 100%, from about 85% to about 100%, from about 90% to about 100%, from about 95% to about 100%, from about 85% to about 90%, from about 85% to about 95%, or from about 85% to any of about 96%, 97%, 98%, or 99%. In some aspects, the antibody Fc domain comprises a targeted N-linked glycosylation profile on one of the heavy chains with a high degree of glycan uniformity (homogeneity). In other aspects, the antibody Fc domain comprises a targeted N-linked glycosylation profile the two heavy chains with a high degree of glycan uniformity (homogeneity). It should therefore be understood that, as used herein the term "a high degree of glycan uniformity" refers to a glycan uniformity of at least about 80% but and also to any of the uniformity percentages and percentage ranges listed in the foregoing.

Figure 10:
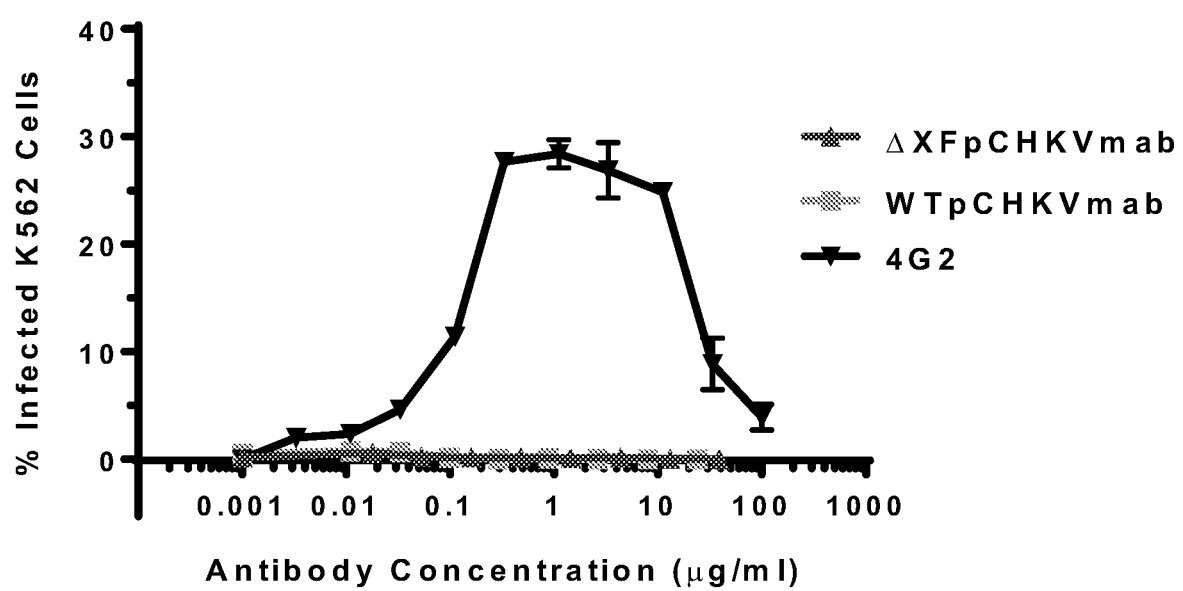
FIG. 10. Graph addressing antibody-dependent enhancement of CHKVmabs for DENV infection. Serial dilutions of CHKVmabs or 4G2 (positive control mAb) were mixed with DENV-2 and then incubated with FcγRIIa+ K562 cells. Cells were fixed, permeabilized and stained with an anti-DENV E antibody and analyzed by flow cytometry.

One of the challenges for mAb therapeutics against viral infections is the increased risk of infection by other viruses in treated patients via the mechanism of antibody-dependent enhancement of infection (ADE). For example, cross-reactive but sub-neutralizing antibodies against one serotype of DENV from a previous infection can form complexes with another serotype of DENV during a secondary infection to promote viral infection of FccR-bearing myeloid cells, predisposing patients to develop the more severe dengue haemorrhagic fever/dengue shock syndrome through ADE. As shown in FIG. 10, antibodies of the present disclosure do not contribute to antibody-dependent enhancement (ADE) of virus infection. In an alternative of the aspects, the antibodies do not contribute to antibody-dependent enhancement (ADE) of dengue virus infection.

II. Methods (a) Method of Producing

The monoclonal antibodies comprise a targeted N-glycosylation profile. A protein comprising a targeted glycosylation profile is a protein glycosylated with one or more glycans having a predefined structure. The targeted glycosylation profile can be generated using a protein expression system comprising a glycosylation machinery controlled to synthesize proteins glycosylated with one or more defined glycosylation profile.

In some aspects, the monoclonal antibodies are produced in plants. Plants have been demonstrated to be an attractive alternative to mammalian cell cultures as a system for mAb development and production. The benefits of using plants for antibody production include large scale production, reduced costs for production, maintenance and delivery, as well as eliminating the risk of the resultant product containing possibly harmful contaminants such as viruses or prions that are pathogenic to humans and other mammals. Plants, like other heterologous expression systems including mammalian cells, bacteria, yeast, and insects, exhibit differences in glycosylation.

As explained above in Section I(a), hundreds of N-linked glycoforms can be detected in mammalian cells making controlled production of antibodies with homogenous glycosylation profiles difficult, hindering the consistency required of the regulatory authorities, and impeding studies on the impact of individual glycoforms to a protein's function. Another advantage of using plants for the production of glycoproteins is that they are highly amenable to glycoengineering, which allows the generation of proteins with targeted tailor-made N-glycans. This is particularly relevant to mAbs since it is well known that the glycosylation profile on the single N-glycosylation site in the Fc domain of IgG antibodies significantly impacts mAb activities. For example, the targeted removal of core fucose residues from complex N-glycans in mammalian IgGs significantly increases Fc gamma receptor (FcγR) III binding and subsequent effector functions.

Any plant capable of producing a targeted glycosylation profile of the antibodies of the instant disclosure can be used in a method of the disclosure. The plant can be naturally capable of producing the desired glycosylation profile. Alternatively, the plant is genetically engineered to introduce or remove glycosylation activities to tailor make glycosylation. *Solanaceous* species within the genus *Nicotiana*, specifically *Nicotiana tabacum* (tobacco) and *Nicotiana benthamiana* (Australian variety), are recognized as effective hosts in Molecular Farming. Advantageous features include (i) ease of cultivation and high biomass; (ii) availability of genetic tools for trait manipulation; (iii) amenability to plant breeding techniques and molecular manipulation; and (iv) non-food status, which minimizes the possibility of contamination of the food supply with industrial designated products.

In some aspects, the antibodies of the instant disclosure are produced in *N. benthamiana*. *N. benthamiana* is particularly well suited for producing recombinant proteins. A significant aspect in *N. benthamiana* is that it contains a natural insertion in the RNA-dependent RNA polymerase 1 gene, which leads to a reduced level of gene silencing. This feature allows the efficient utilization of transient expression vectors, enabling the rapid production (4-10 days) of high value proteins (hormones, enzymes, antibodies) by transient transfection, e.g., using agro-infiltration. Furthermore, *N. benthamiana* lines have been established which permit the production of proteins, including mAbs, with customized N-glycan structures and thus superior biological activities. See, for example, Niemer et al., *Nicotiana benthamiana* cathepsin B displays distinct enzymatic features which differ from its human relative and aleurain-like protease, Biochimie, Volume 122, March 2016, Pages 119-125; and Strasser et al., Controlled glycosylation of plant-produced recombinant proteins, Curr. Opin. Biotechnol., 30 (2014), pp. 95-100. In some aspects, the plant used to produce the instant antibodies is the *N. benthamiana* ΔXFT line.

Methods of transforming plants and introducing nucleic acid sequences encoding the antibodies are well known in the art. In some aspects, antibody polypeptides are produced in a plant using an agrobacterial transformation vector that launches a viral vector encoding the polypeptide of interest. In some aspects, the viral vector is a geminiviral vector.

In some aspects, the vector comprises a nucleic acid sequence at least 90% identical to SEQ ID NO: 2 and a nucleic acid sequence at least 90% identical to SEQ ID NO: 4. In other aspects, the vector comprises a nucleic acid sequence at least 90% identical to SEQ ID NO: 6 and a nucleic acid sequence at least 90% identical to SEQ ID NO: 8. In yet other aspects, the vector comprises a nucleic acid sequence at least 90% identical to SEQ ID NO: 10 and a nucleic acid sequence at least 90% identical to SEQ ID NO: 12. In additional aspects, the vector comprises a nucleic acid sequence at least 90% identical to SEQ ID NO: 14 and a nucleic acid sequence at least 90% identical to SEQ ID NO: 16.

Once produced in a plant, any suitable method can be used to partially or completely isolate an expressed antibody from plant material. As discussed above, a wide range of fractionation and separation procedures are known for purifying substances from plant tissues or fluids.

(b) Method of Treating

One aspect of the present disclosure encompasses a method of treating and preventing infections by CHIKV in a subject in need thereof. The method comprises administering antibodies having specificity to CHIKV E1 or E2 protein to the subject. In some aspects, the antibody does not contribute to antibody-dependent enhancement of virus infection. The antibodies can be as described above in Section I. The antibodies of the present disclosure may be part of a combination therapy. The disclosure also encompasses use of any of the antibodies disclosed herein for treating and preventing infections by CHIKV in a subject.

In some aspects, antibodies of the present disclosure do not contribute to antibody-dependent enhancement (ADE) of virus infection. In an alternative of the aspects, the antibodies do not contribute to antibody-dependent enhancement (ADE) of dengue virus infection.

The subject can be a human, a livestock animal, a companion animal, a lab animal, or a zoological animal. In one aspect, the subject may be a rodent, e.g. a mouse, a rat, a guinea pig, etc. Non-limiting examples of suitable livestock animals may include pigs, cows, horses, goats, sheep, llamas and alpacas. Non-limiting examples of companion animals may include pets such as dogs, cats, rabbits, and birds. As used herein, a "zoological animal" refers to an animal that may be found in a zoo. Such animals may include non-human primates, large cats, wolves, and bears. Non-limiting examples of a laboratory animal may include rodents, canines, felines, and non-human primates. Non-limiting examples of rodents may include mice, rats, guinea pigs, etc. In some aspects the subject is a human subject.

In certain aspects, a pharmacologically effective amount of an antibody of the disclosure, including immunologically reactive fragments, may be administered to a subject. Administration is performed using standard effective techniques, include peripherally (i.e. not by administration into the central nervous system) or locally to the central nervous system. Peripheral administration includes but is not limited to intravenous, intraperitoneal, subcutaneous, pulmonary, transdermal, intramuscular, intranasal, buccal, sublingual, or suppository administration. Local administration, including directly into the central nervous system (CNS) includes but is not limited to via a lumbar, intraventricular or intraparenchymal catheter or using a surgically implanted controlled release formulation.

Pharmaceutical compositions for effective administration are deliberately designed to be appropriate for the selected mode of administration, and pharmaceutically acceptable excipients such as compatible dispersing agents, buffers, surfactants, preservatives, solubilizing agents, isotonicity agents, stabilizing agents and the like are used as appropriate. Remington's Pharmaceutical Sciences, Mack Publishing Co., Easton Pa., 16Ed ISBN: 0-912734-04-3, latest edition, incorporated herein by reference in its entirety, provides a compendium of formulation techniques as are generally known to practitioners. It may be particularly useful to alter the solubility characteristics of the antibodies useful in this discovery, making them more lipophilic, for example, by encapsulating them in liposomes or by blocking polar groups.

Effective peripheral systemic delivery by intravenous or intraperitoneal or subcutaneous injection can be a method of administration to a living patient. Suitable vehicles for such injections are straightforward. In addition, however, administration may also be effected through the mucosal membranes by means of nasal aerosols or suppositories. Suitable formulations for such modes of administration are well known and typically include surfactants that facilitate cross-membrane transfer. Such surfactants are often derived from steroids or are cationic lipids, such as N-[1-(2,3-dioleoyl) propyl]-N,N,N-trimethyl ammonium chloride (DOTMA) or various compounds such as cholesterol hemisuccinate, phosphatidyl glycerols and the like.

The concentration of antibody in formulations to be administered is an effective amount and ranges from as low as about 0.1% by weight to as much as about 15 or about 20% by weight and will be selected primarily based on fluid volumes, viscosities, and so forth, in accordance with the particular mode of administration selected if desired. A typical composition for injection to a living patient could be made up to contain 1 mL sterile buffered water of phosphate buffered saline and about 1-1000 mg of any one of or a combination of the humanized antibody of the present discovery. The formulation could be sterile filtered after making the formulation, or otherwise made microbiologically acceptable. A typical composition for intravenous infusion could have volumes between 1-250 mL of fluid, such as sterile Ringer's solution, and 1-100 mg per ml, or more in anti-tau antibody concentration. Therapeutic agents of the discovery can be frozen or lyophilized for storage and reconstituted in a suitable sterile carrier prior to use. Lyophilization and reconstitution may lead to varying degrees of antibody activity loss (e.g. with conventional immune globulins, IgM antibodies tend to have greater activity loss than IgG antibodies). Dosages administered are effective dosages and may have to be adjusted to compensate. The pH of the formulations generally pharmaceutical grade quality, will be selected to balance antibody stability (chemical and physical) and comfort to the patient when administered. Generally, a pH between 4 and 8 is tolerated. Doses will vary from individual to individual based on size, weight, and other physiobiological characteristics of the individual receiving the successful administration.

As used herein, the term "effective amount" means an amount of a substance such as a compound that leads to measurable and beneficial effects for the subject administered the substance, i.e., significant efficacy. The effective amount or dose of compound administered according to this discovery will be determined by the circumstances surrounding the case, including the compound administered, the route of administration, the status of the symptoms being treated and similar patient and administration situation considerations among other considerations.

The frequency of dosing may be daily or once, twice, three times or more per week or per month, as needed as to effectively treat the symptoms. The timing of administration of the treatment relative to the disease itself and duration of treatment will be determined by the circumstances surrounding the case. Treatment could begin immediately, such as at the site of the injury as administered by emergency medical personnel. Treatment could begin in a hospital or clinic itself, or at a later time after discharge from the hospital or after being seen in an outpatient clinic. Duration of treatment could range from a single dose administered on a one-time basis to a life-long course of therapeutic treatments.

Although the foregoing methods appear the most convenient and most appropriate and effective for administration of proteins such as antibodies, by suitable adaptation, other effective techniques for administration, such as intraventricular administration, transdermal administration and oral administration may be employed provided proper formulation is utilized herein.

In addition, it may be desirable to employ controlled release formulations using biodegradable films and matrices, or osmotic mini-pumps, or delivery systems based on dextran beads, alginate, or collagen.

Typical dosage levels can be determined and optimized using standard clinical techniques and will be dependent on the mode of administration.

III. Kits

A further aspect of the present disclosure provides kits comprising one or more anti-CHKV antibodies detailed above in Section I, for use in the prevention or treatment of CHIKV. The one or more anti-CHKV antibodies can have specificity to CHIKV E1 or E2 protein.

The kits provided herein generally include instructions for carrying out the methods detailed below. Instructions included in the kits may be affixed to packaging material or may be included as a package insert. While the instructions are typically written or printed materials, they are not limited to such. Any medium capable of storing such instructions and communicating them to an end user is contemplated by this disclosure. Such media include, but are not limited to, electronic storage media (e.g., magnetic discs, tapes, cartridges, chips), optical media (e.g., CD ROM), and the like. As used herein, the term "instructions" may include the address of an internet site that provides the instructions.

Definitions

Unless defined otherwise, all technical and scientific terms used herein have the meaning commonly understood by a person skilled in the art to which this disclosure belongs. The following references provide one of skill with a general definition of many of the terms used in this disclosure: Singleton et al., Dictionary of Microbiology and Molecular Biology (2nd ed. 1994); The Cambridge Dictionary of Science and Technology (Walker ed., 1988); The Glossary of Genetics, 5th Ed., R. Rieger et al. (eds.), Springer Verlag (1991); and Hale & Marham, The Harper Collins Dictionary of Biology (1991). As used herein, the following terms have the meanings ascribed to them unless specified otherwise.

When introducing elements of the present disclosure or the preferred aspects(s) thereof, the articles "a", "an", "the" and "said" are intended to mean that there are one or more of the elements. The terms "comprising", "including" and "having" are intended to be inclusive and mean that there may be additional elements other than the listed elements.

A "genetically modified" cell refers to a cell in which the nuclear, organellar or extrachromosomal nucleic acid sequences of a cell has been modified, i.e., the cell contains at least one nucleic acid sequence that has been engineered to contain an insertion of at least one nucleotide, a deletion of at least one nucleotide, and/or a substitution of at least one nucleotide.

The terms "genome modification" and "genome editing" refer to processes by which a specific nucleic acid sequence in a genome is changed such that the nucleic acid sequence is modified. The nucleic acid sequence may be modified to comprise an insertion of at least one nucleotide, a deletion of at least one nucleotide, and/or a substitution of at least one nucleotide. The modified nucleic acid sequence is inactivated such that no product is made. Alternatively, the nucleic acid sequence may be modified such that an altered product is made.

The term "heterologous" refers to an entity that is not native to the cell or species of interest.

The terms "nucleic acid" and "polynucleotide" refer to a deoxyribonucleotide or ribonucleotide polymer, in linear or circular conformation. For the purposes of the present disclosure, these terms are not to be construed as limiting with respect to the length of a polymer. The terms may encompass known analogs of natural nucleotides, as well as nucleotides that are modified in the base, sugar and/or phosphate moieties. In general, an analog of a particular nucleotide has the same base-pairing specificity, i.e., an analog of A will base-pair with T. The nucleotides of a nucleic acid or polynucleotide may be linked by phosphodiester, phosphothioate, phosphoramidite, phosphorodiamidate bonds, or combinations thereof.

The term "nucleotide" refers to deoxyribonucleotides or ribonucleotides. The nucleotides may be standard nucleotides (i.e., adenosine, guanosine, cytidine, thymidine, and uridine) or nucleotide analogs. A nucleotide analog refers to a nucleotide having a modified purine or pyrimidine base or a modified ribose moiety. A nucleotide analog may be a naturally occurring nucleotide (e.g., inosine) or a non-naturally occurring nucleotide. Non-limiting examples of modifications on the sugar or base moieties of a nucleotide include the addition (or removal) of acetyl groups, amino groups, carboxyl groups, carboxymethyl groups, hydroxyl groups, methyl groups, phosphoryl groups, and thiol groups, as well as the substitution of the carbon and nitrogen atoms of the bases with other atoms (e.g., 7-deaza purines). Nucleotide analogs also include dideoxy nucleotides, 2'-O-methyl nucleotides, locked nucleic acids (LNA), peptide nucleic acids (PNA), and morpholinos.

The terms "polypeptide" and "protein" are used interchangeably to refer to a polymer of amino acid residues.

As used herein, the terms "target site", "target sequence", or "nucleic acid locus" refer to a nucleic acid sequence that defines a portion of a nucleic acid sequence to be modified or edited and to which a homologous recombination composition is engineered to target.

The terms "upstream" and "downstream" refer to locations in a nucleic acid sequence relative to a fixed position. Upstream refers to the region that is 5' (i.e., near the 5' end of the strand) to the position, and downstream refers to the region that is 3' (i.e., near the 3' end of the strand) to the position.

Techniques for determining nucleic acid and amino acid sequence identity are known in the art. Typically, such techniques include determining the nucleotide sequence of the DNA for a gene and/or determining the amino acid sequence encoded thereby, and comparing these sequences to a second nucleotide or amino acid sequence. Genomic sequences may also be determined and compared in this fashion. In general, identity refers to an exact nucleotide-to-nucleotide or amino acid-to-amino acid correspondence of two polynucleotides or polypeptide sequences, respectively. Two or more sequences (polynucleotide or amino acid) may be compared by determining their percent identity. The percent identity of two sequences, whether nucleic acid or amino acid sequences, is the number of exact matches between two aligned sequences divided by the length of the shorter sequences and multiplied by 100. An approximate alignment for nucleic acid sequences is provided by the local homology algorithm of Smith and Waterman, Advances in Applied Mathematics 2:482-489 (1981). This algorithm may be applied to amino acid sequences by using the scoring matrix developed by Dayhoff, Atlas of Protein Sequences and Structure, M. O. Dayhoff ed., 5 suppl. 3:353-358, National Biomedical Research Foundation, Washington, D.C., USA, and normalized by Gribskov, Nucl. Acids Res. 14(6):6745-6763 (1986). An exemplary implementation of this algorithm to determine percent identity of a sequence is provided by the Genetics Computer Group (Madison, Wis.) in the "BestFit" utility application. Other suitable programs for calculating the percent identity or similarity between sequences are generally known in the art, for example, another alignment program is BLAST, used with default parameters. For example, BLASTN and BLASTP may be used using the following default parameters: genetic code=standard; filter=none; strand=both; cutoff=60; expect=10; Matrix=BLOSUM62; Descriptions=50 sequences; sort by=HIGH SCORE; Databases=non-redundant, GenBank+EMBL+DDBJ+PDB+GenBank CDS translations+Swiss protein+Spupdate+PIR. Details of these programs may be found on the GenBank website. With respect to sequences described herein, the range of desired degrees of sequence identity is approximately 80% to 100% and any integer value therebetween. Typically the percent identities between sequences are at least 70-75%, 80-82%, at least 85-90%, at least 92%, at least 95%, and at least 98% sequence identity.

As used herein, the term "agronomic crop plant" refers to any crop plant grown on a production scale, most typically for the harvest of seed, silage or hay. Examples include, but are not limited to maize, soybeans, rye, wheat, oats, barley, lentils, dry peas, rape, sorghum, alfalfa, triticale, clover, and the like.

As used herein, the term "antigen" refers to any substance capable of inducing a specific immune response and of reacting with the resulting antibodies produced by that response.

As used herein, the term "antiviral" refers to a substance that interferes with the replication of a virus.

As used herein, the term "binding" refers to antigen binding affinity of an antibody, the kinetics of which are measured for example by surface plasmon resonance (SPR) and expressed by parameters of "on rate" ($k_a$), "off rate" ($k_d$), and binding constant ($K_D$). "Neutralization activity" refers to the a measure of inhibitory activity of an antibody with respect to the activity of a specific virus, expressed as $EC_{50}$, which is the concentration of an antibody that induces half of the maximal inhibition. As used herein, "in vivo therapeutic activity" refers to the minimal concentration(s) of an antibody or its derivatives that prevent or clear infection of a virus in an animal model.

As used herein, the term "cross pollination" or "cross-breeding" when used in reference to plants means the process by which the pollen of one flower on one plant is applied (artificially or naturally) to the ovule (stigma) of a flower on another plant.

As used herein, the term "cultivar" when referring to plants means a variety, strain or race of plant that has been produced by horticultural or agronomic techniques and is not normally found in wild populations.

As used herein, the terms "dicotyledon" and "dicot" refer to a flowering plant having an embryo containing two seed halves or cotyledons. Examples include tobacco; tomato; the legumes, including peas, alfalfa, clover and soybeans; oaks; maples; roses; mints; squashes; daisies; walnuts; cacti; violets and buttercups.

As used herein, the term "plant" refers to whole plants and progeny of the whole plants, plant cells, plant tissue, plant calli, seeds and pollen. The class of plants that can be used in the methods of the disclosure is generally as broad as the class of higher plants amenable to transformation techniques, including both monocotyledonous and dicotyledonous plants.

As used herein, the term "plant line" is used broadly to include, but is not limited to, a group of plants vegetatively propagated from a single parent plant, via tissue culture techniques or a group of inbred plants which are genetically very similar due to descent from a common parent(s). A plant is said to "belong" to a particular line if it (a) is a primary transformant (T0) plant regenerated from material of that line; (b) has a pedigree comprised of a T0 plant of that line; or (c) is genetically very similar due to common ancestry (e.g., via inbreeding or selfing). In this context, the term "pedigree" denotes the lineage of a plant, e.g. in terms of the sexual crosses effected such that a gene or a combination of genes, in heterozygous (hem izygous) or homozygous condition, imparts a desired trait to the plant.

As used herein, the term "endosperm" refers to a triploid structure resulting from the development of a fusion between two polar nuclei of the embryo sac and one of the sperm nucleus from the pollen found in many plant seeds. The endosperm frequently stores food materials, which are broken down during germination.

As used herein, the term "filial generation" refers to any of the generations of plant cells, tissues or organisms following a particular parental generation. The generation resulting from a mating of the parent plants is the first filial generation (designated as "F1" or "F1"), while that resulting from crossing of F1 plants is the second filial generation (designated as "F2" or "F2").

The term "gamete" refers to a reproductive cell whose nucleus (and often cytoplasm) fuses with that of another gamete of similar origin but of opposite sex to form a zygote, which has the potential to develop into a new individual plant. Gametes are typically haploid and are differentiated into male and female.

The term "gene" refers to any segment of DNA associated with a biological function. Thus, genes include, but are not limited to, coding sequences and/or the regulatory sequences required for their expression. Genes can also include non-expressed DNA segments that, for example, form recognition sequences for other proteins. Genes can be obtained from a variety of sources, including cloning from a source of interest or synthesizing from known or predicted sequence information, and may include sequences designed to have desired parameters.

As used herein, the term "genotype" refers to the genetic makeup of a cell, cell culture, tissue, whole organism (e.g., a whole plant or animal), or group of whole organisms (e.g., a group of plants or animals).

As used herein, the term "glycan", which is synonymous with "polysaccharide", refers to any linear or branched polymer consisting of monosaccharide (i.e., glucose) residues joined to each other by glycosidic linkages. Examples of glycans include glycogen, starch, hyaluronic acid, and cellulose.

As used herein, the term "glycoside" refers to any compound containing a carbohydrate molecule (sugar), particularly any such natural product in plants, convertible by hydrolytic cleavage, into a sugar and a non-sugar component.

As used herein, the term "glycopeptide" refers to a compound or composition in which carbohydrate is covalently attached to a peptide or oligopeptide.

As used herein, the term "glycoprotein" refers to a compound or composition in which carbohydrate is covalently attached to a protein.

As used herein, the term "glycosylation" refers to the addition of oligosaccharides to particular residues on a protein. This modification can be both co-translational and post-translational, occurring in the endoplasmic reticulum and golgi. Three different forms of glycosylation can be distinguished: N-linked oligosaccharides, O-linked oligosaccharides and glycosyl-phosphatidylinositol (GPI-) anchors.

As used herein, the term "hemizygous" refers to a cell, tissue or organism in which a gene is present only once in a genotype, as a gene in a haploid cell or organism, a sex-linked gene in the heterogametic sex, or a gene in a segment of chromosome in a diploid cell or organism where its partner segment has been deleted.

A "heterologous polynucleotide" or a "heterologous nucleic acid" or an "exogenous DNA segment" refer to a polynucleotide, nucleic acid or DNA segment that originates from a source foreign to the particular host cell, or, if from the same source, is modified from its original form. Thus, a heterologous gene in a host cell includes a gene that is endogenous to the particular host cell, but has been modified. Thus, the terms refer to a DNA segment that is either (i) foreign or heterologous to the cell, or (ii) homologous to the cell but in a position within the host cell nucleic acid in which the element is not ordinarily found. Exogenous DNA segments may be expressed to yield exogenous polypeptides.

A "heterologous trait" refers to a phenotype imparted to a transformed host cell or transgenic organism by an exogenous DNA segment, heterologous polynucleotide or heterologous nucleic acid.

As used herein, the term "heterozygote" refers to a diploid or polyploid individual plant cell or plant having different alleles (forms of a given gene) present at least at one locus.

As used herein, the term "heterozygous" refers to the presence of different alleles (forms of a given gene) at a particular gene locus.

As used herein, the term "HPLC" refers to High Performance Liquid Chromatography.

As used herein, the term "homozygote" refers to an individual plant cell or plant having the same alleles at one or more loci.

As used herein, the term "homozygous" refers to the presence of identical alleles at one or more loci in homologous chromosomal segments.

As used herein, the term "hybrid" refers to any cell, tissue or whole organisms (e.g., a whole plant or animal) resulting from a cross between parents that differ in one or more genes.

As used herein, the term "monoclonal antibody" or "MAb" refer to antibodies derived from a single antibody-producing cell that recognizes a specific antigen. MAbs are produced by hybridoma cells, which are a fusion of a cell that produces the antibody and a multiple myeloma cell. The myeloma cell can continuously produce the antibody.

As used herein, the term "antibody-dependent enhancement of infection (ADE)" refers to the increased risk of infection by viruses in subjects having protective immunity to another virus. Protective immunity can be due to infection by a virus or by the use of monoclonal antibody therapy against the virus.

As used herein, the term "targeted" when referring to a glycosylation profile of an antibody refers to a pre-selected glycosylation profile of the antibody.

As various changes could be made in the above-described cells and methods without departing from the scope of the invention, it is intended that all matter contained in the above description and in the examples given below, shall be interpreted as illustrative and not in a limiting sense.

EXAMPLES

All patents and publications mentioned in the specification are indicative of the levels of those skilled in the art to which the present disclosure pertains. All patents and publications are herein incorporated by reference to the same extent as if each individual publication was specifically and individually indicated to be incorporated by reference.

The publications discussed throughout are provided solely for their disclosure before the filing date of the present application. Nothing herein is to be construed as an admission that the invention is not entitled to antedate such disclosure by virtue of prior invention.

The following examples are included to demonstrate the disclosure. It should be appreciated by those of skill in the art that the techniques disclosed in the following examples represent techniques discovered by the inventors to function well in the practice of the disclosure. Those of skill in the art should, however, in light of the present disclosure, appreciate that many changes could be made in the disclosure and still obtain a like or similar result without departing from the spirit and scope of the disclosure, therefore all matter set forth is to be interpreted as illustrative and not in a limiting sense.

Example 1. Expression and Assembly of CHKV 166 in WT and ΔXF N. benthamiana Plants The contribution of effector functions to mAb in vivo efficacy were evaluated by producing mAb N-glycovariants with high glycan uniformity and testing them in a mouse model of CHIKV-induced arthritis. Using a plant expression system that produces glycovariants of CHKV 152 and 166 mAbs with two distinct and homogeneous N-glycan structures, the inventors showed that the nature of antibody Fc N-glycans affects the Fc-FcγR interaction and effector functions, and in turn, modulates in vivo efficacy against CHIKV infection and foot swelling during the acute phase of disease. Although the neutralization potency of the glycovariants are identical, mAb that displayed the GnGn glycoform has higher affinity to FcγRs and superior in vivo therapeutic efficacy. In contrast, clinical protection was not as high for the glycovariant that has lower affinity to FcγRs. The mAb glycoform that conferred strong in vivo efficacy in CHIKV-challenged mice also had increased ADCC activity, suggesting that immune cells may participate in the mAb-dependent reductions in clinical diseases via ADCC when engaged by mAb glycovariants with enhanced affinity to FcγRs. The studies presented herein also provide strategies for improving the efficacy and safety of mAbs by glycan optimization using glycoengineered plants.

Figure 1B:
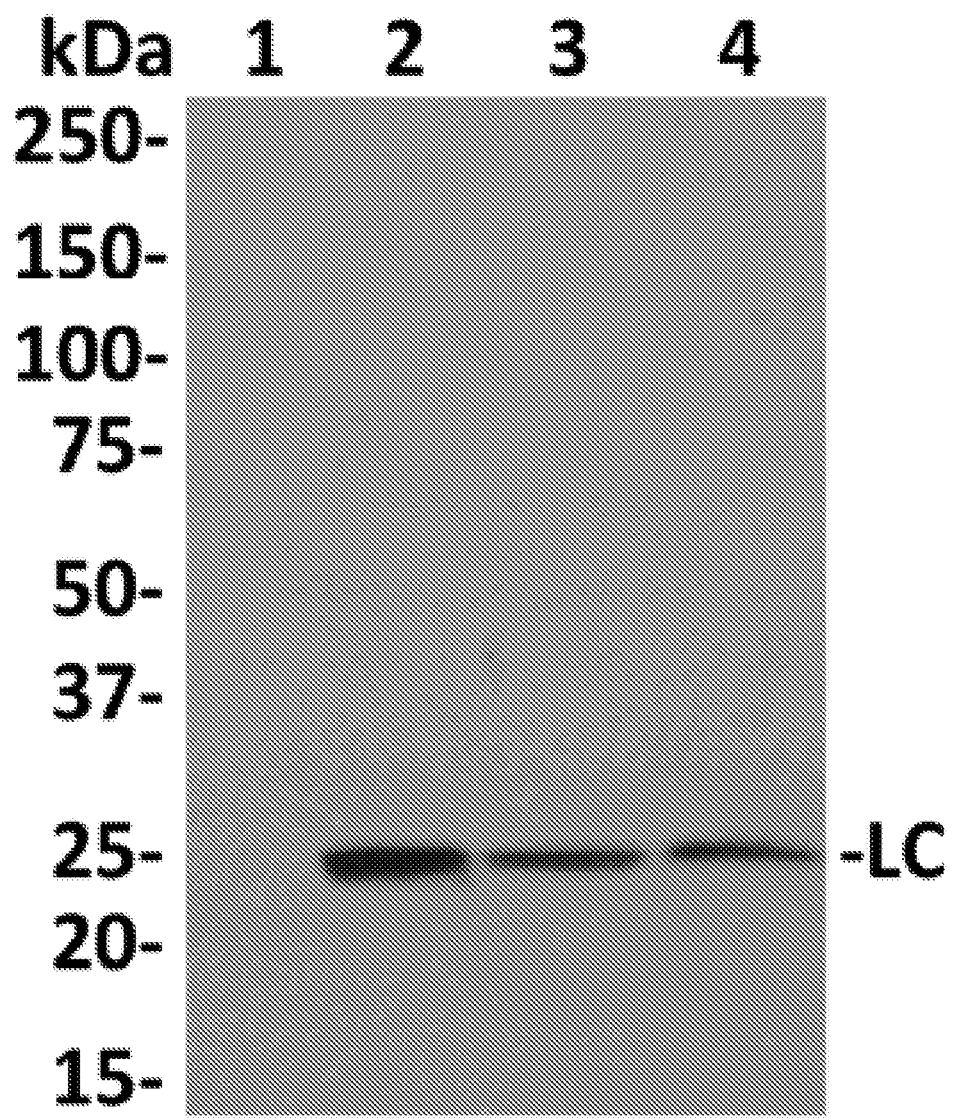
FIG. 1B. Western blot analysis of plant-produced CHKV 166. CHKV 166 was extracted from WT or ΔXFT N. benthamiana leaves, separated on SDS-PAGE gels under reducing and blotted onto PVDF membranes. A goat anti-human kappa chain antibody was incubated with the membranes to detect heavy chain or light chain. Lane 1, protein sample extracted from non-infiltrated leaves; Lane 2, mammalian cell-produced anti-WNV E16 mAb as a reference standard; Lane 3, sample from leaves of WT plants infiltrated with CHKV 166 constructs; Lane 4, sample from leaves of ΔXFT plants infiltrated with CHKV 166 constructs. HC: heavy chain, LC: light chain, (HL)$_2$: assembled mAb with 2 light and heavy chains.
Figure 1C:
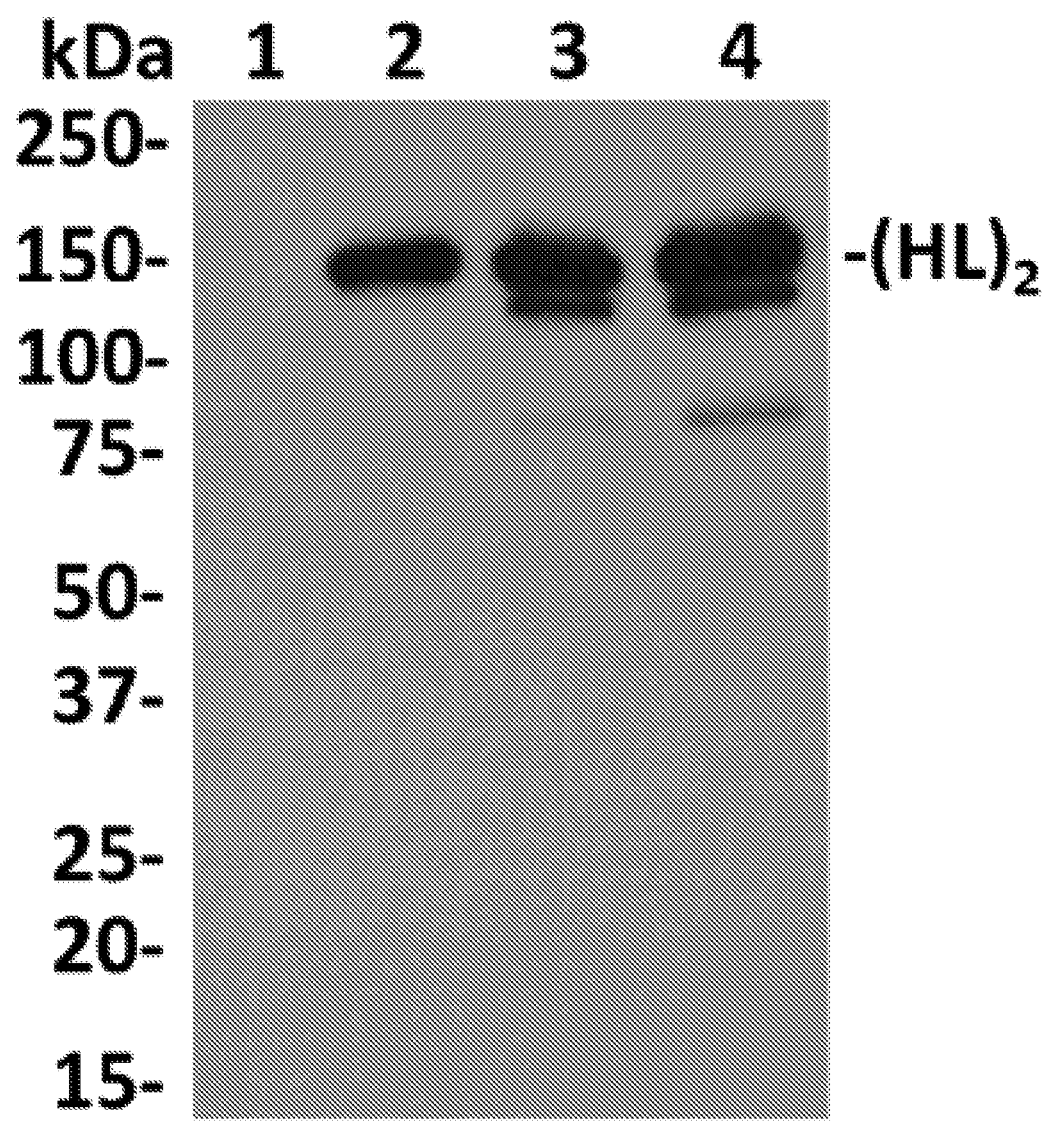
FIG. 1C. Western blot analysis of plant-produced CHKV 166. CHKV 166 was extracted from WT or ΔXFT N. benthamiana leaves, separated on SDS-PAGE gels under non-reducing (c) conditions and blotted onto PVDF membranes. A goat anti-human kappa chain antibody was incubated with the membranes to detect heavy chain or light chain. Lane 1, protein sample extracted from non-infiltrated leaves; Lane 2, mammalian cell-produced anti-WNV E16 mAb as a reference standard; Lane 3, sample from leaves of WT plants infiltrated with CHKV 166 constructs; Lane 4, sample from leaves of ΔXFT plants infiltrated with CHKV 166 constructs. HC: heavy chain, LC: light chain, (HL)$_2$: assembled mAb with 2 light and heavy chains.

The DNA expression cassette of the heavy chain (HC) and light chain (LC) of CHKV 166 was cloned into a MagnICON-based plant expression vector, transformed into *Agrobacterium tumefaciens*, and agroinfiltrated into WT and ΔXFT *N. benthamiana* leaves. The expression of CHKV 166 was evaluated by Western blot analysis. As shown in FIG. 1, CHKV 166 produced in WT (WTCHKV 166) and ΔXFpCHKV plants (GnGnCHKV 166) have HC and LC with the expected molecular weight (FIG. 1A and FIG. 1B, Lanes 3-4), and are fully assembled into the heterotetramer equivalent to a positive control IgG (FIG. 1C, Lanes 3-4).

Example 2: Purification of CHKV 166 from *N. benthamiana* Leaves

Figure 2:
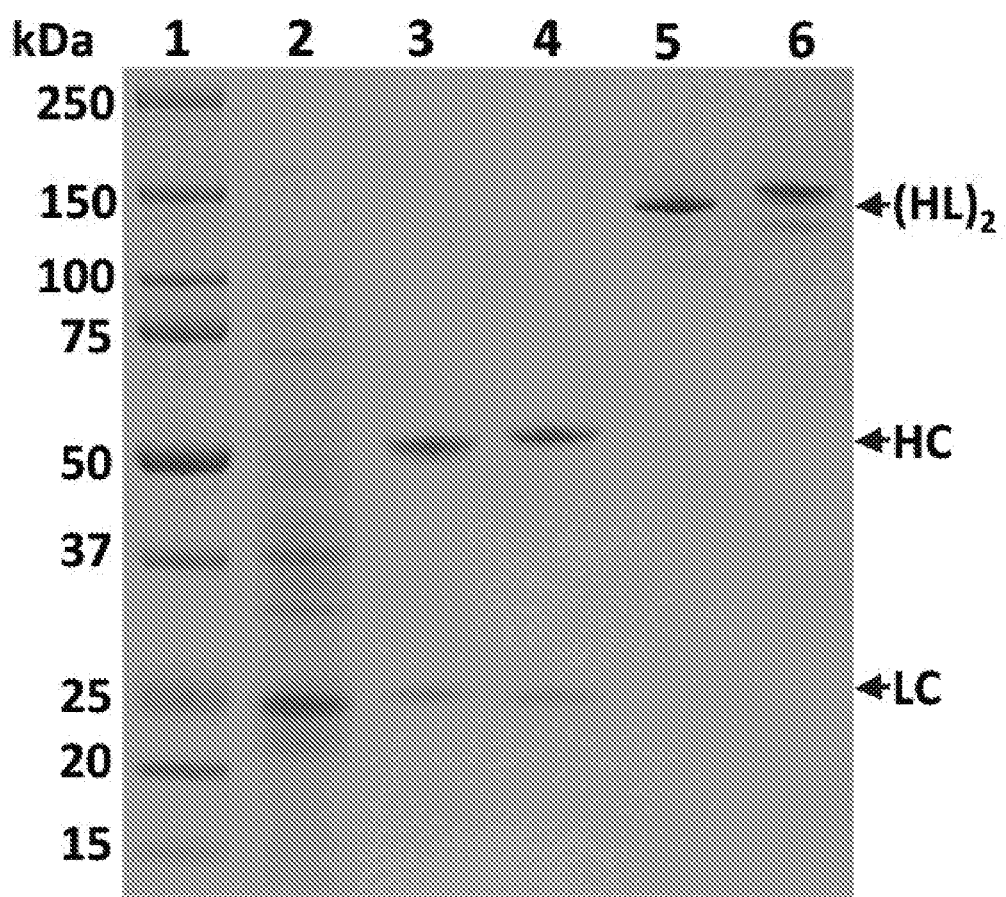
FIG. 2. SDS-PAGE gel showing purification of CHKV 166 from *N. benthamiana* leaves. Total soluble proteins were extracted from plants and CHKV 166 was purified and analyzed on a 4-20% gradient SDS-PAGE gel under reducing (Lanes 1-4) or non-reducing (Lanes 5 and 6) conditions and visualized with Coomassie stain. Lane 1, protein molecular weight marker; lane 2, leaf soluble proteins after low pH precipitation; lanes 3 and 5, CHKV 166 purified from leaves; lanes 4 and 6, mammalian cell-produced anti-WNV E16 mAb as a reference standard. HC: heavy chain, LC: light chain, (HL)$_2$: assembled mAb with 2 light and heavy chains. One representative of several independent experiments is shown.

A two-step extraction and purification process was previously developed. The process comprises low pH precipitation and protein A chromatography for mAbs produced in plants. Using this method, CHKV 166 was purified from *N. benthamiana* leaves to >90% homogeneity (FIG. 2). Purified mAbs were used for further biochemical and functional analyses.

Example 3. CHKV 152 Expression and Purification

Genes coding for CHKV 152 heavy chain (HC) and light chain (LC) were cloned into a deconstructed Geminivirus-based expression vector, transformed into *Agrobacterium tumefaciens* (*A. tumefaciens*), and transiently expressed in WT and ΔXFT *N. benthamiana* plant lines. Four days after agroinfiltration of gene constructs, CHKV 152 was purified from plant leaves to >90% pure with a yield of ~205 g mAb per gram of leaf fresh weight (LFW).

Example 4: N-Linked Glycosylation of Plant-Produced CHKV 152

IgGs have a conserved N-glycosylation site that plays an important structural role that affects the Fc-mediated functions of the antibody. Accordingly, the N-glycosylation of CHKV 152 and 166 produced in the WT (WTCHKV 152) and ΔXFT plants (GnGnCHKV 152) were investigated by liquid chromatography-electrospray ionization-mass spectrometry (LC-ESI-MS). As shown in Table 1, CHKV 152 produced in each type of plants carried the predominant glycoform characteristic of that plant line, with WT plants exhibiting the N-acetylglucosamine residue with xylose and α1,3 fucose (GnGnXF) while the ΔXFT plants carrying the mammalian N-glycoform of GnGn. CHKV 166 produced in ΔXFT plants exhibited the expected mammalian type GnGn N-glycan structure lacking plant-specific xylose and fucose with a high degree of glycan uniformity (>95%) (Table 1). Glycosylation pattern of 166 produced in WT plants was found to carry a mixture of N-glycans (Table 1): the major form was as the expected plant typical $GnGnXF_3$ structure (33%), accompanied by incompletely processed complex N-glycans (39%) and oligomannosidic structures (28%).

TABLE 1

N-linked glycans of CHKV mAb variants.

| Sample | GnGnXF$_3$ | GnGnX | GnMXF$_3$ | MMXV | GnGn | Man$_{(8-9)}$ |
|---|---|---|---|---|---|---|
| GnGnCHKV 152 | | | | | >95 | |
| WTCHKV152 | 56 | 11 | 21 | 11 | | |
| GnGnCHKV 166 | | | | | >95 | |
| WTCHKV 166 | 33 | 15 | 9 | | 15 | 28 |

N-glycosylation profile as determined by liquid-chromatography electrospray ionization-mass spectrometry (LS-ESI-MS). Numbers represent the presence of various glycoforms in percentage. Note, ΔXFT is a N. benthamiana N-glycosylation mutant that lacks plant specific core xylose and fucose. Glycans were annotated according to the ProGlycAn nomenclature.

Example 5: Fc Receptor Binding of CHKV 152 Glycovariants

Figure 3A:
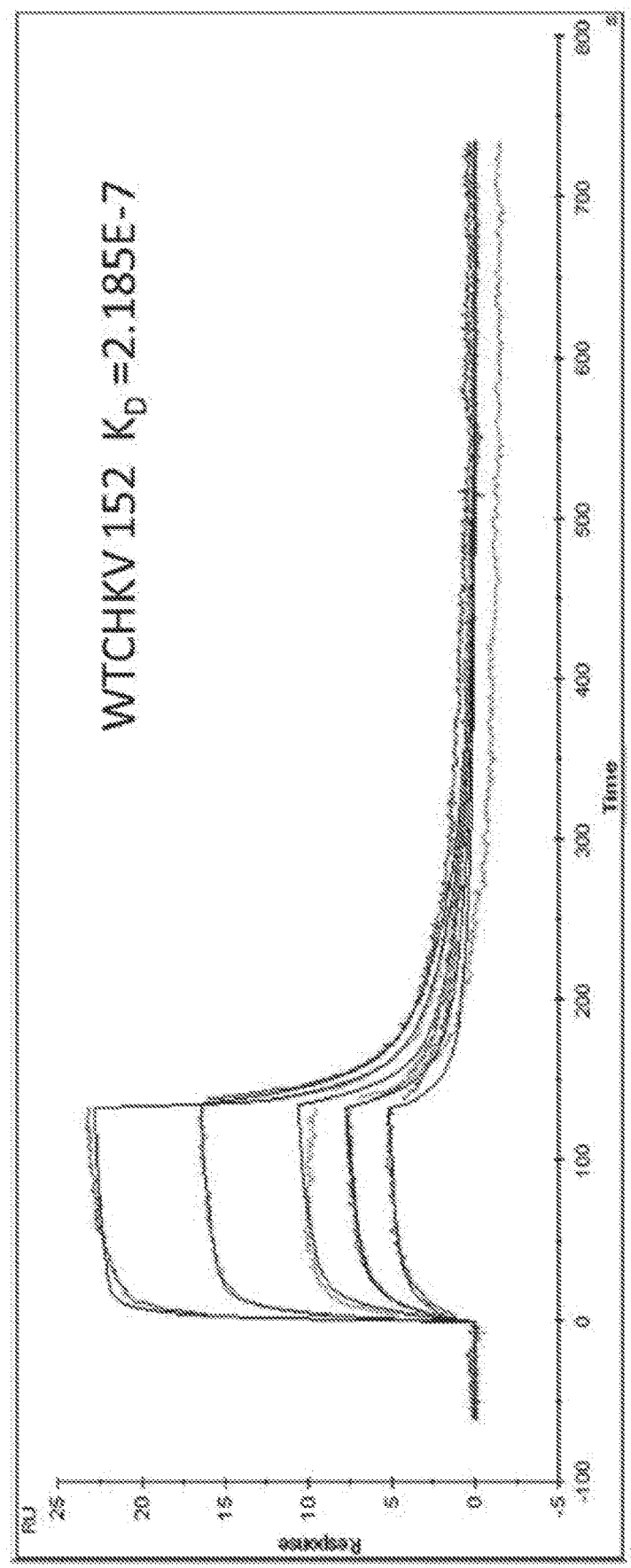
FIG. 3A. SPR analysis of binding affinity and kinetics of CHKV 152 mAb for human FcγRIIIA. Soluble human FcγRIIIA was injected over WTCHKV 152 captured to the CM-5 biosensor chip. Binding responses (colored lines) were analyzed and fitted by a two-state binding interaction model (black lines). A representative set of SPR binding curves from several independent experiments is shown.
Figure 3B:
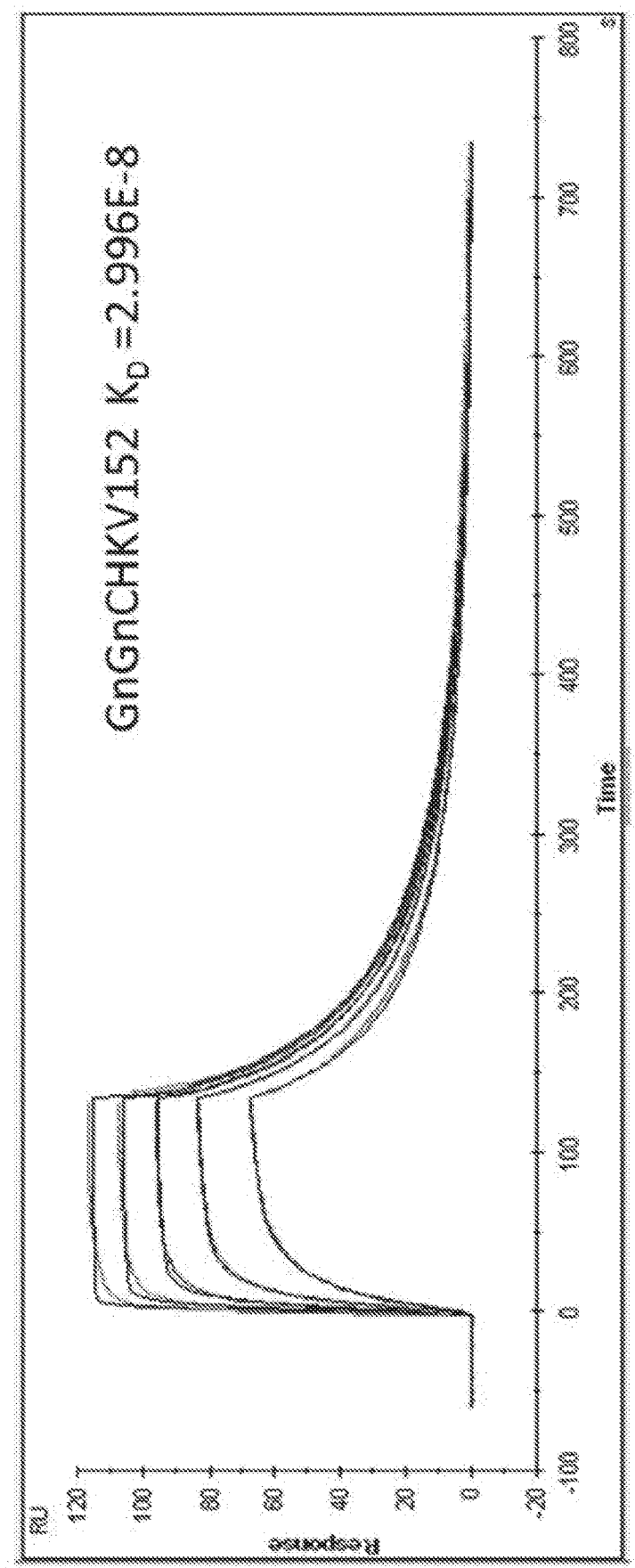
FIG. 3B. SPR analysis of binding affinity and kinetics of CHKV 152 mAb for human FcγRIIIA. Soluble human FcγRIIIA was injected over GnGnCHKV 152 captured to the CM-5 biosensor chip. Binding responses (colored lines) were analyzed and fitted by a two-state binding interaction model (black lines). A representative set of SPR binding curves from several independent experiments is shown.

N-linked glycosylation in the Fc region of an antibody affects binding to Fc gamma receptors (FcγRs). The recognition and binding kinetics of WTCHKV 152 and GnGnCHKV 152 to various human FcγRs were investigated by a surface plasmon resonance (SPR) assay. GnGnCHKV 152 exhibited much stronger binding to FcγRIIIA (KD=$2.996E^{-8}$ M) compared to WTCHKV 152 (KD=$2.185E^{-7}$ M) (FIG. 3). The two mAb glycovariants also showed different binding kinetics to FcγRIIIA with WTCHKV 152 having faster dissociation rate than GnGnCHKV 152 (FIG. 3). WTCHKV 152 and GnGnCHKV 152 also had significant differences in FcγRI binding affinity with GnGnCHKV 152 being a more potent binder (Table 2). The two glycovariants showed similar binding affinity to FcγRIIA (Table 2).

TABLE 2

SPR binding of CHKV 152 glycovariants to human FcγRI and FcγRIIA.

| Sample | FcγRI | FcγRIIA |
|---|---|---|
| GnGnCHKV 152 | 3.34E−9 | 2.67E−6 |
| WTCHKV152 | 1.97E−10 | 2.08E−6 |

Soluble human FcγRI or FcγRIIA was injected over GnGnCHKV 152 or WTCHKV 152 captured to the CM-5 biosensor chip. Equilibrium dissociation constant ($K_D$) was calculated by fitting and analyzed the binding data with BiAcore Evaluation Software.

Example 6: Neutralization Activity of mAb Glycovariants

Figure 4A:
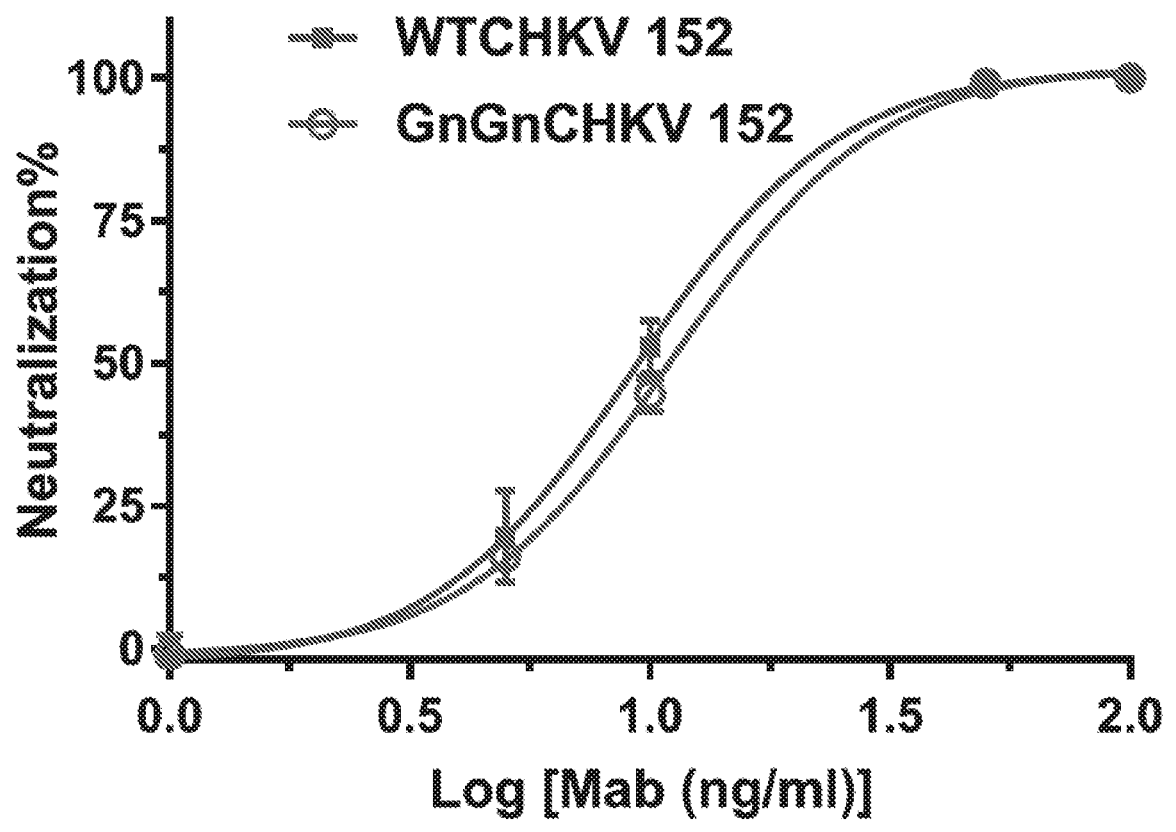

To assess the neutralization potential of the mAb glycovariants, the inhibition of CHKV infection was measured by a focus reduction neutralization test (FRNT). Results showed that both WTCHKV 152 and GnGnCHKV 152 potently neutralized CHKV (FIG. 4A). The potency of neutralization is almost identical between the two plant-produced glycovariants (EC50: WTCHKV 152=9.46 ng/ml and GnGnCHKV 152=11.11 ng/ml; p>0.9) and is similar to their equivalent produced in mammalian cells. Overall, plant-produced CHKV 152 glycovariants displayed similar, yet potent neutralizing activity against CHKV.

Figure 4B:
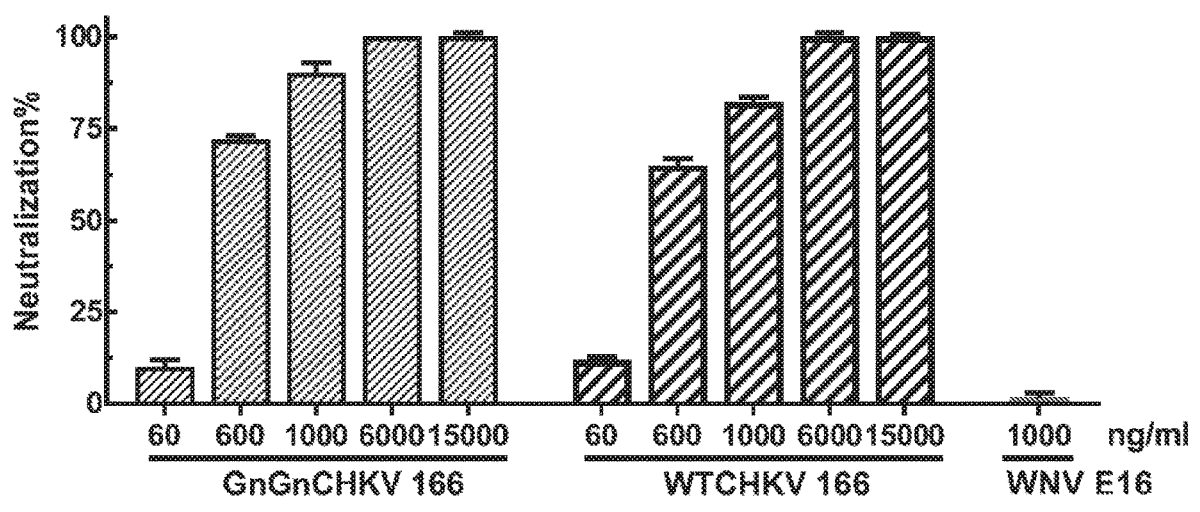

Both WTCHKV 166 and GnGnCHKV 166 also showed strong neutralizing activity against CHKV with statistically similar potency (GnGnCHKV 166 EC$_{50}$=130.5 ng/ml vs. WTCHKV 166EC$_{50}$=390.8 ng/ml; p=0.33) (FIG. 4B). The mean EC$_{50}$ values of plant-derived CHKV 166 are comparable to that of mammalian-cell produced orthologue (mCHKV 166 EC$_{50}$=154 ng/ml). Overall, plant-produced CHKV 166 glycovariants also displayed similar, yet potent neutralizing activity against CHKV.

Example 7: In Vivo Efficacy of CHKV 152 Glycovariants as Prophylaxis

Figure 5A:
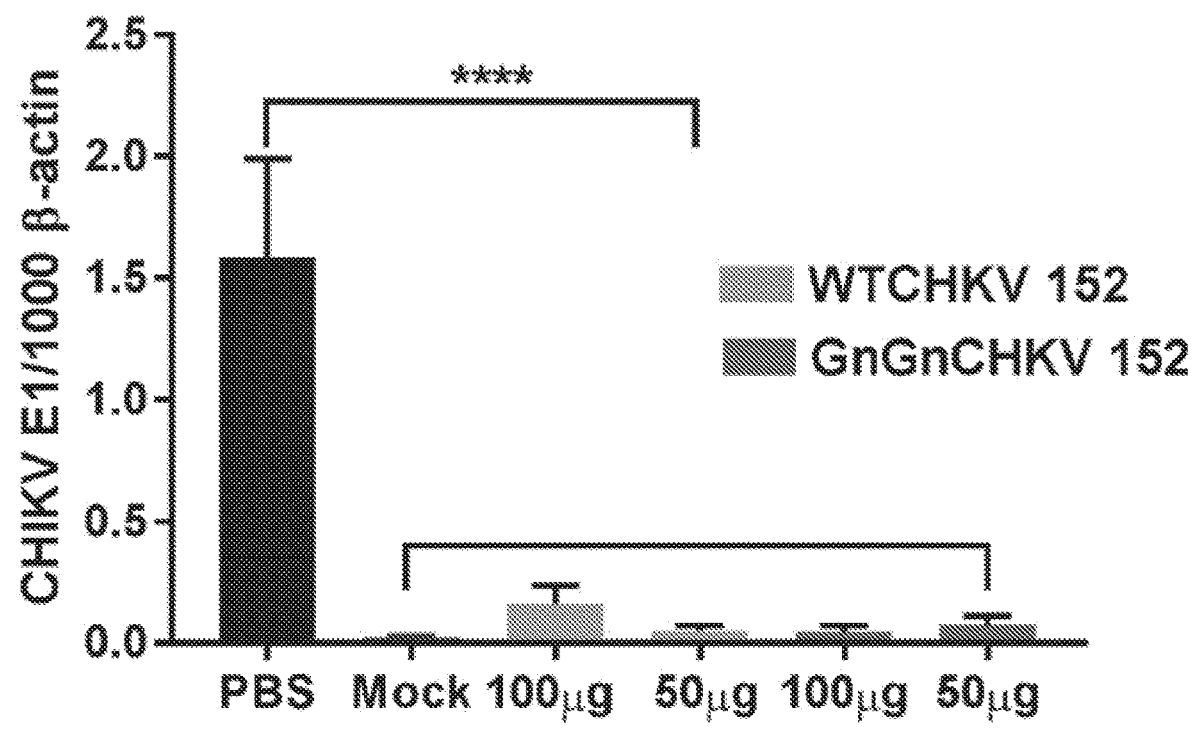

One major hallmark of CHKV infections is the acute viral titers and increased swelling in the joints. Among mouse models of CHKV infection, WT mice (i.e. WT C57BL/6) develop foot/ankle swelling and arthritis symptoms similar to those observed in humans. Thus, the prophylactic efficacy of the mAbs was evaluated using the WT C57BL/6 mouse model. Five-week-old C57BL/6 mice were mock-treated or pretreated with 50 or 100 μg of WTCHKV 152, GnGnCHKV 152 or PBS intraperitoneally 24 hours before being inoculated in the footpad with $1\times10^5$ PFU of CHKV. First, the ability of mAb variants in reducing viral load in CHKV-infected mice was examined. The viremia at 2 days post infection (dpi) was measured by RT-qPCR as viremia generally peaks at 2 dpi and subsides to undetectable levels at 4 dpi in this mouse model. Pretreatment of mice with WTCHKV 152 and GnGnCHKV 152 both markedly reduced viral loads in serum at 2 dpi relative to the PBS control (p<0.0001) (FIG. 5A). The viremia of mAb-treated mice is statistically similar to that of the mock-infected mice (p>0.99) (FIG. 5A).

Figure 5B:
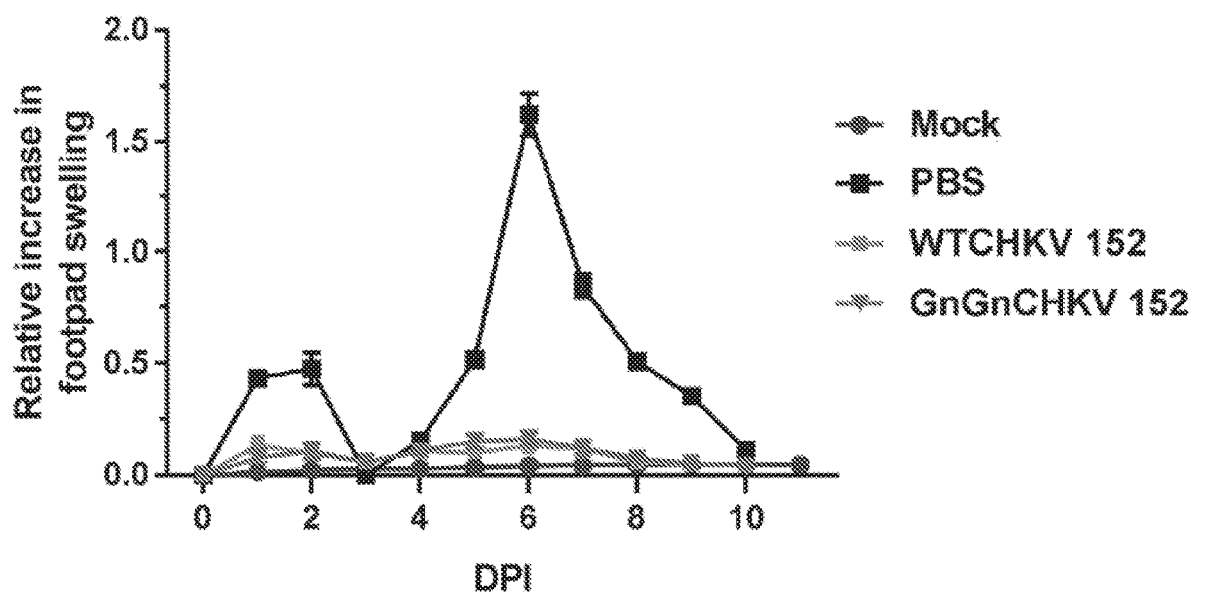

Mice were also monitored for virus-induced footpad swelling daily up to 10 dpi. Consistent with their ability to reduce viremia, pretreatment of CHKV-infected mice with as little as 50 μg of either WTCHKV 152 or GnGnCHKV 152 completely protected against CHKV-induced swelling indistinguishable from the non-infected mice (mAb treated compared to mock-infected, p>0.9400) (FIG. 5B). In contrast, PBS-treated infected mice developed apparent swelling (mAb treated compared to PBS-treated, p<0.0004) with the typical CHKV-induced biphasic pattern with a first (minor) peak at 2-3 dpi and the second (major) peak at 6 dpi (FIG. 5B) corresponding to tissue edema and immune cell infiltration, respectively. These data demonstrated that CHKV 152 prevented acute symptoms of CHKV infection, therefore, supporting the prophylactic application of the mAb.

Figure 6A:
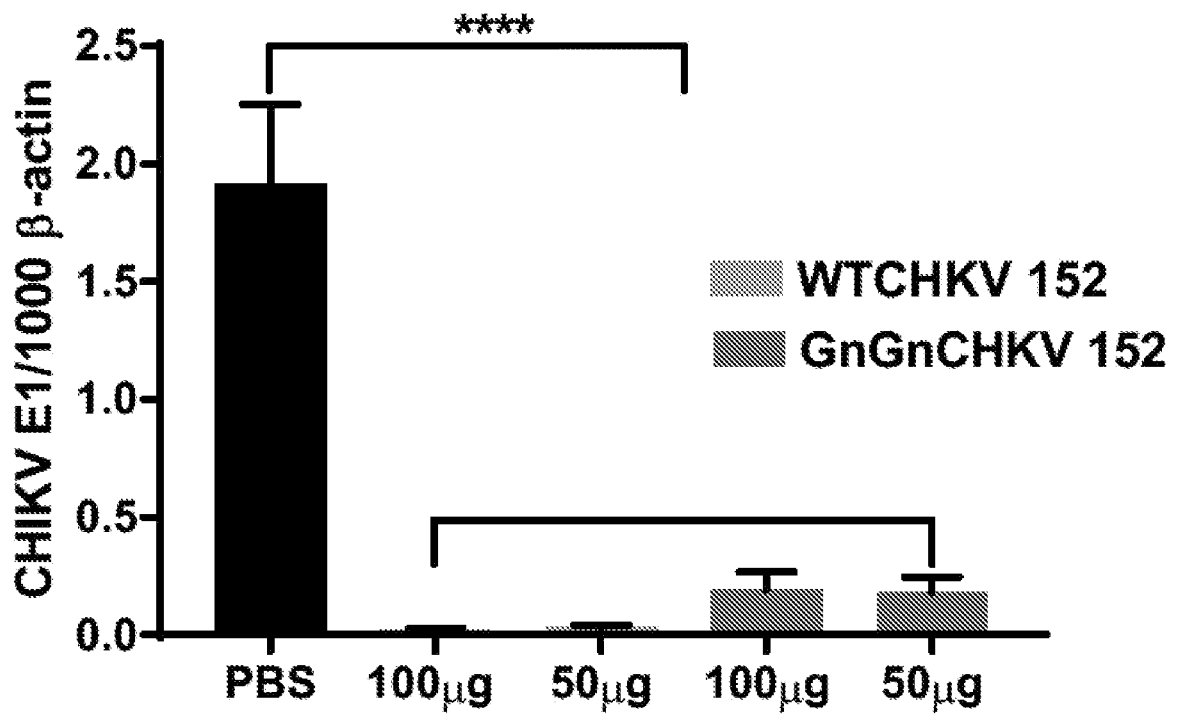
Figure 6B:
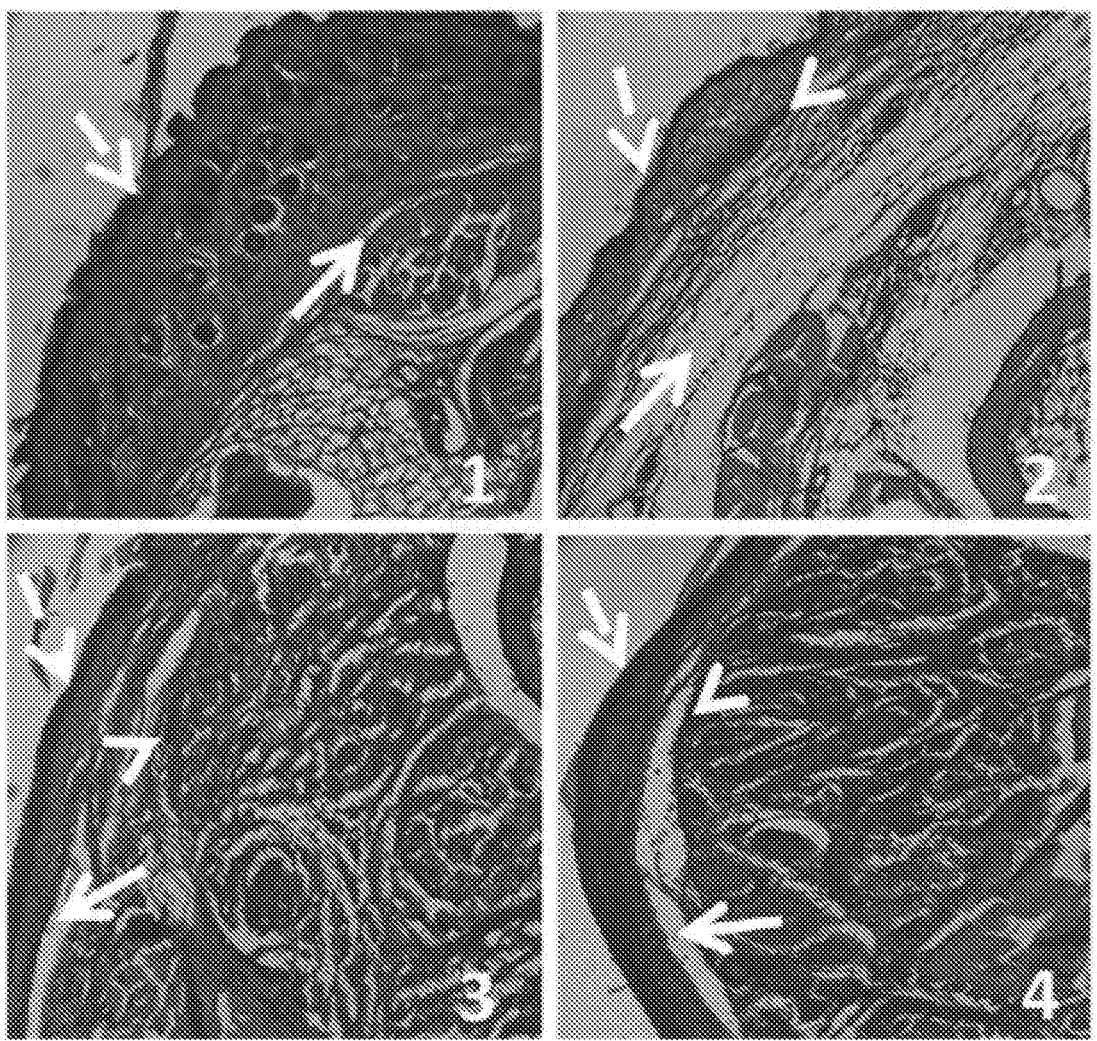
FIG. 6B. Photomicrograph images showing that post-exposure treatment with plant-derived CHKV 152 reduces tissue damage. Wild-type C57BL/6J mice (N=6 per group) were subcutaneously infected with 1×10$^5$ PFUs of CHIKV or PBS (mock) and treated intraperitoneally with 100 μg of indicated CHKV 152 glycovariants or PBS (negative control) 12 hr after infection. Pathological histology of footpad at 6 dpi. Panel 1: mock (noninfected); Panel 2: Infected, treated with saline; Panel 3: Infected, treated with WTCHKV 152; Panel 4: infected, treated with GnGnCHKV 152. Damage by CHIKV infection and the therapeutic effect of CHKV 152 on connective tissue (arrow), subcutaneous tissue (dashed arrow) are shown. Leukocyte infiltration is also shown (arrowhead).

Example 8: Therapeutic Potency of CHKV 152 Depends on its N-Glycosylation Profile The post-exposure therapeutic efficacy of the mAb glycovariants was also evaluated by their ability in reducing viremia and foodpad swelling, as well as by histopathological analysis. Specifically, five-week-old C57BL/6 mice were inoculated in the footpad with $1\times10^5$ PFU of CHKV and then treated intraperitoneally with 50 or 100 μg of mAb glycovariants or PBS at 12 hours post infection. As observed in prophylaxis studies, WTCHKV 152 and GnGnCHKV 152 treatment both significantly reduced viremia at 2 dpi, compared to the PBS control (p<0.0001) (FIG. 6A). The serum viral loads in WTCHKV 152-treated mice were slightly lower than those of GnGnCHKV 152-treated mice, but without statistical significance (p>0.9394). Similarly, histopathological analysis of mice footpads at peak swelling (6 dpi) corroborated the therapeutic potency of the mAb glycovariants. Compared to mock-infected mice (FIG. 6B1), CHIKV-infected mice treated with PBS developed severe connective tissue damage and subcutaneous necrosis with apparent infiltration of leukocytes (FIG. 6B2). In contrast, mice treated with 100 μg of WTCHKV 152 and GnGnCHKV 152 had intact subcutaneous tissue similar to non-infected mice and much reduced connective tissue disruption (FIG. 6B3-4). Nevertheless, leukocyte infiltration was still noticeable in the footpad of mAb treated mice.

Figure 7B:
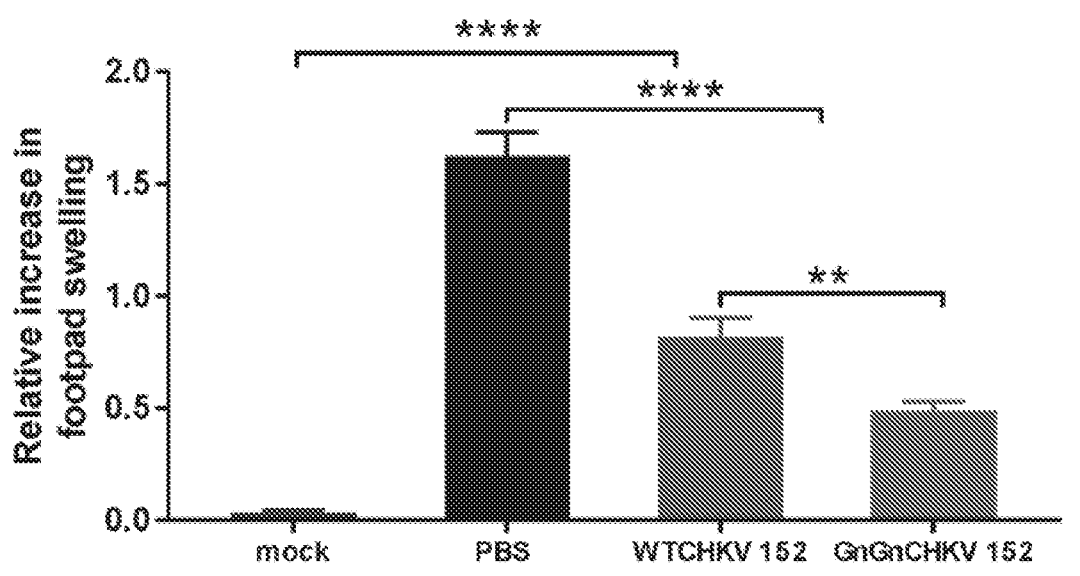

Post-exposure treatment with 50 μg of mAb glycovariants also markedly reduced the second peak of virus-induced footpad swelling in comparison to the PBS-treat control (p<0.0001) (FIG. 7A). Notably, the results revealed significant differences in swelling depending on the glycan profile of the mAb. WTCHKV 152 reduced the footpad swelling at 5, 6, and 7 dpi (p<0.0001 compared to PBS-treated) (FIG. 7A) and the swelling was further reduced in mice treated with GnGnCHKV 152, reaching statistical significance at 6 dpi, (compared with WTCHKV 152, p<0.0015) (FIG. 7A and FIG. 7B). These data suggest that Fc effector functions contribute to the efficacy of CHKV 152 and these functions can be modulated by N-glycan variation which affects Fc and FcγR interactions.

Example 9: Antibody Dependent Cellular Cytotoxicity of CHKV 152 Glycovariants

Figure 8A:
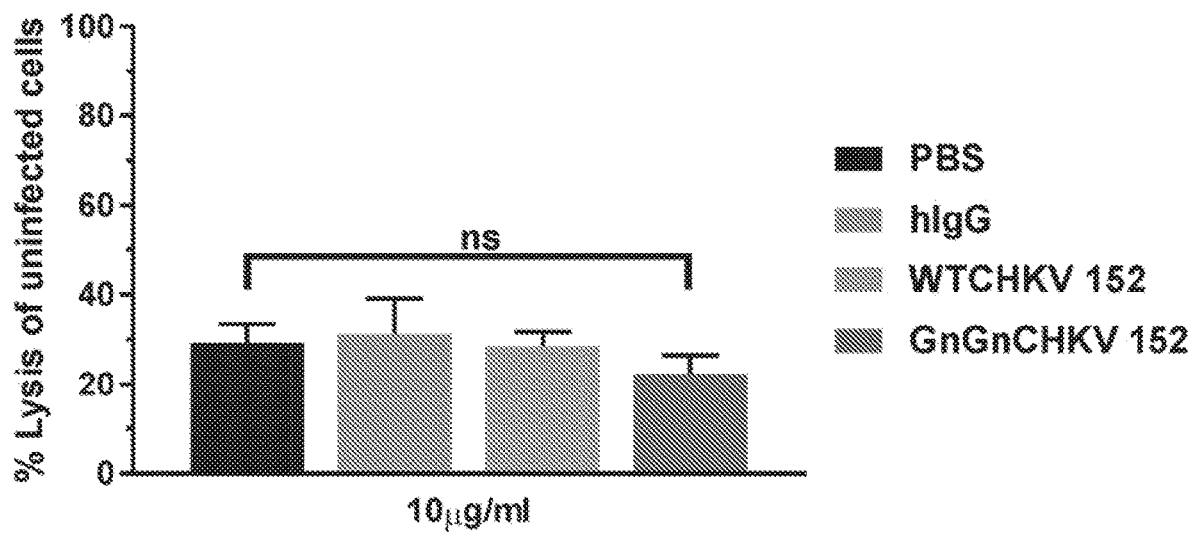
Figure 8B:
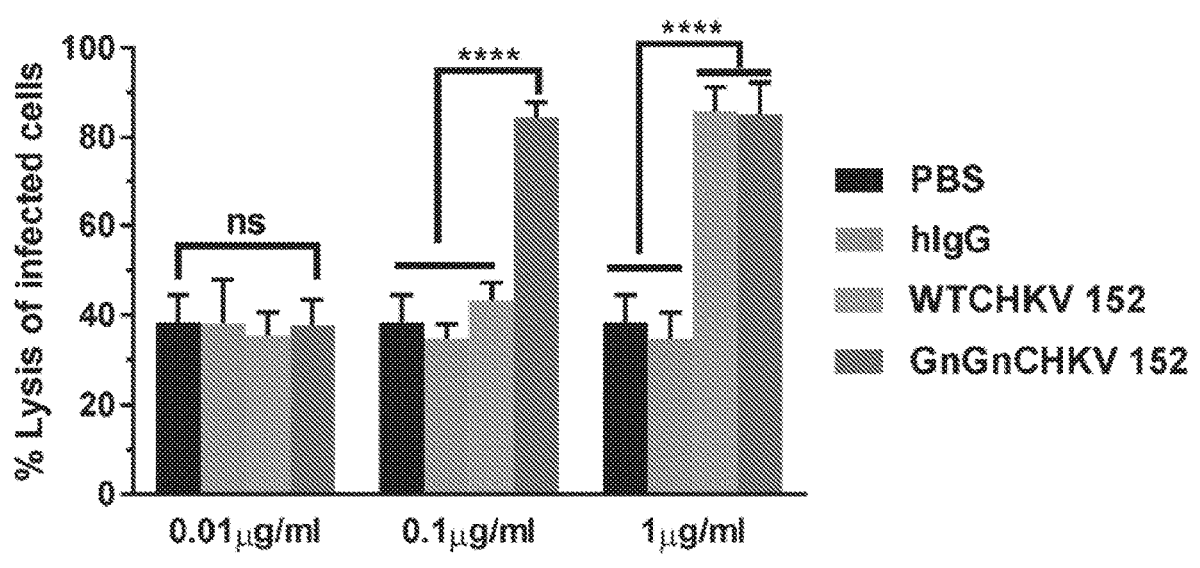

To define how Fc effector functions may contribute to the potency of anti-CHIKV mAbs, the natural killer (NK) cell-mediated antibody dependent cellular cytotoxicity (ADCC) activity of CHKV 152 glycovariants was examined. Uninfected or CHIKV-infected Vero cells (target cell) were incubated with PBS, WTCHKV 152, GnGnCHKV 152, or a IgG isotype negative control and then exposed to NK cells (effector cell); and target cell killing (lysis) was measured. WTCHKV 152 and GnGnCHKV 152 did not show specific ADCC activity to uninfected target cells even at high concentrations when compared to PBS or the isotype negative control (p>0.24) (FIG. 8A). In contrast, WTCHKV 152 and GnGnCHKV 152 both showed strong ADCC activity against CHIKV-infected cells at concentrations≥1 μg/ml (p<0.0001, compared to PBS and IgG isotype negative control) (FIG. 8B). At lower concentrations, however, significant differences in ADCC activity was observed depending on then N-glycosylation of the mAb, with GnGnCHKV 152 mediating dramatic higher ADCC activity than WTCHKV 152 (p<0.0001) (FIG. 8B). The enhanced ADCC activity of GnGnCHKV 152 correlates with its increased in vivo therapeutic potency over WTCHKV 152. These results demonstrated that CHKV 152 are able to activated immune cells to clear CHIKV-infected cells via ADCC, which may serve as one of the mechanisms of Fc effectors functions for the observed enhancement of in vivo efficacy by GnGnCHKV 152.

Discussion for Examples 1-9

Here, the contribution of effector functions to mAb in vivo efficacy was evaluated by producing mAb N-glycovariants with high glycan uniformity and testing them in a mouse model of CHIKV-induced arthritis. Using a plant expression system that produces glycovariants of anti-CHIKV E1 and E2 mAbs with two distinct and homogeneous N-glycan structures, it is shown that the nature of antibody Fc N-glycans affects the Fc-FcγR interaction and effector functions, and in turn, modulates in vivo efficacy against CHIKV infection and foot swelling during the acute phase of disease. Although the neutralization potency of the glycovariants are identical, the mAb that displayed the GnGn glycoform has higher affinity to FcγRs and superior in vivo therapeutic efficacy. In contrast, clinical protection was not as high for the glycovariant that has lower affinity to FcγRs. The mAb glycoform that conferred strong in vivo efficacy in CHIKV-challenged mice also had increased ADCC activity, indicating that immune cells may participate in the mAb-dependent reductions in clinical diseases via ADCC when engaged by mAb glycovariants with enhanced affinity to FcγRs.

For example, mAbs against the preS1 domain of Hepatitis B virus (HBV) large envelope protein protect mice from HBV infection largely through Fc-mediated immune effector functions. FcγR interactions were also shown to contribute to the therapeutic activity of broadly neutralizing mAbs against human immunodeficiency virus (HIV). The impact of Fc effector function for CHIKV mAb efficacy has only began to emerge very recently. Using transgenic mice that lack activating FcγRs or mAb mutants that completely forgo FcγR engagement, Fc-FcγR interactions were found to be required for the full therapeutic potency of anti-CHIV E1 and E2 human IgG1-type mAbs in a WT mouse mode.

The present disclosure addresses the participation of antibody Fc effector functions in the overall efficacy of mAb-based therapy for viral infections. The studies presented herein use glycovariants of an anti-CHIKV E2 and E1 human IgG1 mAbs that have either baseline or enhanced FcγR engagement activities, respectively. The results confirm the contribution of Fc effector functions in reducing clinical diseases, but also for the first time clarify how mAb sugar moieties regulate Fc effector functions and in vivo efficacy against CHIKV.

The interaction between the IgG Fc domain and FcγR on immune cells is highly sensitive to the composition of N-linked Fc glycans. However, the impact of glycosylation on the overall efficacy of mAb-based drugs is not thoroughly understood. Studies on the clinical efficacy of anti-cancer mAb drugs have shown that activation of antibody effector functions is a major mechanism of action for approved drugs including rituximab, trastuzumab and cetuximab, which have been shown to kill cancer cells by their potent ADCC or CDC activities. However, studying the influence of sugars on effector functions and improving effector function by glycan manipulation are often impeded by the difficulty of producing mAbs with homogenous N-glycans. MAbs produced in mammalian cells usually carry a mixture of N-glycans, with some glycoforms being more bioactive than others. In contrast, plant-produced mAbs usually bear a single dominant N-glycan structure due to a drastically reduced repertoire of glycoenzymes in plant cells. Consequently, a portfolio of N. benthamiana lines have been developed by glycoengineering to produce mAbs that carry various distinct yet uniform mammalian glycoforms, offering the opportunity of producing mAbs with tailor-made N-glycans. In this study, a GnGn mAb glycovariant was generated using a N. benthamiana mutant lacking core xylose and fucose. This GnGn glycovariant exhibited increased binding to FcγRs, enhanced ADCC activity, and more potent in vivo efficacy against CHIKV infection over its WT counterpart, revealing the importance of N-glycan structures, especially the GnGn structure, for the Fc effector functions and in vivo efficacy of CHIKV mAbs. Since the GnGn glycoform does not affect the antigen binding and the serum half-life of IgGs, the strategy of using glycoengineered plants to optimize mAbs may also be applicable to other mAbs.

NK cells, neutrophils and macrophages are examples of immune cells that express activating FcγRs that can be engaged by the Fc region of mAbs to clear infected cells via ADCC or antibody-dependent cell-mediated phagocytosis (ADCP). NK cells are an important mediator of innate immune defense and their importance in controlling early viral infections have been demonstrated for several human viruses including HIV, Herpes simplex virus (HSV), and Cytomegalovirus (CMV). The results presented herein demonstrate that an anti-CHIKV E2 mAb with homogenous GnGn N-glycans are able to activate human NK cells to clear CHIKV-infected cells via ADCC, suggesting a potential role of NK cells in fighting human CHIKV infection. FcγRIIIA usually has low affinities to IgGs. Due to its increased affinity to FcγRIIIA, glycovariant GnGnCHKV 152 may be more potent in activating NK-mediated ADCC than regular human IgGs with baseline affinities. The mouse ortholog of human FcγRIIIA (mFcγRIV) is not expressed on mouse NK cells but on mouse monocytes and neutrophils. Since CHKV 152 is a human IgG1 which has similar Fc and complement binding specificities as mouse IgG2a/c to mouse FcγRs), GnGnCHKV 152 may also have enhanced binding to mFcγRIV, leading to increased activation of ADCC via mouse monocytes and neutrophils, and in turn, the observed enhancement of in vivo efficacy. As GnGnCHKV 152 also displayed enhanced binding to other FcγRs, other immune cells expressing these FcγRs and complement may also contribute to the enhanced in vivo efficacy. Further studies of mAb glycovariants with enhanced affinity to FcγRs are warranted to understand the effect of Fc-FcγR affinity on the engagement of various immune cells in viral clearance and reduction of inflammation/arthritis during acute CHIKV infection.

The results presented herein also indicate that anti-CHIKV human mAbs can be effective prophylaxis to prevent infection during epidemics, especially for populations with high risk of developing severe diseases. Combined with the rapid and low cost nature of plant transient expression systems, the study also demonstrates that glycoengineered plants provide a powerful strategy for the rapid screening and optimization of mAb therapeutics.

Materials and Methods for Examples 1-9

Vector Construction for Expression of CHKV 152 and 166

Figure 9:
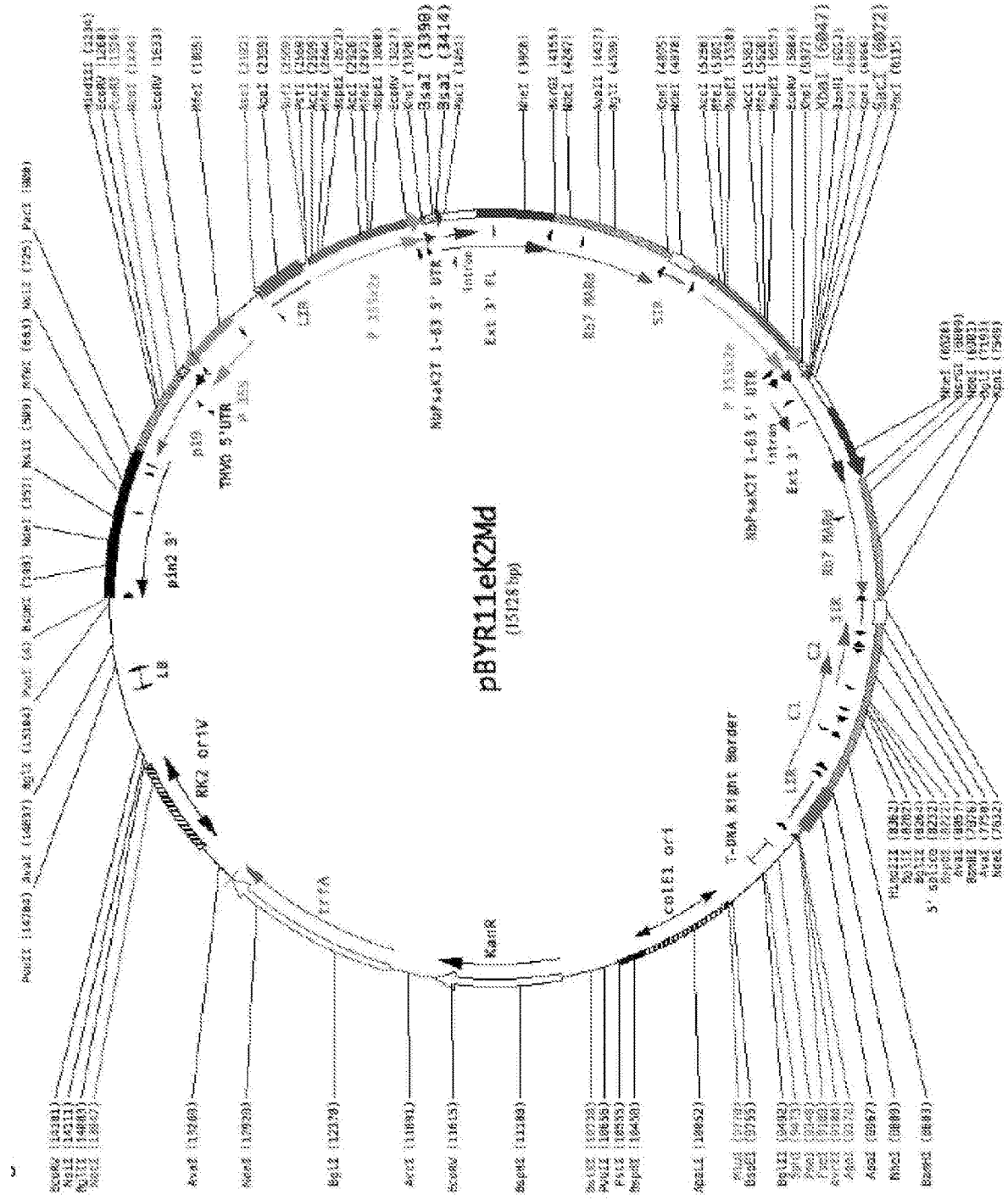
FIG. 9. Map of gemini virus-based vector for expressing mAbs in plants. LIR: long intergenic region of BeYDV genome; SIR: short intergenic region of BeYDV genome; C1/C2: BeYDV ORFs C1 and C2, encoding replication initiation protein (Rep) and RepA; LB and RB, the left and right borders of the T-DNA.

The coding sequence of CHKV 152 and 166 variable region of HC (VH) and LC (VL) was fused to the corresponding DNA sequences of human IgG1 constant regions of HC (CH) and LC (CL), respectively. The resulting HC and LC coding sequences were cloned into a Geminivirus vector (pBYR11eK2Md) or MagnICON-based plant expression vectors pICH21595 and pICH11599, and transformed into *A. tumefaciens* as described previously (FIG. 9).

Transient Expression of CHKV 152 and 166 in *N. benthamiana* Leaves

Wild-type and ΔXFT *N. benthamiana* plants were grown and agroinfiltrated with *A. tumefaciens* strains that contain CHKV152 or 166 HC and LC constructs.

Extraction and Purification of pCHKV 152 and 166 from Plants

Agroinfiltrated leaves were harvested 4 dpi (CHKV 152) or 7 dpi (CHKV 166) and mAbs were extracted and purified. Briefly, the crude leaf extract was obtained by homogenization in extraction buffer (1×PBS pH5.2, 10 mg/ml Sodium Ascorbate, 1 mM EDTA) and clarified by centrifugation at 15,000×g for 30 min at 4° C. CHKV 152 in clarified protein extract were purified by a two-step purification process comprised of low pH precipitation followed by protein A affinity chromatography.

Protein Analyses

SDS-PAGE (10% or 4-20% gradient) electrophoresis was performed either under reducing (5% v/v β-mercaptoethanol) or non-reducing conditions. SDS-PAGE gels were stained with Coomassie blue. For western blot analysis, proteins on SDS-PAGE gels were transferred onto PVDF membranes and detected with horseradish peroxidase (HRP)-conjugated antibodies against human-kappa LC or gamma HC (Southern Biotech).

The expression level of CHKV 152 and 166 was measured by an ELISA that detected the fully assembled form of mAbs with both HC and LC. Briefly, plates were coated with an anti-human gamma HC antibody (Southern Biotech) and incubated with the plant protein extract. After washing, a HRP-conjugated anti-human-kappa LC antibody (Southern Biotech) was used for detection. A plant produced mAb with human IgG1 CH and kappa CL (E16) was used as a reference standard.

N-Linked Glycan Analysis

LC-ESI-MS was used to determine the N-linked glycosylation profiles of CHKV 152 or 166 variants as previously reported. Briefly, the HC band of purified CHKV mAbs on Coomassie-stained SDS-PAGE was excised from the gel. Peptide fragments were generated by S-alkylation and tryptic or tryptic/GluC digestion and subsequently eluted from the gel with 50% acetonitrile. Peptide fragments were then separated on a Reversed Phase Column (150×0.32 mm BioBasic-18, Thermo Fisher Scientific) with a 1%-80% acetonitrile gradient. Glycopeptides were analyzed with a quadruple time-of-flight (Q-TOF) Ultima Global mass spectrometer (Waters, Milford, MA, USA). Spectra were summed and deconvoluted for identification of glycoforms. The ProGlycAn nomenclature (www.proglycan.com) was used to annotate the glycans.

Virus and Cells

CHIKV (strain LR-OPY1) was propagated and tittered in Vero cells (ATCC, CCL-81). Vero cells were cultured in DMEM supplemented with 10% FBS at 37° C. in an incubation with 5% CO2.

CHIKV Neutralization and Plaque Assay

Plaque reduction neutralization test (PRNT) was performed as previously described. Specifically, mAbs were serially diluted in phosphate-buffered saline (PBS), while CHIKV was diluted in serum-free DMEM to a working concentration of 100 plaque forming units (PFU) per well. Following dilutions, mAbs were added to CHIKV and incubated for 1 hr at 37° C. CHIKV-mAb mixes were then added to a 90-95% confluence Vero cells in a 6-well tissue culture plate and incubated for 1 hr at 37° C. for virus attachment. After removing unattached virus-mAbs in the medium, cells were overlaid with fresh media (complete DMEM containing 1% sea plaque agarose, Lonza) and incubated for an additional 3 days at 37° C. Plaques were visualized by staining with neutral red (Sigma) and counted. Percent (%) neutralization was calculated as: [(number of CHIKV plaque per well with no mAb)−(number of CHIKV plaque per well of diluted mAb)/(number of CHIKV plaque per well with no mAb)×100]. Experiments were repeated twice. The half maximal effective concentration ($EC_{50}$) of each mAb was calculated using GraphPad Prism software (Version 6.0).

Animal Studies

Female C57BL/6J mice (5 weeks old, 6 mice per group) were purchased from the Jackson Laboratory and subcutaneously inoculated on the ventral side of the right hind footpad with 105 PFUs of CHIKV. Mice were intraperitoneally inoculated with anti-CHIKV MAbs before (prophylactic treatment) or after (post-exposure therapeutic treatment) CHIKV infection. The height (thickness) and breath (width) of the peri-metatarsal area of inoculated footpad were measured daily for up to 10-day post infection (dpi.) by using a digital caliper (Electron Microscopy Science) and the footpad swelling was expressed as the relative increase in footpad compared to pre-infection. In addition, mice were bled retro-orbitally at 2 dpi. to measure viremia.

Real Time-Quantitative PCR (RT-qPCR)

Total RNA was isolated from mouse blood samples using TRI-reagent (Molecular Research Center, Inc.). The first-strand complementary DNA (cDNA) was synthesized by using the iSCRIPT cDNA synthesis kit (Bio-Rad). CHIKV envelope protein 1 (CHIKV E1) and cellular β-actin RNA copy numbers were determined by RT-qPCR in a CFX96 Real-Time system (Bio-Rad) using SYBR Green supermix (Bio-Rad). Viral copy numbers were expressed as the ratio of CHIKV E1 to cellular β-actin.

Histology

Histological examination of mice footpad was done as previously described. Briefly, representative CHIKV-infected mice were sacrificed and footpads were collected at peak swelling (6 dpi). After an overnight fixation in 4% paraformaldehyde followed by decalcification in 10% EDTA for over 10 days, tissues were paraffin embedded and sectioned (10 µm) with a microtome (American Optical Spencer 820). Hematoxylin and eosin (H&E) stained images were acquired in a bright-field microscope (Olympus BH2).

ADCC Assay for CHIKV Infected and Non-Infected VERO Cells

Culture dishes (100 mm) were seeded with $3×10^6$ Vero cells in DMEM with 5% FBS. Twenty-four hours later, cells were mock-infected or infected with 0.05 MOI of CHIKV and incubated for additional 48 hours. Vero cells were then rinsed with PBS and dislodged using a cell scrapper in PBS with 8 mM EDTA, and resuspended in MEM media with 5% FBS at 1 million/ml. Subsequently, Calcein AM (Invitrogen, C3099) was added to Vero cells to a final concentration of 5 µg/ml. After 1-hour incubation at 37° C., Vero cells were washed and resuspended in RPMI with 10% FBS at 0.1 million/ml. Vero cells were incubated with mAb variants at room temperature for 15 minutes before the initiation of the assay.

In the meantime, NK cells were expanded from human peripheral blood mononuclear cells (PBMCs) and cultured in RPMI with 10% FBS plus 50 unit/ml human IL-2 for 24 hours. To initiate the assay, IL-2 treated NK cells and mAb-Vero cell mixture were added to wells of a V bottom plate at a density for each cell population to achieve a Effector cell/Target cell (E/T) ratio of 1.25 to 1. The plate was incubated at 37° C. for 4 hours before centrifuged at 100×g for 5 minutes. The supernatant which contained the Calcein AM released by lysed target cells was transferred to a black assay plate with clear bottom for fluorescence reading (excitation=485 nm, emission=530 nm). For control wells, Triton X-100 (2%) or RPMI media was used in place of NK cells to measure "maximum release" and "spontaneous release", respectively. The % of target cell lysis was calculated according to the formula=[(test release−spontaneous release)/(maximum release−spontaneous release)]×100. Each sample was measured in triplicates.

Example 10. Antibody-Dependent Enhancement Activity of Plant-Produced CHKVmab for DENV Infection One of the challenges for mAb therapeutics against viral infections is the increased risk of infection by other viruses in treated patients via the mechanism of antibody-dependent enhancement of infection (ADE). For example, cross-reactive but sub-neutralizing antibodies against one serotype of DENV from a previous infection can form complexes with another serotype of DENV during a secondary infection to promote viral infection of FccR-bearing myeloid cells, predisposing patients to develop the more severe dengue haemorrhagic fever/dengue shock syndrome through ADE. Since the E proteins of CHIKV and DENV are related and the two viruses cocirculate geographically, It was examined whether CHKVmab would enhance the infection of DENV.

The potential enhancing activities of the anti-CHIKV mAbs for DENV infection were examined by using FccRIIa+ K562 cells (ATCC, CCL-2243). Serial dilutions of CHKVmabs or the positive control mAb 4G2 were initially incubated with DENV-2 (ATCC, VR-1584) for 1 hr at 37° C. Thereafter, the mAb-virus complexes were incubated with K562 cells (MOI=1) for 48 h. Cells were then fixed with 4% paraformaldehyde (Sigma), permeabilized with 0.1% saponin (Sigma), and stained with Alexa 488 (Invitrogen)-conjugated 4G2 (ATCC, HB112). Stained cells were washed and analysed with a Navios flow cytometer (Beckman Coulter) to determine the percentage of infected cells.

As previously demonstrated, the 4G2, a mAb that cross-reacts with E of most flaviviruses used here as a positive control, efficiently caused ADE of DENV infection in K562 cells that express the human FccR (FIG. 10). In contrast, ΔXFpCHKVmab, used here as a negative control, and WTpCHKVmab did not promote ADE for DENV (FIG. 10). These results indicate that plant-produced CHKVmabs are not only efficacious but also safe as potential treatment against CHIKV infection.

| SEQ ID NO | Sequence | Name |
|---|---|---|
| 1 | CGATCGGTCGATTCATAGAAGATTAGATTT TTCATAGTATTTTTTTAAAGTAAACCTTTA ACTACGGTTAGGACACTTTTAAGTTAAATT TAATTTGAACCCTTAAATTAATTTTTAAAA | pBYR11eK2Md plasmid |

| SEQ ID NO | Sequence | Name |
|---|---|---|
| | TAGATAAATATCAATCATCCTGATATGCTT | |
| | TTGAAAAAATGAATGAGAAAGATGATTCAA | |
| | TTAAGGCCACATTTTAATCATGACTAAAAT | |
| | AATATACAGTATAATTTCATATATATTTGC | |
| | TTTAAAAAAAAATTGACAATCCATTCGTTT | |
| | CTAGCAATAAATTTCTTCAACCACAAATAT | |
| | ATTAAAGATAACTACGGCATAGAAACAAAA | |
| | ATCTATGAAGAATTTTTGTATACTTCTATT | |
| | GAAATTAAAAAAAACTTCATTGAACATCAA | |
| | AATAATAATAATAATCATAAACTCCTCAAT | |
| | ATTTATATTCCTAGCTTCTTGAATTAAATT | |
| | GTTTACATATTCAACGATGTAAAAAATTAT | |
| | TTCTCTATCTATTTTCCTTATATCATGCAT | |
| | GGTTTCACATATATCAAAGGATAAAAGCAA | |
| | TCTATGTAAATTATCTCACTTTATTAAGTT | |
| | TTCTATCTGAATTATTGAGAACGTAGATTT | |
| | CTTTTTGCACTATCCCCCAATAATTAGCAA | |
| | AACACACCTAGACTAGATTTGTTTTGCTAA | |
| | CCCAATTGATATTAATTATATATGATTAAT | |
| | ATTTATATGTATATGGAATTGGTTAATAAA | |
| | ATGCATCTGGTTCATCAAAGAATTATAAAG | |
| | ACACGTGACATTCATTAGGATAAGAAATA | |
| | TGGATGATCTCTTTCTCTTATTCAGATAAT | |
| | TAGTAATTACACATAACACACAACTTTGAT | |
| | GCCCACATTATAGTGATTAGCATGTCACTA | |
| | TGTGTGCATCCTTTTATTTCATACATTAAT | |
| | TAACTTGGCCAATCCAGAAGATGGACAAGT | |
| | CTAGGGTCACATTGCAGGGTACTCTAGcTT | |
| | ACTCGCCTTCTTTTTCGAAGGTTTGAGTAC | |
| | CTTCAGGGCATCCTCTTGATACATTACTTT | |
| | CCACTTCGATTGGGGCAAGCTGTAGCAGTT | |
| | CTTGCTTAGACCGAATTGCCATCTCACAGA | |
| | GATGCTGAAGAGTTCGCGACCCTCCAGAAA | |
| | CGGTGATACTAACTCCTCGAAACCGAATAC | |
| | TATAGGTACATCCGATCTGGTCGAAACCGA | |
| | AAAATCGAGATGCTGCATAGTTAACCGAAT | |
| | CTCCCGTCCAAGATCCAAGGACTCTGTGCA | |
| | GTGAAGCTTCCGTCCTGTCGTATCTGAGAT | |
| | ATCTCTTAAATACAACTTTCCCGAAACCCC | |
| | AGCTTTCCTTGAAACCAAGGGGATTATCTT | |
| | GATTCGAATTCGTCTCATCGTTATGTAGCC | |
| | GCCACTCAGTCCAACTCGGACTTTCGTCAG | |
| | GAAGTTTGAAGGGAAGTtGTACCTCCTG | |
| | ATCCTCCATCCCAACGTTCACTGTTAGCTT | |
| | GTTCCCTAGCGTCGTTTCCTTGTATAGCTC | |
| | GTTCCATGGATTGTAAATAGTAATTGTAAT | |
| | GTTGTTTGTTGTTTGTTGTTGTTGGTAATT | |
| | GTTGTAAAAATACGCTCTCCAAATGAAATG | |
| | AACTTCCTTATATAGAGGAAGGGTCTTGCG | |
| | AAGGATAGTGGGATTGTGCGTCATCCCTTA | |
| | CGTCAGTGGAGATATCACATCAATCCACTT | |
| | GCTTTGAAGACGTGGTTGGAACGTCTTCTT | |
| | TTTCCACGATGCTCCTCGTGGGTGGGGTC | |
| | CATCTTTGGGACCACTGTCGGCAGAGGCAT | |
| | CTTCAACGATGGCCTTTCCTTTATCGCAAT | |
| | GATGGCATTTGTAGGAGCACCTTCCTTTT | |
| | CCACTATCTTCACAATAAAGTGACAGATAG | |
| | CTGGGCAATGGAATCCGAGGAGGTTTCCGG | |
| | ATATTACCCTTTGTTGAAAAGTCTCAATTG | |
| | CCCTTTGGTCTTCTGAGACTGTATCTTTGA | |
| | TATTTTTGGAGTAGACAAGTGTGTCGTGCT | |
| | CCACCATGTTCTGGCAATTCCGGTTCGCTT | |
| | GCTGTCCATAAAACCGCCCAGTCTAGCTAT | |
| | CGCCATGTAAGCCCACTGCCAAGCTACCTGC | |
| | TTTCTCTTTGCGCTTGCGTTTTCCCTTGTC | |
| | CAGATAGCCCAGTAGCTGACATTCATCCGG | |
| | GGTCAGCACCGTTTCGCGGACTGGCTTTC | |
| | TACGTGTTCCGCTTCCTTTAGCAGCCCTTG | |
| | CGCCCTGAGTGCTTGCGGCAGCGTGAagct | |
| | ggcgcgCCGCTCTAGCAGAAGGCATGTTGT | |
| | TGTGACTCCGAGGGGTTGCCTCAAACTCTA | |
| | TCTTATAACCGGCGTGGAGGCATGGAGGCA | |
| | AGGGCATTTTGGTAATTTAAGTAGTTAGTG | |
| | GAAAATGACGTCATTTACTTAAAGACGAAG | |
| | TCTTGCGACAAGGGGGGCCCACGCCGAATT | |

| SEQ ID NO | Sequence | Name |
|---|---|---|
| | TTAATATTACCGGCGTGGCCCCACCTTATC | |
| | GCGAGTGCTTTAGCACGAGCGGTCCAGATT | |
| | TAAAGTAGAAAAGTTCCCGCCCACTAGGGT | |
| | TAAAGGTGTTCACACTATAAAAGCATATAC | |
| | GATGTGATGGTATTTGATGGAGCGTATATT | |
| | GTATCAGGTATTTCCGTCGGATACGAATTA | |
| | TTCGTACGACCCTCCTGCAGGTCAACATGG | |
| | TGGAGCACGACACACTTGTCTACTCCAAAA | |
| | ATATCAAAGATACAGTCTCAGAAGACCAAA | |
| | GGGCAATTGAGACTTTTCAACAAAGGGTAA | |
| | TATCCGGAAACCTCCTCGGATTCCATTGCC | |
| | CAGCTATCTGTCACTTTATTGTGAAGATAG | |
| | TGGAAAAGGAAGGTGGCTCCTACAAATGCC | |
| | ATCATTGCGATAAAGGAAAGGCCATCGTTG | |
| | AAGATGCCTCTGCCGACAGTGGTCCCAAAG | |
| | ATGGACCCCCACCCACGAGGAGCATCGTGG | |
| | AAAAAGAAGACGTTCCAACCACGTCTTCAA | |
| | AGCAAGTGGATTGATGTGATAACATGGTGG | |
| | AGCACGACACACTTGTCTACTCCAAAAATA | |
| | TCAAAGATACAGTCTCAGAAGACCAAAGGG | |
| | CAATTGAGACTTTTCAACAAAGGGTAATAT | |
| | CCGGAAACCTCCTCGGATTCCATTGCCCAG | |
| | CTATCTGTCACTTTATTGTGAAGATAGTGG | |
| | AAAAGGAAGGTGGCTCCTACAAATGCCATC | |
| | ATTGCGATAAAGGAAAGGCCATCGTTGAAG | |
| | ATGCCTCTGCCGACAGTGGTCCCAAAGATG | |
| | GACCCCCACCCACGAGGAGCATCGTGGAAA | |
| | AAGAAGACGTTCCAACCACGTCTTCAAAGC | |
| | AAGTGGATTGATGTGATATCTCCACTGACG | |
| | TAAGGGATGACGCACAATCCCACTATCCTT | |
| | CGCAAGACCCTTCCTCTATATAAGGAAGTT | |
| | CATTTCATTTGGAGAGGACCTCGAGAAACA | |
| | AACAAAATCAACAAATATAGAAAATAACGC | |
| | ATTTCCAATTCTTTGAAATTTCTGCAACAT | |
| | ctagcgagaccaacaacggtctctagctcg | |
| | aagtgacatcacaaagttgaaggtaataaa | |
| | gccaaattaattaagacattttcataatga | |
| | tgtcaagaatgcaaagcaaattgcataact | |
| | gccttttatgcaaaacattaatataatataa | |
| | attataaagaactgcgctctctgcttctta | |
| | ttttcttagcttcatttattagtcactagc | |
| | tgttcagaatttcagtatcttttgatatt | |
| | actaagaacctaatcacacaatgtatattc | |
| | ttatgcaggaaaagcagaatgctgagctaa | |
| | aagaaaggctttttccattttcgagagaca | |
| | atgagaaagaagaagaagaagaagaagaa | |
| | gaagaagaaaaagagtaaataataaagc | |
| | cccacaggaggcgaagttcttgtagctcca | |
| | tgttatctaagttattgatattgtttgccc | |
| | tatattttatttctgtcattgtgtatgttt | |
| | tgttcagtttcgatctccttgcaaaatgca | |
| | gagattatgagatgaataaactaagttata | |
| | ttattatacgtgttaatattctcctcctct | |
| | ctctagctagcctttgttttctcttttc | |
| | ttatttgattttcttaaatcaatccatt | |
| | taggagagggccagggagtgatccagcaaa | |
| | acatgaagattagaagaaacttccctcttt | |
| | tttttcctgaaaacaatttaacgtcgagat | |
| | ttatctcttttttgtaatggaatcatttcta | |
| | cagttatgacgaattgtacatcaacgaaaa | |
| | attagtcaaacgactaaaataaataaatat | |
| | catgtgttattaagaaaattctcctataag | |
| | aatatttttaatagatcatatgtttgtaaaa | |
| | aaaattaatttttactaacacatatattta | |
| | cttatcaaaatttgacaaagtaagattaa | |
| | aataatattcatctaacaaaaaaaaaacca | |
| | gaaaatgctgaaaacccggcaaaaccgaac | |
| | caatccaaaccgatatagttggtttggttt | |
| | gattttgatataaaccgaaccaactcggtc | |
| | catttgcaccccctaatcataatagcttta | |
| | tatttcaagatattattaagttaacgttgt | |
| | caatatcctggaaattttgcaaaatgaatc | |
| | aagcctatggctgtaatatgaatttaaa | |
| | agcagctcgatgtggtggtaatatgtaatt | |
| | tacttgattctaaaaaaatatcccaagtat | |

| SEQ ID NO | Sequence | Name |
|---|---|---|
| | taataaatttctgctaggaagaaggttagct | |
| | acgatttacagcaaagccagaatacaaaga | |
| | accataaagtgattgaagctcgaaatatac | |
| | gaaggaacaaatattttaaaaaaatacgc | |
| | aatgacttggaacaaaagaaagtgatatat | |
| | tttttgttcttaaacaagcatcccctctaa | |
| | agaatggcagttttcctttgcatgtaacta | |
| | ttatgctcccttcgttacaaaaattttgga | |
| | ctactattgggaacttcttctgaaaatagt | |
| | ggtaccGAGTGTACTTCAAGTCAGTTGGAA | |
| | ATCAATAAAATGATTATTTTATGAATATAT | |
| | TTCATTGTGCAAGTAGATAGAAATTACATA | |
| | TGTTACATAACACACGAAATAAACAAAAAA | |
| | ACACAATCCAAAACAAACACCCCAAACAAA | |
| | ATAACACTATATATATCCTCGTATGAGGAG | |
| | AGGCACGTTCAGTGACTCGACGATTCCCGA | |
| | GCAAAAAAGTCTCCCCGTCACACATATAG | |
| | TGGGTGACGCAATTATCTTCAAAGTAATCC | |
| | TTCTGTTGACTTGTCATTGATAACATCCAG | |
| | TCTTCGTCAGGATTCCAAAGAATTATAGAA | |
| | GGGATCGGTCAACATGGTGGAGCACGACAC | |
| | ACTTGTCTACTCCAAAAATATCAAAGATAC | |
| | AGTCTCAGAAGACCAAAGGGCAATTGAGAC | |
| | TTTTCAACAAGGGTAATATCCGGAAACCT | |
| | CCTCGGATTCCATTGCCCAGCTATCTGTCA | |
| | CTTTATTGTGAAGATAGTGGAAAAGGAAGG | |
| | TGGCTCCTACAAATGCCATCATTGCGATAA | |
| | AGGAAAGGCCATCGTTGAAGATGCCTCTGC | |
| | CGACAGTGGTCCCAAAGATGGACCCCCACC | |
| | CACGAGGAGCATCGTGGAAAAAGAAGACGT | |
| | TCCAACCACGTCTTCAAAGCAAGTGGATTG | |
| | ATGTGATAACATGGTGGAGCACGACACACT | |
| | TGTCTACTCCAAAAATATCAAAGATACAGT | |
| | CTCAGAAGACCAAAGGGCAATTGAGACTTT | |
| | TCAACAAAGGGTAATATCCGGAAACCTCCT | |
| | CGGATTCCATTGCCCAGCTATCTGTCACTT | |
| | TATTGTGAAGATAGTGGAAAAGGAAGGTGG | |
| | CTCCTACAAATGCCATCATTGCGATAAAGG | |
| | AAAGGCCATCGTTGAAGATGCCTCTGCCGA | |
| | CAGTGGTCCCAAAGATGGACCCCCACCCAC | |
| | GAGGAGCATCGTGGAAAAGAAGACGTTCC | |
| | AACCACGTCTTCAAAGCAAGTGGATTGATG | |
| | TGATATCTCCACTGACGTAAGGGATGACGC | |
| | ACAATCCCACTATCCTTCGCAAGACCCTTC | |
| | CTCTATATAAGGAAGTTCATTTCATTTGGA | |
| | GAGGACCTCGAGAAACAAACAAAATCAACA | |
| | AATATAGAAAATAACGCATTTCCAATTCTT | |
| | TGAAATTTCTGCAACATCTAGAGGATCCCC | |
| | GGGTACCGAGCTcgaagtgacatcacaaag | |
| | ttgaaggtaataaagccaaattaattaaga | |
| | cattttcataatgatgtcaagaatgcaaag | |
| | caaattgcataactgcctttatgcaaaaca | |
| | ttaatataatataaattataaagaactgcg | |
| | ctctctgcttcttattttcttagcttcatt | |
| | tattagtcactagctgttcagaattttcag | |
| | tatcttttgatattactaagaacctaatca | |
| | cacaatgtatattcttatgcaggaaaagca | |
| | gaatgctgagctaaaagaaaggcttttttcc | |
| | atttcgagagacaatgagaaaagaagaag | |
| | aagaagaagaagaagaagaagaagattagaag | |
| | gtaaataataaagcccacaggaggcgaag | |
| | ttcttgtagctccatgttatctaagttatt | |
| | gatattgtttgccctatattttatttctgt | |
| | cattgtgtatgttttgttcagtttcgatct | |
| | ccttgcaaaatgcagagattatgagatgaa | |
| | taaactaagttatattattatacgtgttaa | |
| | tattctcctcctctctcagctagccttt | |
| | gttttctcttttttcttatttgattttcttt | |
| | aaatcaatccattttaggagagggccaggg | |
| | agtgatccagcaaaacatgaagattagaag | |
| | aaacttccctctttttttttcctgaaaacaa | |
| | tttaacgtcgagatttatctcttttttgtaa | |
| | tggaatcatttctacagttatgacgaattg | |
| | tacatcaacgaaaaattagtcaaacgacta | |
| | aaataaataaatatcatgtgttattaagaa | |

| SEQ ID NO | Sequence | Name |
|---|---|---|
| | aattctcctataagaatattttaatagatc | |
| | atatgtttgtaaaaaaaattaattttttact | |
| | aacacatatatttacttatcaaaaatttga | |
| | caaagtaagattaaaataatattcatctaa | |
| | caaaaaaaaaccagaaaatgctgaaaacc | |
| | cggcaaaaccgaaccaatccaaaccgatat | |
| | agttggtttggttttgattttgatataaacc | |
| | gaaccaactcggtccatttgcacccctaat | |
| | cataatagctttaatattttcaagatattat | |
| | taagttaacgttgtcaatatcctggaaatt | |
| | ttgcaaaatgaatcaagcctatatggctgt | |
| | aatatgaatttaaaagcagctcgatgtggt | |
| | ggtaatatgtaatttacttgattctaaaaa | |
| | aatatcccaagtattaataatttctgctag | |
| | gaagaaggttagctacgatttacagcaaag | |
| | ccagaatacaaagaaccataaagtgattga | |
| | agctcgaaatatacgaaggaacaaatattt | |
| | ttaaaaaaatacgcaatgacttgaacaaa | |
| | agaaagtgatatattttttgttcttaaaca | |
| | agcatcccctctaaagaatggcagttttcc | |
| | tttgcatgtaactattatgctcccttcgtt | |
| | acaaaaattttggactactattgggaactt | |
| | cttctgaaaatagtggtaccGAGTGTACTT | |
| | CAAGTCAGTTGGAAATCAATAAAATGATTA | |
| | TTTTATGAATATATTTCATTGTGCAAGTAG | |
| | ATAGAAATTACATATGTTACATAACACACG | |
| | AAATAAACAAAAAAACACAATCCAAAACAA | |
| | ACACCCCAAACAAAATAACACTATATATAT | |
| | CCTCGTATGAGGAGAGGCACGTTCAGTGAC | |
| | TCGACGATTCCCGAGCAAAAAAGTCTCCC | |
| | CGTCACACATATAGTGGGTGACGCAATTAT | |
| | CTTCAAAGTAATCCTTCTGTTGACTTGTCA | |
| | TTGATAACATCCAGTCTTCGTCAGGATTgC | |
| | AAAGAATTATAGAAGGGATCCCACCCTTTA | |
| | TTTTCTTCTTTTTTTCCATATTTAGGGTTGA | |
| | CAGTGAAATCAGACTGGCAACCCTATTAATT | |
| | GCTTCCACAATGGGACGAACTTGAAGGGGA | |
| | TGTCGTCGATGATATTATAGGTGGCGTGTT | |
| | CATCGTAGTTGGTGAAGTCGATGGTCCCGT | |
| | TCCAGTAGTTGTGTCGCCCGAGACTTCTAG | |
| | CCCAGGTGGTCTTTCCGGTACGAGTTGGTC | |
| | CGCAGATGTAGAGGCTGGGGTGTCTGACCC | |
| | CAGTCCTTCCCTCATCCTGGTTAGATCGGC | |
| | CATCCACTCAAGGTCAGATTGTGCTTGATC | |
| | GTAGGAGACAGGATGTATGAAAGTGTAGGC | |
| | ATCGATGCTTACATGATATAGGTGCGTCTC | |
| | TCTCCAGTTGTGCAGATCTTCGTGGCAGCG | |
| | GAGATCTGATTCTGTGAAGGGCGACACGTA | |
| | CTGCTCAGGTTGTGGAGGAAATAATTTGTT | |
| | GGCTGAATATTCCAGCCATTGAAGCTTTGT | |
| | TGCCCATTCATGAGGGAACTCTTCTTTGAT | |
| | CATGTCAAGATACTCCTCCTTAGACGTTGC | |
| | AGTCTGGATAATAGTTCGCCATCGTGCGTC | |
| | AGATTTGCGAGGAGACACCTTATGATCTCG | |
| | GAAATCTCCTCTGGTTTTAATATCTCCGTC | |
| | CTTTGATATGTAATCAAGGACTTGTTTAGA | |
| | GTTTCTAGCTGGCTGGATATTAGGGTGATT | |
| | TCCTTCAAAATCGAAAAAGAAGGATCCCT | |
| | AATACAAGGTTTTTTTATCAAGCTGGATAAG | |
| | AGCATGATAGTGGGTAGTGCCATCTTGATG | |
| | AAGCTCAGAAGCAACACCAAGGAAGAAAT | |
| | AAGAAAGGTGTGAGTTTCTCCCAGAGAAA | |
| | CTGGAATAAATCATCTCTTTGAGATGAGCA | |
| | CTTGGGGTAGGTAAGGAAAACATATTTGA | |
| | TTGGAGTCTGAAGTTCTTGCTAGCAGAAGG | |
| | CATGTTGTTGTGACTCCGAGGGGTTGCCTC | |
| | AAACTCTATCTTATAACCGGCGTGGAGGCA | |
| | TGGAGGCAAGGGCATTTGGTAATTTAAGT | |
| | AGTTAGTGGAAAATGACGTCATTTACTTAA | |
| | AGACGAAGTCTTGCGCAAGGGGGGCCCAC | |
| | GCCGAATTTTAATATTACCGGCGTGGCCCC | |
| | ACCTTATCGCGAGTGCTTTAGCACGAGCGG | |
| | TCCAGATTTAAAGTAGAAAAGTTCCCGCCC | |
| | ACTAGGGTTAAAGGTGTTCACACTATAAAA | |
| | GCATATACGATGTGATGGTATTTGATGGAG | |

-continued

| SEQ ID NO | Sequence | Name |
|---|---|---|
| | CGTATATTGTATCAGGTATTTCCGTCGGAT<br>ACGAATTATTCGTACGgccggaccggtccc<br>ctaggccggccaattCGAGATCGGCCGCGG<br>CTGAGTGGCTCCTTCAATCGTTGCGGTTCT<br>GTCAGTTCCAAACGTAAAACGGCTTGTCCC<br>GCGTCATCGGCGGGGTCATAACGTGACTC<br>CCTTAATTCTCCGCTCATGATCAGATTGTC<br>GTTTCCCGCCTTCAGTTTAAACTATCAGTG<br>TTTGACAGGATATATTGGCGGGTAAACCTA<br>AGAGAAAAGAGCGTTTATTAGAATAATCGG<br>ATATTTAAAAGGGCGTGAAAAGGTTTATCC<br>GTTCGTCCATTTGTATGTGCATGCCAACCA<br>CAGGGTTCCCCAGATCTGGCGCCGGCCAGC<br>GAGACGAGCAAGATTGGCGCCGCGCCCGAAA<br>CGATCCGACAGCGCGCCCAGCACAGGTGCG<br>CAGGCAAATTGCACCAACGCATACAGCGCC<br>AGCAGAATGCCATAGTGGGCGGTGACGTCG<br>TTCGAGTGAACCAGATCGCGCAGGAGGCCC<br>GGCAGCACCGGCATAATCAGGCCGATGCCG<br>ACAGCGTCGAGCGCGACAGTGCTCAGAATT<br>ACGATCAGGGGTATGTTGGGTTTCACGTCT<br>GGCCTCCGGAGACTGTCATACGCGTAAAAA<br>GGCCGCGTTGCTGGCGTTTTTCCATAGGCT<br>CCGCCCCCTGACGAGCATCACAAAAATCG<br>ACGCTCAAGTCAGAGGTGGCGAAACCCGAC<br>AGGACTATAAAGATACCAGGCGTTTCCCCC<br>TGGAAGCTCCCTCGTGCGCTCTCCTGTTCC<br>GACCCTGCCGCTTACCGGATACCTGTCCGC<br>CTTTCTCCCTTCGGGAAGCGTGGCGCTTTC<br>TCATAGCTCACGCTGTAGGTATCTCAGTTC<br>GGTGTAGGTCGTTCGCTCCAAGCTGGGCTG<br>TGTGCACGAACCCCCCGTTCAGCCCGACCG<br>CTGCGCCTTATCCGGTAACTATCGTCTTGA<br>GTCCAACCCGGTAAGACACGACTTATCGCC<br>ACTGGCAGCAGCCACTGGTAACAGGATTAG<br>CAGAGCGAGGTATGTAGGCGGTGCTACAGA<br>GTTCTTGAAGTGGTGGCCTAACTACGGCTA<br>CACTAGAAGGACAGTATTTGGTATCTGCGC<br>TCTGCTGAAGCCAGTTACCTTCGGAAAAAG<br>AGTTGGTAGCTCTTGATCCGGCAAACAAAC<br>CACCGCTGGTAGCGGTGGTTTTTTTGTTTG<br>CAAGCAGCAGATTACGCGCAGAAAAAAAGG<br>ATCTCAAGAAGATCCTTTGATCTTTTCTAC<br>GGGGTCTGACGCTCAGTGGAACGAAAACTC<br>ACGTTAAGGGATTTTGGTCATGAGATTATC<br>AAAAAGGATCTTCACCTAGATCCTTTTAAA<br>TTAAAAATGAAGTTTTAAATCAATCTAAAG<br>TATATATGAGTAAACTTGGTCTGCAGTTGC<br>CATGTTTTACGGCAGTGAGAGCAGAGATAG<br>CGCTGATGTCCGGCGGTGCTTTTGCCGTTA<br>CGCACCACCCCGTCAGTAGCTGAACAGGAG<br>GGACAGCTGATAGACACAGAAGCCACTGGA<br>GCACCTCAAAACACCATCATACACTAAAT<br>CAGTAAGTTGGCAGCATCACCCATAATTGT<br>GGTTTCAAAATCGGCTCCGTCGATACTATG<br>TTATACGCCAACTTTGAAAACAACTTTGAA<br>AAAGCTGTTTTCTGGTATTTAAGGTTTTAG<br>AATGCAAGGAACAGTGAATTGGAGTTCGTC<br>TTGTTATAATTAGCTTGTTCAGGTTATCTTT<br>AAATACTGTAGAAAAGAGGAAGGAAATAAT<br>AAATGGCTAAATGAGAATATCACCGGAAT<br>TGAAAAAACTGATCGAAAAATACCGCTGCG<br>TAAAAGATACGGAAGGAATGTCTCCTGCTA<br>AGGTATATAAGCTGGTGGGAAAAATGAAA<br>ACCTATATTTAAAAATGACGGACAGCCGGT<br>ATAAAGGGACCACCTATGATGTGGAACGGG<br>AAAAGGACATGATGCTATGGCTGGAAGGAA<br>AGCTGCCTGTTCCAAAGGTCCTGCACTTTG<br>AACGGCATGATGGCTGGCAATCTGCTCA<br>TGAGTGAGGCCGATGGCGTCCTTTGCTCGG<br>AAGAGTATGAAGATGAACAAAGCCCTGAAA<br>AGATTATCGAGCTGTATGCGAGTGCATCA<br>GGCTCTTTCACTCCATCGACATATCGGATT<br>GTCCCTATACGAATAGCTTAGACAGCCGCT<br>TAGCCGAATTGGATTACTTACTGAATAACG | |

| SEQ ID NO | Sequence | Name |
|---|---|---|
| | ATCTGGCCGATGTGGATTGCGAAAACTGGG<br>AAGAAGACACTCCATTTAAAGATCCGCGCG<br>AGCTGTATGATTTTTTAAAGACGGAAAAGC<br>CCGAAGAGGAACTTGTCTTTTCCCACGGCG<br>ACCTGGGAGACAGCAACATCTTTGTGAAAG<br>ATGGCAAAGTAAGTGGCTTTATTGATCTTG<br>GGAGAAGCGGCAGGGCGGACAAGTGGTATG<br>ACATTGCCTTCTGCGTCCGGTCGATCAGGG<br>AGGTATCGGGGAAGAACAGTATGTCGAGC<br>TATTTTTTGACTTACTGGGGATCAAGCCTG<br>ATTGGGAGAAAATAAAATATTATATTTTAC<br>TGGATGAATTGTTTTAGTACCTAGATGTGG<br>CGCAACGATGCCGGCGACAAGCAGGAGCGC<br>ACCGACTTCTTCCGCATCAAGTGTTTTGGC<br>TCTCAGGCCGAGGCCCACGGCAAGTATTTG<br>GGCAAGGGGTCGCTGGTATTCGTGCAGGGC<br>AAGATTCGGAATACCAAGTACGAGAAGGAC<br>GGCCAGACGGTCTACGGACCGACTTCATT<br>GCCGATAAGGTGGATTATCTGGACACCAAG<br>GCACCAGGCGGGTCAAATCAGGAATAAGGG<br>CACATTGCCCCGGCGTGAGTCGGGGCAATC<br>CCGCAAGGAGGGTGAATGAATCGGACGTTT<br>GACCGGAAGGCATACAGGCAAGAACTGATC<br>GACGCGGGGTTTTCCGCCGAGGATGCCGAA<br>ACCATCGCAAGCCGCACCGTCATGCGTGCG<br>CCCCGCGAAACCTTCCAGTCCGTCGGCTCG<br>ATGGTCCAGCAAGCTACGGCCAAGATCGAG<br>CGCGACAGCGTGCAACTGGCTCCCCTGCC<br>CTGCCCGCGCCATCGGCCGCCGTGGAGCGT<br>TCGCGTCGTCTCGAACAGGAGGCGGCGAGT<br>TTGGCGAAGTCGATGACCATCGACACGCGA<br>GGAACTATGACGACCAAGAAGCGAAAAACC<br>GCCGGCGAGGACCTGGCAAAACAGGTCAGC<br>GAGGCCAAGCAGGCCGCGTTGCTGAAACAC<br>ACGAAGCAGCAGATCAAGGAAATGCAGCTT<br>TCCTTGTTCGATATTGCGCCGTGGCCGGAC<br>ACGATGCGAGCGATGCCAAACGACACGGCC<br>CGCTCTGCCCTGTTCACCACGCGCAACAAG<br>AAAATCCCGCGCGAGGCGCTGCAAAACAAG<br>GTCATTTTCCACGTCAACAAGGACGTGAAG<br>ATCACCTACACCGGCGTCGAGCTGCGGGCC<br>GACGATGACGAACTGGTGTGGCAGCAGGTG<br>TTGGAGTACGCGAAGCGCACCCCTATCGGC<br>GAGCCGATCACCTTCACGTTCTACGAGCTT<br>TGCCAGGACCTGGGCTGGTCGATCAATGGC<br>CGGTATTACACGAAGGCCGAGGAATGCCTG<br>TCGCGCCTACAGGCGACGGCGATGGGCTTC<br>ACGTCCGACCGCGTTGGGCACCTGGAATCG<br>GTGTCGCTGCTGCACCGCTTCCGCGTCCTG<br>GACCGTGGCAAGAAAACGTCCCGTTGCCAG<br>GTCCTGATCGACGAGGAAATCGTCGTGCTG<br>TTTGCTGGCGACCACTACACGAAATTCATA<br>TGGGAGAAGTACCGCAAGCTGTCGCCGACG<br>GCCCGACGGATGTTCGACTATTTCAGCTCG<br>CACCGGGAGCGTACCCGCTCAAGCTGGAA<br>ACCTTCCGCCTCATGTGCGGATCGGATTCC<br>ACCCGCGTGAAGAAGTGGCGCGAGCAGGTC<br>GGCGAAGCCTGCGAAGAGTTGCGAGGCAGC<br>GGCCTGGTGGAACACGCCTGGGTCAATGAT<br>GACCTGGTGCATTGCAAACGCTAGGGCCTT<br>GTGGGGTCAGTTCCGGCTGGGGGTTCAGCA<br>GCCAGCGCTTTACTGGCATTTCAGGAACAA<br>GCGGGCACTGCTCGACGCACTTGCTTCGCT<br>CAGTATCGCTGCGGGACGCACGGCGCGCTCT<br>ACGAACTGCCGATAAACAGAGGATTAAAAT<br>TGACAATTCAATGGCAAGGACTGCCAGCGC<br>TGCCATTTTGGGGTGAGGCCGTTCGCGGC<br>CGAGGGGCGCAGCCCCTGGGGGATGGGAG<br>GCCCGCGTTAGCGGGCGGGAGGGTTCGAG<br>AAGGGGGGGCACCCCCCTTCGGCGTGCGCG<br>GTCACGCGCACAGGGCGCAGCCCTGGTTAA<br>AAACAAGGTTTATAAATATTGGTTTAAAAG<br>CAGGTTAAAAGACAGGTTAGCGGTGGCCGA<br>AAAACGGGCGGAAACCCTTGCAAATGCTGG<br>ATTTTCTGCCTGTGACAGCCCCTCAAATG | |

| SEQ ID NO | Sequence | Name |
|---|---|---|
| | TCAATAGGTGCGCCCTCATCTGTCAGCAC<br>TCTGCCCCTCAAGTGTCAAGGATCGCGCCC<br>CTCATCTGTCAGTAGTCGCGCCCCTCAAGT<br>GTCAATACCGCAGGGCACTTATCCCCAGGC<br>TTGTCCACATCATCTGTGGGAAACTCGCGT<br>AAAATCAGGCGTTTTCGCCGATTTGCGAGG<br>CTGGCCAGCTCCACGTCGCCGGCCGAAATC<br>GAGCCTGCCCCTCATCTGTCAACGCCGCGC<br>CGGGTGAGTCGGCCCCTCAAGTGTCAACGT<br>CCGCCCCTCATCTGTCAGTGAGGGCCAAGT<br>TTTCCGCGAGGTATCCACAACGCCGGCGGC<br>CGCGGTGTCTCGCACACGGCTTCGACGGCG<br>TTTCTGGCGCGTTTGCAGGGCCATAGACGG<br>CCGCCAGCCAGCGGCGAGGGCAACCAGCC<br>CGGTGAGCGTCGCAAAGGCGCTCGGTCTTG<br>CCTTGCTCGTCGAGATCTGGGGTCGATCAG<br>CCGGGGATGCATCAGGCCGACAGTCGGAAC<br>TTCGGGTCCCCGACCTGTACCATTCGGTGA<br>GCAATGGATAGGGAGTTGATATCGTCAAC<br>GTTCACTTCTAAAGAAATAGCGCCACTCAG<br>CTTCCTCAGCGGCTTTATCCAGCGATTTCC<br>TATTATGTCGGCATAGTTCTCAAGATCGAC<br>AGCCTGTCACGGTTAAGCGAGAAATGAATA<br>AGAAGGCTGATAATTCGGATCTCTGCGAGG<br>GAGATGATATTTGATCACAGGCAGCAACGC<br>TCTGTCATCGTTACAATCAACATGCTACCC<br>TCCGCGAGATCATCCGTGTTTCAAACCCGG<br>CAGCTTAGTTGCCGTTCTTCCGAATAGCAT<br>CGGTAACATGAGCAAAGTCTGCCGCCTTAC<br>AACCGCTCTCCCGCTGACGCCGTCCCGGAC<br>TGATGGGCTGCCTGTATCGAGTGGTGATTT<br>TGTGCCGAGCTGCCGGTCGGGGAGCTGTTG<br>GCTGGCTGGTGGCAGGATATATTGTGGTGT<br>AAACAAATTGACGCTTAGACAACTTAATAA<br>CACATTGCGGACGTTTTTAATGTACTGGGG<br>TGGTTTTCTTTTCACCAGTGAGACGGGCA<br>ACAGCTGATTGCCCTTCACCGCCTGGCCCT<br>GAGAGAGTTGCAGCAAGCGGTCCACGCTGG<br>TTTTGCCCCAGCAGGCGAAAATCCTGTTTGA<br>TGGTGGTTCCGAAATCGGCAAAATCCCTTA<br>TAAATCAAAGAATAGCCCGAGATAGGGTT<br>GAGTGTTGTTCCAGTTTGGAACAAGAGTCC<br>ACTATTAAAGAACGTGGACTCCAACGTCAA<br>AGGGCGAAAAACCGTCTATCAGGGCGATGG<br>CCCACTACGTGAACCATCACCCAAATCAAG<br>TTTTTTGGGGTCGAGGTGCCGTAAAGCACT<br>AAATGGAACCCTAAAGGGAGCCCCCGATT<br>TAGAGCTTGACGGGGAAAGCCGGCGAACGT<br>GGCAGAAAAGGAAGGGAAGAAAGCGAAAGG<br>AGCGGGCGCCATTCAGGCTGCGCAACTGTT<br>GGGAAGGG | |
| 2 | TGGGATGGTCTTGTATCATCCTTTTCTTGG<br>TTGCAACAGCTACTGGTGTTCATTCTCAAG<br>TTCAATTGCAGCAGCCTGGTGCAGCTCTCG<br>TGAAGCCAGGTGCTTCAGCAATGATGTCTT<br>GTAAGGCTTCTGGTTACACATTCACAAGCT<br>ATTGGATTACATGGGTGAAACAAAGACCTG<br>GTCAGGGTCTTGAGTGGATAGGAGATATTT<br>ATCCCGGAACTGGAAGAACTATCTACAAAG<br>AGAAGTTTAAAACCAAGGCTACTCTGACTG<br>TAGATACCAGTTCTTCTACTGCTTTTATGC<br>AACTTAATTCTTTGACATCAGAAGATAGTG<br>CTGTGTACTATTGTGCTAGGGGGTATGCT<br>CACCATATTACGCTTTAGACTATTGGGGAC<br>AAGGTACTTCCGTTACTGTCTCTTCTGCTA<br>GCACCAAGGGACCTTCTGTTTTTCCACTTG<br>CTCCTTCTTCTAAGTCTACTTCTGGTGGAA<br>CTGCTGCTTTGGGTTGTTTGGTGAAAGATT<br>ACTTTCCTGAGCCAGTGACCGTTTCTTGGA<br>ACTCAGGTGCTCTTACATCTGGTGTTCATA<br>CTTTCCCAGCTGTTCTTCAATCTTCAGGAC<br>TTTACTCACTTTCTTCTGTTGTTACCGTTC<br>CTTCTTCAAGCTTGGGCACTCAGACCTACA<br>TCTGCAATGTGAATCACAAACCCAGCAACA | CHIKV152Hc |
| | CCAAGGTTGACAAGAAAGTTGAGCCCAAGT<br>CTTGTGACAAGACTCATACGTGTCCACCGT<br>GCCCAGCACCTGAACTTCTTGGAGGACCGT<br>CAGTCTTCTTGTTTCCTCCAAAGCCTAAGG<br>ATACCTTGATGATCTCCAGGACTCCTGAAG<br>TCACATGTGTAGTTGTGGATGTGAGCCATG<br>AAGATCCTGAGGTGAAGTTCAACTGGTATG<br>TGGATGGTGTGGAAGTGCACAATGCCAAGA<br>CAAAGCCGAGA<br>GAGGAACAGTACAACAGCACGTACAGGGTT<br>GTCTCAGTTCTCACTGTTCTCCATCAAGAT<br>TGGTTGAATGGCAAAGAGTACAAGTGCAAG<br>GTGTCCAACAAAGCCCTCCCAGCCCCCATT<br>GAGAAGACCATTTCCAAAGCGAAAGGCAA<br>CCCCGTGAACCACAAGTGTACACACTTCCT<br>CCATCTCGCGATGAACTGACCAAGAACCAG<br>GTCAGCTTGACTTGCCTGGTGAAAGGCTTC<br>TATCCCTCTGACATAGCTGTAGAGTGGGAG<br>AGCAATGGGCAACCGGAGAACAACTACAAG<br>ACTACACCTCCCGTTCTCGATTCTGACGGC<br>TCCTTCTTCCTCTACAGCAAGCTCACAGTG<br>GACAAGAGCAGGTGGCAACAAGGGAATGTC<br>TTCTCATGCTCCGTGATGCATGAGGCTCTT<br>CACAATCACTACACACAGAAGAGTCTCTCC<br>TTGTCTCCGGGTAAATGA | |
| 3 | MGWSCIILFLVATATGVHSQVQLQQPGAAL<br>VKPGASAMMSCKASGYTFTSYWITWVKQRP<br>GQGLEWIGDIYPGTGRTIYKEKFKTKATLT<br>VDTSSSTAFMQLNSLTSEDSAVYYCARGYG<br>SPYYALDYWGQGTSVTVSSASTKGPSVFPL<br>APSSKSTSGGTAALGCLVKDYFPEPVTVSW<br>NSGALTSGVHTFPAVLQSSGLYSLSSVVTV<br>PSSSLGTQTYICNVNHKPSNTKVDKKVEPK<br>SCDKTHTCPPCPAPELLGGPSVFLFPPKPK<br>DTLMISRTPEVTCVVVDVSHEDPEVKFNWY<br>VDGVEVHNAKTKPREEQYNSTYRVVSVLTV<br>LHQDWLNGKEYKCKVSNKALPAPIEKTISK<br>AKGQPREPQVYTLPPSRDELTKNQVSLTCL<br>VKGFYPSDIAVEWESNGQPENNYKTTPPVL<br>DSDGSFFLYSKLTVDKSRWQQGNVFSCSVM<br>HEALHNHYTQKSLSLSPGK | CHIKV152Hc |
| 4 | ATGGGATGGTCTTGTATCATCCTTTTCTTG<br>GTTGCAACAGCTACTGGTGTTCATTCTGAT<br>ATCGTTTTAACACAATCTCCAGCATCTTTG<br>GCTGTTTCTCAAGGACAAAGGGCTACTATC<br>AGTTGCAAGGCTTCTCAATCAGTGGACTAT<br>GACGGTGATTCTTATGTTAACTGGTACCAA<br>CAGAAACCTGGACAGTCCCCAAAACTTCTT<br>ATCTACGACGCATCTAATCTCGAATCTGGA<br>ATACCAGCCAGATTTTCTGGATCTGGATCT<br>GGAACAGATTTCACTCTTAACATCCATCCT<br>GTC<br>GAGGAAGAGGATGTTGCAACTTATTACTGT<br>CAGGAATCAAATGAAGATCCACGTACTTTC<br>GGTGGAGGAACTAAGTTGGAGATCAAAGCT<br>AGCAGAACTGTTGCTGCACCATCTGTTTTC<br>ATCTTCCCTCCATCTGATGAGCAGTTGAAA<br>TCTGGAACTGCTTCTGTTGTGTGCCTTCTT<br>AATAACTTCTATCCTAGAGAGGCTAAAGTT<br>CAGTGGAAGGTGGATAACGCACTTCAATCT<br>GGTAACTCTCAAGAGTCTGTTACAGAGCAA<br>GATTCTAAGGACTCAACTTACTCTCTTTCA<br>TCTACACTTACTTTGTCAAAAGCAGATTAC<br>GAGAAACACAAAGTTTACGCATGCGAAGTT<br>ACTCATCAAGGACTTCTTCACCAGTTACA<br>AAGTCTTTCAATAGAGGAGAGTGTTAA | CHIKV152Lc |
| 5 | MGWSCIILFLVATATGVHSDIVLTQSPASL<br>AVSQGQRATISCKASQSVDYDGDSYVNWYQ<br>QKPGQSPKLLIYDASNLESGIPARFSGSGS<br>GTDFTLNIHPVEEEDVATYYCQESNEDPRT<br>FGGGTKLEIKASRTVAAPSVIFPPSDEQL<br>KSGTASVVCLLNNFYPREAKVQWKVDNALQ | CHIKV152Lc |

| SEQ ID NO | Sequence | Name |
|---|---|---|
|  | SGNSQESVTEQDSKDSTYSLSSTLTLSKAD YEKHKVYACEVTHQGLSSPVTKSFNRGEC* |  |
| 6 | ATGGGATGGTCTTGTATCATCCTTTTCTTG GTTGCAACAGCTACTGGTGTTCATTCTGAA GTTAGGTTGGTGGAATCAGGAGGCGGTCTT GAGCAGCCAGGGGGTTCACTGAAGCTATCT TGTGCAGCTTCTGGTTTTACATTCAGTGAT TACTTTATGTATTGGGTGAGACAAACCCCT GAGAAACGTCTTGAGTGGTCGCCTACATT AGTAATGGGGGAATTTCCACTTTCTATAGC GATGCAGTAAAAGGAAGATTCACTATATCC AGAGACAACGCTAGAAATACTCTTTATCTC CAAATGTCTAGATTGAAGTCAGAAGATACT GCTATCTACTATTGTGTTAGGCAGGTATAT GGCCAGGGATACTTTGACTATTGGGGACAA GGTACTACTTTAGCAGTTTCTTCTGCTAGC ACCAAGGGACCTTCTGTTTTTCCACTTGCT CCTTCTTCCAAGTCTACTTCTGGTGGAACT GCTGCTTTGGGTTGTTTGGTGAAAGATTAC TTTCCTGAGCCAGTGACCGTTTCTTGGAAC TCAGGTGCTCTTACATCTGGTGTTCATACT TTCCCAGCTGTTCTTCAATCTTCAGGACTT TACTCACTTTCTTCTGTTGTTACCGTTCCT TCTTCAAGCTTGGGCACTCAGACCTACATC TGCAATGTGAATCACAAACCCAGCAACACC AAGGTTGACAAGAAAGTTGAGCCCAAGTCT TGTGACAAGACTCATACGTGTCCACCGTGC CCAGCACCTGAACTTCTTGGAGGACCGTCA GTCTTCTTGTTTCCTCCAAAAGCCTAAGGAT ACCTTGATGATCTCCAGGACTCCTGAAGTC ACATGTGTAGTTGTGGATGTGAGCCATGAA GATCCTGAGGTGAAGTTCAACTGGTATGTG GATGGTGTGGAAGTGCACAATGCCAAGACA AAGCCGAGAGAGGAACAGTACAACAGCACG TACAGGGTTGTCTCAGTTCTCACTGTTCTC CATCAAGATTGGTTGAATGGCAAAGAGTAC AAGTGCAAGGTGTCCAACAAAGCCCTCCCA GCCCCCATTGAGAAGACCATTTCCAAAGCG AAAGGGCAACCCCGTGAACCACAAGTGTAC ACACTTCCTCCATCTCGCGATGAACTGACC AAGAACCAGGTCAGCTTGACTTGCCTGGTG AAAGGCTTCTATCCCTCTGACATAGCTGTA GAGTGGGAGAGCAATGGGCAACCGGAGAAC AACTACAAGACTACACCTCCCGTTCTCGAT TCTGACGGCTCCTTCTTCCTCTACAGCAAG CTCACAGTGGACAAGAGCAGGTGGCAACAA GGGAATGTCTTCATGCTCCGTGATGCAT GAGGCTCTTCACAATCACTACACACAGAAG AGTCTCTCCTTGTCTCCGGGTAAATGA |  |
| 7 | MGWSCIILFLVATATGVHSEVRLVESGGGL EQPGGSLKLSCAASGFTFSDYFMYWVRQTP EKRLEWVAYISNGGISTFYSDAVKGRFTIS RDNARNTLYLQMSRLKSEDTAIYYCVRQVY GQGYFDYWGQGTTLAVSSASTKGPSVFPLA PSSKSTSGGTAALGCLVKDYFPEPVTVSWN SGALTSGVHTFPAVLQSSGLYSLSSVVTVP SSSLGTQTYICNVNHKPSNTKVDKKVEPKS CDKTHTCPPCPAPELLGGPSVFLFPPKPKD TLM1SRTPEVTCVVVDVSHEDPEVKFNWYV DGVEVHNAKTKPREEQYNSTYRVVSVLTVL HQDWLNGKEYKCKVSNKALPAPIEKTISKA KGQPREPQVYTLPPSRDELTKNQVSLTCLV KGFYPSDIAVEWESNGQPENNYKTTPPVLD SDGSFFLYSKLTVDKSRWQQGNVFSCSVMH EALHNHYTQKSLSLSPGK* | CHIKV166Hc |
| 8 | ATGGGATGGTCTTGTATCATCCTTTTCTTG GTTGCAACAGCTACTGGTGTTCATTCTCAA ATCGTTCTGATTCAATCTCCAGCAATTATG TCTGCTTCTCTTGGAGAGGGTGACTATG ACTTGCACCGCTAGTAGCTCTGTTTCAAGT TCTTATTTGCACTGGTACCAACAGAAACCT GGATCATCACCAAAACTTTGGATTACTCC TCATTTTCTTTAGCATCTGGAGTTCCAGCC | CHIKV166Lc |

| SEQ ID NO | Sequence | Name |
|---|---|---|
|  | AGATTTTCTGGATCTGGATCTGGAACATCC TATAGCCTTACTATCTCAACAATGGAAGCT GAGGATGCTGCAACATATTACTGTCATCAG TATCTCCGTTCCCCATGGACTTTCGGTGGA GGAAGTAAGTTGGAGATCAAAGCTAGCAGA ACTGTTGCTGCACCATCTGTTTTCATCTTC CCTCCATCTGATGAGCAGTTGAAATCTGGA ACTGCTTCTGTTGTGTGCCTTCTTAATAAC TTCTATCCTAGAGAGGCTAAAGTTCAGTGG AAGGTGGATAACGCACTTCAATCTGGTAAC TCTCAAGAGTCTGTTACAGAGCAAGATTCT AAGGACTCAACTTACTCTCTTTCATCTACA CTTACTTTGTCAAAAGCAGATTACGAGAAA CACAAAGTTTACGCATGCGAAGTTACTCAT CAAGGACTTTCTTCACCAGTTACAAAGTCT TTCAATAGAGGAGAGTGTTAATGA |  |
| 9 | MGWSCIILFLVATATGVHSQIVLIQSPAIM SAS0LGERVTMTCTASSSVSSSYLHWYQQK PGSSPKLWIYSSFSLASGVPARFSGSGSGT SYSLTISTMEAEDAATYYCHQYLRSPWTFG GGSKLEIKASRTVAAPSVFIFPPSDEQLKS GTASVVCLLNNFYPREAKVQWKVDNALQSG NSQESVTEQDSKDSTYSLSSTLTLSKADYE KHKVYACEVTHQGLSSPVTKSFNRGEC* | CHKV166Lc |
| 10 | GAATTCACAATGGGATGGTCTTGTATCATC CTTTTCTTGGTTGCAACAGCTACTGGTGTT CATTCTCAAGTTCAATTGCAGCAGCCTGGT GCAGCTCTCGTGAAGCCAGGTGCTTCAGCA ATGATGTCTTGTAAGGCTTCTGGTTACACA TTCACAAGCTATTGGATTACATGGGTGAAA CAAAGACCTGGTCAGGGTCTTGAGTGGATA GGAGATATTTATCCCGGAACTGGAAGAACT ATCTACAAAGAGAAGTTTAAAACCAAGGCT ACTCTGACTGTAGATACCAGTTCTTCTACT GCTTTTATGCAACTTAATTCTTTGACATCA GAAGATAGTGCTGTGTACTATTGTGCTAGG GGGTATGGCTCACCATATTACGCTTTAGAC TATTGGGGACAAGGTACTTCCGTTACTGTG TCTTCTGCTAGC | 152VH |
| 11 | MGWSCIILFLVATATGVHSQVQLQQPGAAL VKPGASAMMSCKASGYTFTSYWITWVKQRP GQGLEWIGDIYPGTGRTIYKEKFKTKATLT VDTSSSTAFMQLNSLTSEDSAVYYCARGYG SPYYALDYWGQGTSVTVSSAS | 152VH |
| 12 | GAATTCACAATGGGATGGTCTTGTATCATC CTTTTCTTGGTTGCAACAGCTACTGGTGTT CATTCTGATATCGTTTTAACACAATCTCCA GCATCTTTGGCTGTTTCTCAAGGACAAAGG GCTACTATCAGTTGCAAGGCTTCTCAATCA GTGGACTATGACGGTGATTCTTATGTTAAC TGGTACCAAC AGAAACCTGGACAGTCCCCAAAACTTCTTA TCTACGACGCATCTAATCTCGAATCTGGAA TACCAGCCGATTTTCTGGATCTGGATCTG GAACAGATTTCACTCTTAACATCCATCCTG TCGAGGAAGAGGATGTTGCAACTTATTACT GTCAGGAATCAAATGAAGATCCACGTACTT TCGGTGGAGGAACTAAGTTGGAGATCAAA | 152VL |
| 13 | MGWSCIILFLVATATGVHSDIVLTQSPASL AVSQGQRATISCKASQSVDYDGDSYVNWYQ QKPGQSPKLLIYDASNLESGIPARFSGSGS GTDFTLNIHPVEEEDVATYYCQESNEDPRT FGGGTKLEIK | 152VL |
| 14 | GAATTCACAATGGGATGGTCTTGTATCATC CTTTTCTTGGTTGCAACAGCTACTGGTGTT CATTCTGAAGTTAGGTTGGTGGAATCAGGA | 166VH |

| SEQ ID NO | Sequence | Name |
|---|---|---|
| | GGCGGTCTTGAGCAGCCAGGGGGTTCACTG AAGCTATCTTGTGCAGCTTCTGGTTTTACA TTCAGTGATTACTTTATGTATTGGGTGAGA CAAACCCCTGAGAAACGTCTTGAGTGGGTC GCCTACATTAGTAATGGGGAATTTCCACT TTCTATAGCGATGCAGTAAAAGGAAGATTC ACTATATCCAGAGACAACGCTAGAAATACT CTTTATCTCCAAATGTCTAGATTGAAGTCA GAAGATACTGCTATCTACTATTGTGTTAGG CAGGTATATGGCCAGGGATACTTTGACTAT TGGGGACAAGGTACTACTTTAGCAGTTTCT TCTGCTAGC | |
| 15 | MGWSCIILFLVATATGVHSEVRLVESGGGL EQPGGSLKLSCAASGFTFSDYFMYWVRQTP EKRLEWVAYISNGGISTFYSDAVKGRFTIS RDNARNTLYLQMSRLKSEDTAIYYCVRQVY GQGYFDYWGQGTTLAVSSAS | 166V<sub>H</sub> |
| 16 | GAATTCACAATGGATGGTCTTGTATCATC CTTTTCTTGGTTGCAACAGCTACTGGTGTT CATTCTCAAATCGTTCTGATTCAATCTCCA GCAATTATGTCTGCTTCTCTTGGA | 166V<sub>L</sub> |

---

What is claimed is:

1. A glycosylated IgG monoclonal antibody having specificity to Chikungunya virus (CHIKV) E1 or E2 protein, comprising a heavy chain and a light chain pair selected from:
   (a) a heavy chain comprising the amino acid sequence of SEQ. ID NO: 3; and a light chain comprising the amino acid sequence of SEQ. ID NO: 5;
   (b) a heavy chain comprising the amino acid sequence of SEQ. ID NO: 7; and a light chain comprising the amino acid sequence of SEQ. ID NO: 9;
   (c) a heavy chain variable domain comprising the amino acid sequence of SEQ ID NO: 11; and a light chain variable domain comprising the amino acid sequence of SEQ ID NO: 13; or
   (d) a heavy chain variable domain comprising the amino acid sequence of SEQ ID NO: 15; and a light chain variable domain comprising the amino acid sequence of SEQ ID NO: 17;
   wherein the Fc domain of the heavy chain is characterized by an N-linked glycan profile comprising an N-linked GlcNAc2Man3GlcNAc2 (GnGn) core glycan (Man=Mannose, GlcNAc=N-acetylglucosamine) with more than about 95% uniformity.

2. The antibody of claim 1, wherein the antibody is produced in a plant, a plant fragment, or a plant cell.

3. The antibody of claim 2, wherein the plant is ΔXFT *N. benthamiana*.

4. The antibody of claim 1, wherein the antibody is a human antibody that does not contribute to antibody-dependent enhancement of virus infection.

5. A composition for the prevention or treatment of Chikungunya, the composition comprising a prophylactically or therapeutically effective amount of a glycosylated monoclonal antibody having specificity to CHIKV E1 or E2 protein, wherein the antibody comprises a heavy chain and a light chain pair selected from:
   (a) a heavy chain comprising the amino acid sequence of SEQ. ID NO: 3; and a light chain comprising the amino acid sequence of SEQ. ID NO: 5;
   (b) a heavy chain comprising the amino acid sequence of SEQ. ID NO: 7; and a light chain comprising the amino acid sequence of SEQ. ID NO: 9;
   (c) a heavy chain variable domain comprising the amino acid sequence of SEQ ID NO: 11; and a light chain variable domain comprising the amino acid sequence of SEQ ID NO: 13; or
   (d) a heavy chain variable domain comprising the amino acid sequence of SEQ ID NO: 15; and a light chain variable domain comprising the amino acid sequence of SEQ ID NO: 17;
   wherein the Fc domain of the heavy chain is characterized by an N-linked glycan profile comprising an N-linked GlcNAc2Man3GlcNAc2 (GnGn) core glycan (Man=Mannose, GlcNAc=N-acetylglucosamine) with more than about 95% uniformity.

6. The composition of claim 5, wherein the composition comprises a plant, plant fragment, plant cell or plant extract comprising the monoclonal antibody having specificity to CHIKV E1 or E2 protein.

7. The composition of claim 6, wherein the plant is ΔXFT *N. benthamiana*.

8. The composition of claim 5, further comprising excipients selected from the group consisting of compatible dispersing agents, buffers, surfactants, preservatives, solubilizing agents, isotonicity agents, and stabilizing agents.

9. A method of producing a glycosylated monoclonal antibody having specificity to CHIKV E1 or E2 protein, the method comprising introducing into a plant expression system, one or more vectors for the expression of an anti-CHIKV E1 or E2 antibody, wherein the vector comprises a nucleic acid sequence encoding a heavy chain and a light chain pair selected from:
   (a) a nucleic acid sequence set forth in the sequence of SEQ ID NO: 2 and a nucleic acid sequence set forth in the sequence of SEQ ID NO: 4;
   (b) a nucleic acid sequence set forth in the sequence of SEQ ID NO: 6 and a nucleic acid sequence set forth in the sequence of SEQ ID NO: 8;
   (c) a nucleic acid sequence set forth in the sequence of SEQ ID NO: 10 and a nucleic acid sequence set forth in the sequence of SEQ ID NO: 12; or
   (d) a nucleic acid sequence set forth in the sequence of SEQ ID NO: 14 and a nucleic acid sequence set forth in the sequence of SEQ ID NO: 16;
   wherein the Fc domain of the heavy chain is characterized by an N-linked glycan profile comprising an N-linked GlcNAc2Man3GlcNAc2 (GnGn) core glycan (Man=Mannose, GlcNAc=N-acetylglucosamine) with more than about 95% uniformity.

10. The method of claim 9, wherein the plant expression system is ΔXFT *N. benthamiana*.

11. The method of claim 9, wherein the vector is a geminiviral vector.

* * * * *